(12) United States Patent
Razavi-Shirazi

(10) Patent No.: US 6,337,019 B1
(45) Date of Patent: Jan. 8, 2002

(54) BIOLOGICAL PERMEABLE BARRIER TO TREAT CONTAMINATED GROUNDWATER USING IMMOBILIZED CELLS

(76) Inventor: Fatemeh Razavi-Shirazi, 12490 Quivira Rd. #3213, Overland Park, KS (US) 66213

( * ) Notice: Subject to any disclaimer, the term of this patent is extended or adjusted under 35 U.S.C. 154(b) by 0 days.

(21) Appl. No.: 09/432,092

(22) Filed: Nov. 2, 1999

Related U.S. Application Data

(60) Provisional application No. 60/106,687, filed on Nov. 2, 1998.

(51) Int. Cl.[7] ................................................. C02F 3/00
(52) U.S. Cl. ........................ 210/610; 210/616; 210/617
(58) Field of Search ........................ 210/610, 615–617

(56) References Cited

U.S. PATENT DOCUMENTS

| | | | |
|---|---|---|---|
| 4,662,900 A | * | 5/1987 | Ottengraf |
| 5,057,227 A | * | 10/1991 | Cohen |
| 5,534,154 A | * | 7/1996 | Gillham |
| 5,869,323 A | * | 2/1999 | Horn |
| 5,976,378 A | * | 11/1999 | Sumino |

OTHER PUBLICATIONS

Oklahoma State Univ Library catalog entry of applicant's doctoral thesis, http://osucatalog.library.okstate.edu/cgi–bin/Pwebrecon.cgi?v3=1&ti=1,1&SC=Author&CNT=25+records+per+page&SA=razavi&PID=56370.*

Transmittal Cover letter and title page of applicant's provisional application 60/106687.*

"Typical Thesis/Dissertation Schedule," http://microbiology.okstate.edu/grad/gradweb.html downloaded and printed on Feb. 2, 2001.*

Oklamhoma State University Microbiology and Molecular Genetics—A letter from our Graduate Coordinator, http://www.cas.okstate.edu/jb/grad/mccatalog/thesisschedule.html downloaded and printed on Feb. 2, 2001.*

* cited by examiner

Primary Examiner—Chester T. Barry
(74) Attorney, Agent, or Firm—Spencer Fane Britt & Browne LLP

(57) ABSTRACT

A method of removing contaminates from ground water is provided which places a biological permeable barrier in the path of the ground water flow to contact the contaminated groundwater with encapsulated microorganisms which act to decontaminate the contacted groundwater.

20 Claims, 43 Drawing Sheets

TCP removal by PVA (10 cm) column #1.

TCP removal by PVA (20 cm) column #2.

TCP removal by GAC (10 cm) column #3.

TCP removal by GAC (20 cm) column #4.

DO uptake by PVA (10.0 cm) column #1.

DO uptake by PVA (20.0 cm) column #2.

DO uptake by GAC (10.0 cm) column #3.

PVA (10.0 cm) column #1 comparison of %TCP removal, measured and calculated from GC results.

PVA (20.0 cm) column #2 comparison of %TCP removal, measured and calculated from GC results.

GAC (10.0 cm) column #3 comparison of %TCP removal, measured and calculated from GC results.

GAC (20.0 cm) column #4 comparison of %TCP removal, measured and calculated from GC results.

pH drop by PVA (10.0 cm) column #1.

pH drop by PVA (20.0 cm) column #2.

pH drop by GAC (10.0 cm) column #3.

PVA column #2 TCP concentrations response to the high shock loads.

PVA column #2 DO changes during high shock loads.

PVA column #2 chloride release changes during high shock loads.

PVA column #2 pH changes during high shock loads.

GAC column #4 TCP concentrations response to the high shock loads.

GAC column #4 DO changes of GAC column #4 during high shock loads.

GAC column #4 chloride release changes during high shock loads.

GAC column pH changes during the shock loads.

PVA column #1 effluent TCP concentrations response to the low DO.

PVA column #1 DO uptake responses to the influent DO interruptions.

PVA column #1 chloride releases during and after influent DO upsets.

PVA column #1 effluent pH changes during and after influent DO upsets.

GAC column #3 TCP concentrations response to the low DO.

GAC column #3 DO uptake responses to the influent DO interruptions.

GAC column #3 chloride releases during and after influent DO upsets.

GAC column #3 effluent pH changes during and after influent DO upsets.

Biofilm formation inside the PVA beads, 9 months old (11000x).

The microcolonies inside the PVA beads, 9 months old (1500x).

The immobilized cells on GAC, 14 days old (20,000 X).

The bacteria colonization shown by slime production, GAC column #3 (16000 X).

BIOLOGICAL PERMEABLE BARRIER TO TREAT CONTAMINATED GROUNDWATER USING IMMOBILIZED CELLS

This application claims benefit of the provisional application filed Nov. 2, 1998, having Ser. No. 60/106,687.

FIELD OF THE INVENTION

This invention relates to biological permeable barriers for creating a "bio-trench" or "bio-curtain" to clean contaminated groundwater. Specifically, the present invention relates to an apparatus and method to biodegrade contaminates in groundwater as the groundwater contacts and passes through the immobilized cells of the "bio-trench" or "bio-curtain" during groundwater flow or movement.

BACKGROUND OF THE INVENTION

Today's release of the contaminants to the groundwater is increasing. With over 50% of the fresh water used in the United States coming from groundwater, contamination of this resource by xenobiotic chemicals represents a potential serious health and environmental problem. Toxicity, accumulation, and persistence of contaminants found in groundwater are just a few of the reasons for concerns.

Several methods of on-site aquifer restoration have been utilized recently to remove contaminates from groundwater. Chief among these methods are the pump and treat method in which the water is pumped out and treated, and the permeable barrier in which some type of filtering agent or reactive agent is placed in the ground to contact the contaminated water.

Conventional aquifer restoration alternatives such as pump and treat or on site remediation are not generally commercially effective for most forms of contamination. These technologies have numerous problems associated with them which include: management of large volumes of water, potential production of undesirable by-products from the reaction with the contaminate, production of waste sludge from the reaction of the filtering agent with the contaminate, the exhaustion of the filtering agent or reactive agent and need to replace it to continue treatment, undesirable effects on hydraulic characteristics in uncontaminated parts of the aquifer (change in direction of water movement), and the labor or energy intensive nature of the process.

An alternative to conventional groundwater treatment processes is the use of barriers which are permeable to water, but prevent the migration of contaminants. They are referred to as permeable barriers. In-situ permeable barriers are a relatively new cost-effective technology that can be used in groundwater remediation of shallow aquifers. Permeable barriers are installed as permanent, semi-permanent, or replaceable units across the flow path of a contaminant plume. Permeable barriers allow water to move passively through while precipitating, sorbing, or degrading the contaminants. These mechanically simple barriers may contain metal-based catalysts for degrading volatile organics, chelators for immobilizing metals, nutrients and oxygen for microorganisms to enhance bioremediation, or other agents. Degradation reactions may break down the contaminants in the plume into harmless byproducts. Crushed limestone, peat, and powdered activated carbon are also several effective barrier mediums that have been used to adsorb or precipitate contaminants.

Advantages of these barriers include the following: simple installation, simple recovery and replacement of the material, low operation maintenance, less surface disruption, less labor, and less energy are required than other remediation technologies; and comparatively quick installation and containment of contaminants.

One example of such non-biological permeable barrier is a mixture of powdered activated carbon (PAC) and sand. The PAC/sand mixture has been shown to be a successful medium for benzene removal in trench-based permeable barrier. The physical uptake of different mixtures (3% and 10%) of PAC/sand and nonabsorbent material such as sand and zeolite have been used. Another non-biological permeable barrier containing an iron-based catalyst has been used to reduce the concentration of trichloroethene (TCE) by 95% and the tetrachloroethene (PCE) concentration by 91%.

Rael evaluated possible permeable barrier media designed to remove benzene in-situ from ground water. Effectiveness of several common material including coal, powdered-activated carbon (PAC), peat, and zeolite were evaluated in a series of batch and column studies with an initial benzene concentration of 50 mg/L. Silica sand was used as an inert matrix and was mixed with PAC to produce either 3% (by weight) or 10% PAC/sand mixtures. Based on their results, a mixture of PAC and sand was considered the most successful candidate. However, these authors observed that when the barrier reached its treatment capacity it had to be replaced with fresh media. The barrier medium allowed the flow of contaminated water but adsorbed the contaminant preventing further migration. This technology is limited to the depth accessible by trenching equipment and therefore would be applicable in shallow aquifer systems of less than 30 m.

Morrison and Spangler have explored chemical barriers as a passive in-situ water-treatment system. Precipitation barriers (hydrated lime) and sorption barriers (ferric oxyhydroxide) for removing uranium from ground water were studied. Chemicals used in the barrier were placed in the subsurface either by lining a disposal site, by trench and fill, or by injection. Dissolved contaminants became part of the immobile solids of the aquifer, by either precipitation or adsorption, as the contaminated groundwater passed through the chemical barrier.

In 1991 Thomson et al. examined the concept of designing permeable barriers to remove groundwater contaminants in-situ. Permeable barriers constructed by trenching had two advantages: 1) accessibility of the medium placement and 2) ease of recovery of medium by re-excavation. Permeable barriers were classified as either passive or active. An active barrier required continuous operation and maintenance while a passive barrier required no operation or maintenance once the medium is in place. An example of active barrier, in-situ air stripper was investigated and compared with conventional packed tower air stripping. It was determined that: 1) the trench-based stripping needed high pressure air compressors, but no water pumping equipment was needed which made the operating cost less; and 2) biostimulation did occur from the oxygen, resulting in a combined air stripping and biodegradation of volatile organic contaminants.

The drawbacks of physical or chemical barriers that were mentioned above are production of waste sludge from the reaction of the filtering agent with the contaminants, the exhaustion of the filtering agent or reactive agent and need to replace it to continue treatment.

One known method to completely destroy the contaminants into the harmless by products in the water is biological degradation. Biological processes are carried out by bacterial species that are capable of using organic compounds as their carbon source. Because of numerous advantages of biological processes, bioremediation has emerged as a viable technology to use microorganisms as effective agents to remove organic compounds from groundwater. The most common approach for large-scale bioremediation has been to inject nutrients into the ground water to simulate contaminant-degrading organisms. This approach has not proven to be reliable due to biofouling the stimulated population and contaminants into contact.

Another approach, called bioagugmentation, involves the addition of bacteria and nutrients to contaminated ground water. In this approach the microorganisms are exposed to the stress conditions in the environment where they are introduced. The losses of viable microorganisms as a result of stress conditions and migration of microorganisms are the major problems with this technology. Inadequate controls over the microorganisms under specific environmental conditions limit the biological process and result in incomplete contaminant transformation.

Key requirements for success of any bioremediation process are complete detoxification of the contaminants, high removal efficiencies, and process stability and control. Known in the art is the immobilization of cells can offer stability and control for biological processes. Also known in the art is different carriers have been investigated to entrap mixed microbial cells for removal of organics from wastewater.

Cell immobilization can be defined as any technique that limits the free movement of cells. Cell mobility can be restricted by aggregating the cells or by confining them into, or attaching them to, a solid support. Historically, immobilized cells have been widely used in the wastewater treatment industry, generally through the use of undefined mixed cultures immobilized by natural flocculating tendencies or as films on solid surfaces.

Polyvinyl alcohol has proved to be a useful means of immobilization of cells. PVA-immobilization of cells is the entrapment of microorganisms within a porous polymeric matrix of polyvinyl alcohol. The porous matrix captures the microorganism cell and allows diffusion of contaminate substrates toward the cells where they can be metabolized by the cells. The matrix also permits metabolism products the pass from the entrapped microorganisms. It has been determined that entrapped microorganisms are protected against the effects of toxic chemicals compared to free cells.

Granular Activated Carbon(GAC) immobilization of cells is the attachment or adsorption of microorganisms on the surface of activated carbon. The activated carbon operates like a "buffer and depot." It protects the microorganisms and sets low quantities of toxicant for biodegradation. In contrast to a nonadsorbent material such as sand, activated carbon allows storage of substances that are difficult to biodegrade. Such storage provides a longer contact time between the microbial population and the substrates and could promote microbial acclimation and subsequent biodegradation.

Different carriers have been investigated to entrap mixed microbial cells for removal of organics from wastewater. The polymeric materials tested included cellulose triacetate (mono-carrier), polyacrylamide, K-carrageenan and a combination of cellulose triacetate and calcium alginate (bi-carrier). The mono-carrier was used to determine long term operational performance because it had better mechanical strength. The bi-carrier was more porous and more elastic than the mono-carrier. It was determined that K-carrageenan and calcium alginate were weak in mechanical strength.

Immobilized Pseudomonas sp. in alginate and polyacrylamide-hydrazide (PAAH) has been used to degrade phenol at initial concentrations of up to 2 g/L in less than two days. A sieve-like container within a fermenter held the immobilized cells in order to simulate entrapped microorganisms in a packed column. It was found that immobilization acts as a protective cover against phenol toxicity.

Biodegradation of PCP by Flavobacterium cells immobilized within polyurethane has been studied and compared PCP degradation capacities of free and immobilized cells at various initial PCP concentrations. Results showed that immobilized cells were able to degrade PCP up to a concentration of 200 mg/L, whereas free cells were unable to mineralize PCP during the four-day course of the experiment. Experiments were conducted in batch, semicontinuous batch, and continous-culture bioreactors. It was concluded that twice the amount of PCP was degraded per gram of polyurethane in the continuous-culture reactors than in the semi-continuous batch reactors. Polyurethane was determined to be an effective immobilization matrix as indicated by its protection against toxicity.

One researcher, Sofer, has studied an activated sludge of a mixed microbial population immobilized in calcium alginate gel for biodegradation of chlorophenol. Sofer was able to obtain a physically strong bead structure by optimizing the concentrations of sodium alginate and calcium chloride. The immobilized cells in Sofer's study showed the ability to degrade chlorophenol in various concentrations (up to 100 ppm).

Various methods of producing carriers for immobilizing cells have been examined by researchers. Hashimoto and Furukawa have developed a method for immobilization of activated sludge known as the polyvinyl alcohol (PVA)-boric acid method. The preparation of this method involved mixing one portion of concentrated activated sludge (mixed microbial cell population) with one portion of an aqueous PVA solution. This mixture was dropped into a gently stirred saturated boric acid solution to form spherical beads. The beads were cured in the solution for 15–24 hours and then washed with tap water. The beads produced were used to determine removal rates of total organic carbon (TOC) and total nitrogen (T-N) from a synthetic wastewater.

The method developed by Hashimoto and Furukawa does not produce PVA beads which are long lasting and which can withstand the stress and pressures presented when the PVA beads formed by the method of Hashimoto and Furukawa are formed into a permeable barrier. The Hashimoto and Furukawa method beads fracture and compress under the pressure and generally will dissolve in less than thirty (30) days. However, the PVA-boric acid method is inexpensive compared to other methods and allows operation of an immobilized cell system at 2–3 times the contaminate loading rate of conventional systems. Since activated sludge cells become surrounded by extracellular polymer, microbial activity is not reduced during the immobilization process where the pH was 4.0 for 24 hours.

Wu and Wisecarver have prepared PVA beads using a modification of the PVA-boric acid method but added a small amount of sodium alginate to prevent or minimize the tendency for the beads to agglomerate. The viability of Pseudomonas immobilized cells was demonstrated by utilizing them in a fluidized bed bioreactor for a period of two weeks. The beads were able to withstand high shears with no sign of breakage when an 8-L fluidized bed column was sparged at an air flow rate of 1.4 L/min.

Kindzierski investigated the use of activated carbon and two other synthetic ion-exchange resins as support materials for an anaerobic phenol-degrading microorganisms. Rapid adsorption of phenol on activated carbon without bacteria occurred over the first 33 minutes. The adsorption of phenol on activated carbon with bacteria was 3.9 times smaller than on activated carbon without bacteria. Kindzierski demonstrated that activated carbon exhibited favorable qualities as a biological support for the rapid development of attached biomass. Also, a substantial decrease in the rate of phenol adsorption by activated carbon due to the colonization of the bacteria was observed.

Ehrhardt and Rehm studied the adsorption of phenol as well as Pseudomonas sp. and Candida sp. on activated carbon, and the phenol degradation by these immobilized microorganisms was compared to that of free microorganisms. They observed that one gram of activated carbon adsorbed $4 \times 10E9$ Pseudomonas cells and $3 \times 10E8$ Candida cells in about 10 hours. Results of the degradation studies showed that free cells did not tolerate more than 1.5 g/L phenol, while the immobilized microorganisms survived at temporary 2.0 hour of high phenol concentrations up to 15 g/L, and they ultimately degraded about 90% of the adsorbed phenol.

Ehrhardt and Rehm (1989) studied phenol degradation in a semi-continuous and continuous reactor by *Pseudomonas putida* P8 adsorbed on activated carbon. They stated that phenol introduced into the reactor was initially removed from the media by a combination of degradation and adsorption. As the biomass in the reactor increased, adsorption decreased and the degradation rate increased. They were able to show that immobilized cells on activated carbon can tolerate high concentration of phenol up to 15 g/L. They concluded that protection in the activated carbon system was afforded by adsorption of phenol onto the immobilization substrate, which reduced the aqueous concentration to which the organisms were exposed. As the phenol in solution was degraded, desorption occurred, allowing the organisms to metabolize the substrate released from the carbon.

The polymeric materials tested included cellulose triacetate (mono-carrier), polyacrylamide, K-carrageenan and a combination of cellulose triacetate and calcium alginate (bi-carrier). The mono-carrier was used to determine long term operational performance because it had better mechanical strength. The bi-carrier was more porous and more elastic than the mono-carrier. It was determined that K-carrageenan and calcium alginate were weak in mechanical strength. It is also known in the art that in contrast to a nonadsorbent material such as sand, activated carbon allows storage of substances that are difficult to biodegrade. Such storage provides a longer contact time between the microbial population and the substrates and could promote microbial acclimation and subsequent biodegradation.

The invention has advantages over the prior art in that, (1) it can reduce organic contaminants into harmless by-products by using immobilized cells; (2) it has demonstrated continuous high stability and control under many different operating conditions than previous methods; (3) it provides a very cost effective process for treatment of contaminated groundwater; (4) it has demonstrated high tolerance against environmental stresses.

The present invention solves or substantially reduces in critical importance problems in the prior art by providing a biological processes that uses immobilized cells system to treat contaminated groundwater efficiently and cost-effectively. Known in the art that immobilized cells can limit the movement of microorganisms and protect them against environmental stresses.

OBJECTS OF THE INVENTION

The present invention encompasses a method of providing a biological permeable barrier comprising a permeable barrier of encapsulated microorganisms having an affinity for a contaminate that is polluting a water supply. The invention provides decontamination of a water supply, such as a groundwater, by allowing the groundwater to flow through the biological permeable barrier comprising an encapsulated microorganism so that the microorganism selected for use in the permeable barrier can biodegrade the contaminate. During the biodegradation the microorganism converts the contaminate into a less harmful or non-harmful moiety.

This invention entails immobilizing microbial organisms which are acclimated to the target contaminants in unique immobilized systems. Immobilization is key to the ability of this process to concentrate a large active bacteria mass for treatment of contaminated water. This superior ability to concentrate active bacterial mass in the barrier offers considerable benefits to the performance of the barrier.

Entrapped or encapsulated cells are shielded from their surroundings while the target pollutants still can flow into the supports and be metabolized there. Immobilization can be a form of biocontainment since it provides a way to control the spreading of recombinant cells in the environment. Additionally, the immobilization of high cell densities in compact reactors results in enhanced biodegradation rates when compared to conventional systems. Since such a system is much less dependent on the growth rates of the microorganisms involved, short retention times can be applied and thus high removal rates attained. These characteristics make the use of the immobilized cells systems particularly attractive for the treatment of groundwater and aquifers heavily contaminated with toxic, relatively soluble pollutants.

The present invention is demonstrated by immobilizing microorganisms on example carrier materials or matrices. One example is a polyvinyl alcohol (PVA) carrier material to produce PVA-immobilized cells. A second example of a suitable carrier material is Granular Activated Carbon (GAC) which is used to provide GAC-immobilized cells. Both the PVA-immobilized cells and the GAC-immobilized cells were then formed into biological permeable barriers to clean up groundwater which had been spiked or contaminated with trichlorophenol (TCP).

The present invention thereby fulfills the following objectives: providing a biological permeable barrier media comprising a carrier material and a microorganism suitable to biotransformation of a contaminate in groundwater; providing a biological permeable barrier media which is easy to operate and lower in cost than previously used methods of treating contaminated groundwater.

In the example embodiments of the invention, described hereinafter, biodegradation of 2,4,6 trichlorophenol (TCP) is demonstrated using polyvinyl alcohol (PVA)-immobilized cells and granular activated carbon (GAC)-immobilized cells as biological permeable barrier media. A variety of conditions such as different flow rates and different contaminant influent concentrations were used to compare these to embodiments on the basis of removal efficiency, relative ease of operation, and capital cost.

The following detailed description of the present invention on two embodiments demonstrates the substantial improvement of the present invention over the prior art methods. In addition the following important operational benefits are provided by the present invention such as no precipitation of solid contaminates, no need to replace the barrier, no need to remove the barrier once it has been in operation due to collection of contaminates, no by-product contaminates are produced, complete detoxification of the contaminate can be obtained, low operation cost and maintenance cost of the barrier is presented, no sludge is produced which must be removed from the site and destroyed and no hazardous waste is produced.

The foregoing and other objects are not meant in a limiting sense, and will be readily evident upon a study of the following specification and accompanying drawings comprising a part thereof. Other objects and advantages of this invention will become apparent from the following description taken in connection with the accompanying drawings, wherein is set forth by way of illustration and example, an embodiment of this invention.

It is a principal object of the present invention to provide unique media to immobilize microbial organisms that are acclimated to the target contaminants.

It is another object of this invention to provide an economical and environmentally safe process to biodegrdate organic compounds in contaminated groundwater. The method involves the entrapment of active microorganisms into a media that would provide controlled environment for their attachment and growth.

A further object of the invention is to provide a very stable and efficient process to treat contaminated groundwater by using immobilized cells without formation of any harmfull by-products.

These and other objects of the invention wil become apparent as a detailed description of representative embodiments proceeds.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DETAILED DESCRIPTION

Figure 1:
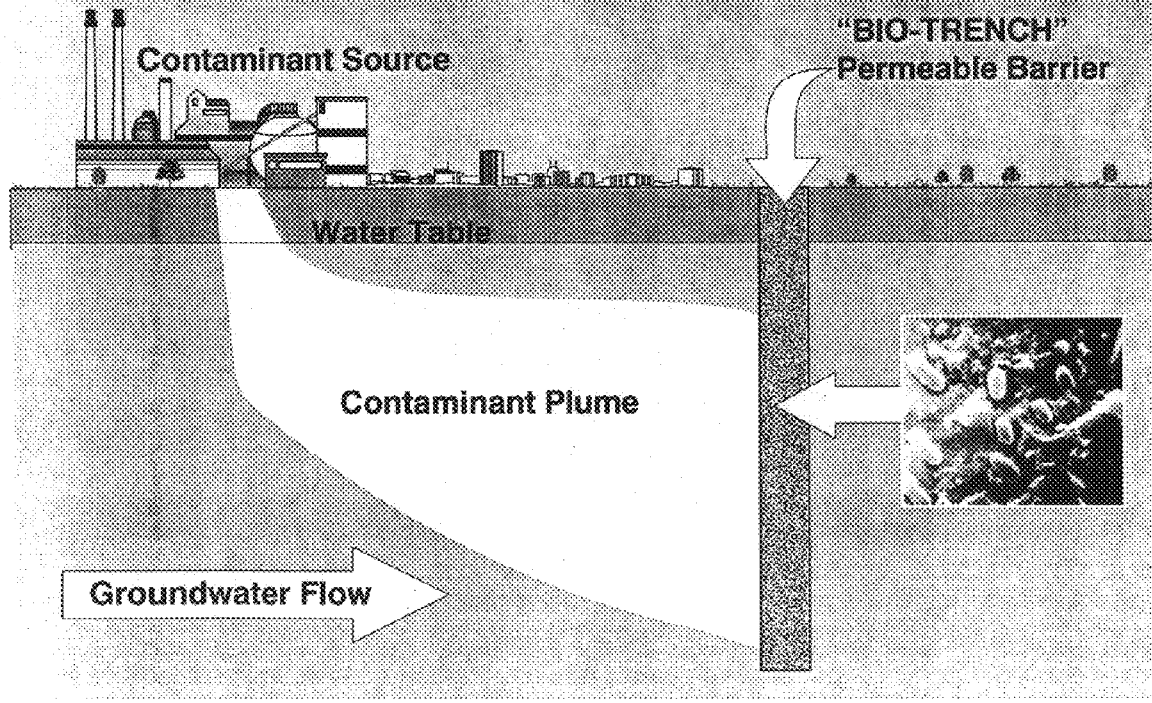
FIG. 1 is a schematic representation of a biological permeable barrier placed to intercept underground water for treatment by immobilized cells.

In general the present invention comprises a biological permeable barrier comprising a microorganism that is immobilized on a carrier material, or matrix, to provide biotransformation of a contaminate molecule or substance contained in groundwater. The groundwater can be treated with the permeable barrier in-situ or it can be treated by removal of the groundwater from the ground and allowing the groundwater to flow across the biological permeable barrier of the invention. In the case of in-situ treatment, the groundwater is allowed to flow across the biological permeable barrier of the invention by excavating a hole or trench in the ground to intercept the direction of flow of the groundwater and filling the hole or trench with the biological permeable barrier having a microorganism immobilized thereon which is capable of biotransformation of the contaminate in the groundwater.

The microorganism is immobilized on a solid or semi-sold carrier material or matrix which provides structure and stability to the microorganism colonies. The carrier material or matrix can be of any suitable material which provides a surface to which the microorganism colonies can attach and grow. The carrier material or matrix need not provide any nutrients for the microorganism. Typically, suitable carrier materials provide a convolute structure having clefts or holes or tunnel spaces in which the microorganism can take hold and be somewhat protected from exposure to the contaminate. In this manner the microorganism can tolerate contact with much higher concentrations of the contaminate than would be possible when the microorganism is directly presented with the contaminate.

A further feature of the carrier material is that it also provides a physically resilient structure for the microorganism and allows the cell colony to be placed in a trench or a test column for experiments without causing compression and damage to the microorganism colonies. Two embodiments of the biological permeable barrier were prepared and used to demonstrate the effectiveness of the barrier on a contaminate. The contaminate selected for these examples of the invention was 2,4,6 trichlorophenol (TCP). TCP is widely used and has been determined to be carcinogenic. The aerobic degredation of pathway involves the dehogenation or degredation of TCP to dichlorophenol to 4-chlorophenol, which in turn produces 1,2,4-benzenetriol, and finally a mixture of polyquinoid acids. A microorganism was selected which had received previous exposure to higher than normal environmental concentrations of TCP and the microorganism was immobilized on two different carrier media: a polyvinyl alcohol bead (PVA beads); and granulated activated carbon (GAC). Groundwater was obtained from a well located in Lincoln County; Oklahoma was used to test the two embodiments of the biological permeable barrier. The groundwaterwas initially analyzed by the State of Oklahoma, Department of Environmental Quality, Water Laboratory, and the total organic carbon was analyzed by The Stover Group, Analytical/Toxicology Laboratories, Stillwater, Okla. The groundwater analysis is given below in Table 1.

TABLE 1

Groundwater Analysis

| Parameter | Concentration | EPA Method 40 CFR Part 136 |
| --- | --- | --- |
| Specific Conductance | 1045.7 mhos/cm | 120.1 |
| pH | 7.9 std unit | 150.1 |
| Alkalinity (total) | 237.3 mg/L | 310.2 |
| Solids (total dissolved) | 515.1 mg/L | 160.1 |
| Nitrite-Nitrate as N | 0.5 mg/L | 353.2 |
| Hardness (total) | 106.9 mg/L | 130.1 |
| Chloride | 143.9 mg/L | 325.2 |
| Sulfate | 32.9 mg/L | 375.2 |

Activated sludge containing microorganisms was obtained from the Georgia-Pacific Leaf River Pulp Mill, New Augusta, Miss. The activated sludge was obtained from the recirculation line where there is a high cell concentration. The mill operation included a bleaching process which would unintentionally produce some chlorophenols. The microorganisms from this mill were assumed to have had some exposure to chlorophenols which would allow quicker acclimation for the purpose of this project. The microorganisms were further acclimated by feeding them TCP (10 mg/L) as their sole carbon source with continuous aeration and additional nutrients consisting of a phosphate buffer solution, a magnesium sulfate solution, a calcium chloride solution, and a ferric chloride solution. One mL of each of the following nutrient solutions was added to each liter of (13 liter volume) activated sludge every day which provided the microorganisms the weight ratio of C:N:P of 100:18:188:

Phosphate buffer solution.

8.5 g $KH_2PO_4$, 21.75 g $K_2HPO_4$, 33.4 g $Na_2HPO_4 \cdot 7H_2O$, and 1.7 g $NH_4Cl$ dissolved in distilled water and diluted to 1 liter.

Magnesium sulfate Solution.

22.5 g $MgSO_4 \cdot 7H_2O$ dissolved in distilled water then diluted to 1 liter.

Calcium chloride solution.

27.5 g $CaCl_2$ dissolved in distilled water and diluted to 1 liter.

Ferric chloride solution.

0.25 g $FeCl_3$, $6H_2O$ in distilled water and diluted to 1 liter.

A standard ratio of the weights of carbon (C), nitrogen (N), and phosphorous (P), was used to ensure that microorganisms in the activated sludge were receiving minimal amounts of nutrients and carbon for growth. The carbon source for microorganisms is TCP. The activated sludge was centrifuged using an international Equipment Co. Clinical Centrifuge for 10 minutes at 4000 rpm to obtain biomass for immobilization into polyvinyl alcohol and granular activated carbon.

Preparation of Polyvinyl Alcohol (PVA) Beads Having Immobilized Cells

Distilled water was added to 43.7 g of PVA to obtain a 330 mL solution. The solution was heated to 60 degree C while stirring constantly until the PVA was dissolved. A 3.5 mL volume of a 1–3% sodium alginate solution was added to the PVA solution. The PVA-sodium alginate solution was cooled to 35 degree C. The centrifuged cells (43.7 g wet weight) and 10 mLs distilled water mixed with 1.3 mLs of nutrient medium were added to the cooled PVA-sodium alginate solution and stirred thoroughly. The solution was then drawn through tygon tubing (ID 3.1 mm) by a peristaltic pump (Cole-Parmer 7553-30) and extruded through a tubing connector with a 1.0 mm diameter opening inserted into the end of the tubing. As droplets formed, they fell into a gently stirred boric acid solution to form beads. The beads were cured in the gently stirred boric acid solution for 24 hours. The beads were then rinsed and soaked thoroughly in distilled water several times to remove all of the boric acid solution from the beads. The PVA beads were prepared using this method produced porous, rubber-like, elastic beads for the purpose of immobilizing cells and using them as a biological permeable barrier medium. A bed of beads was characterized with its density, porosity, permeability, and compressibility or deformation.

Preparation of GAC-Immobilized Cells/Silica Sand

GAC was washed with distilled water several times and dried completely in 103° C. oven before use. A portion of activated sludge, from the continuously maintained batch culture, was centrifuged at 4000 rpm for 10.0 minutes to obtain the desired amount of biomass (wet weight). The amount of biomass used for immobilization on both permeable barriers (GAC and PVA beads) was 43.7 grams for short columns and 86.0 grams for the long columns. The amounts of GAC for short and long column were 21.0 and 10.5 grams, respectively, for the 3% mixture of GAC/sand. The biomass and GAC were then agitated vigorously in 100 mLs distilled water for 24 hours. The GAC that settled by gravity was mixed with sand and used in column studies (3% GAC/sand mixture). Silica sand was washed with distilled water and oven dried at 103° C. separately. The two materials were then blended to achieve the desired weight ratio.

Physical Characteristics of PVA-immobilized Cells and GAC-immobilized Cells

The physical characteristics of PVA-immobilized cells and GAC-immobilized cells/sand were determined prior to evaluation of these media as biological permeable barriers. Table 2. Summarizes the physical characteristics of both PVA and GAC immobilized cells systems.

TABLE 2

Characteristics of PVA Beads and Mixture of (3%) GAC/Silica Sand

| Parameter | Packed Bed of PNA Beads | Packed Bed of (3%) GAC/Sand |
| --- | --- | --- |
| pH | 8.1 | 8.1 |
| Specific Gravity | 1.008 | 1.63 |
| Density () (g/cm$^3$) | 0.987 | 1.62 |
| Porosity (%) | 25 | 30 |
| Permeability Coefficient (K) (cm/s) | 0.1425 | 0.0162 |
| Compressibility Index ($C_c$) (m$^2$/kN) | 4.08 × 10$^{-3}$ | 2.87 × 10$^{-5}$ |
| Particle Size (mm) | 3.8 | 0.4 |
| Soil Classification | uniform rounded fine gravel | Uniform rounded medium sand |

Table 2. Characteristics of PVA Beads and Mixture of (3%) GAC/Silica Sand

Evaluation of PVA and GAC Immobilized Cells as Biological Permeable Barriers

Since successful application of any biological permeable barrier requires complete characterization of the medium under variety of operating condition and aging conditions, column studies were conducted for over 240 days of continuous operation. The present invention proposes a method of use of PVA-immobilized cells and 3% GAC-immobilized cells/sand mixture as two novel candidates for biological permeable barrier media to biodegrade contaminated groundwater.

Therefore the following column studies were designed to account for any significant changes in removal efficiency of these biological permeable barriers due to hydraulic retention time, applied loading, availability of dissolved oxygen and nutrient availability.

Table 3. Summarizes the eight different operating conditions to simulate biodegradation of TCP contaminated groundwater using PAV and GAC immobilized cells as biological permeable barriers. A total of four acrylic columns were set up as aerobic, continuous flow packed-bed reactors. Columns #1 and #2 consisted of 10 and 20-cm beds of PVA-immobilized cells beads (3–5 mm), Columns #3 and #4 consisted of 10 and 20-cm beds of 3% GAC immobilized cells and 97% clean silica sand. These columns had an inside diameter of 5.0 cm. A 5.0 cm diameter 200-sieve mesh copper screen was placed at the top and bottom of each of the columns. The groundwater was spiked with TCP to provide the various TCP concentrations used during these studies and was prepared in 25.0 liter bottles and covered to prevent photolytic degradation.

Figure 2:
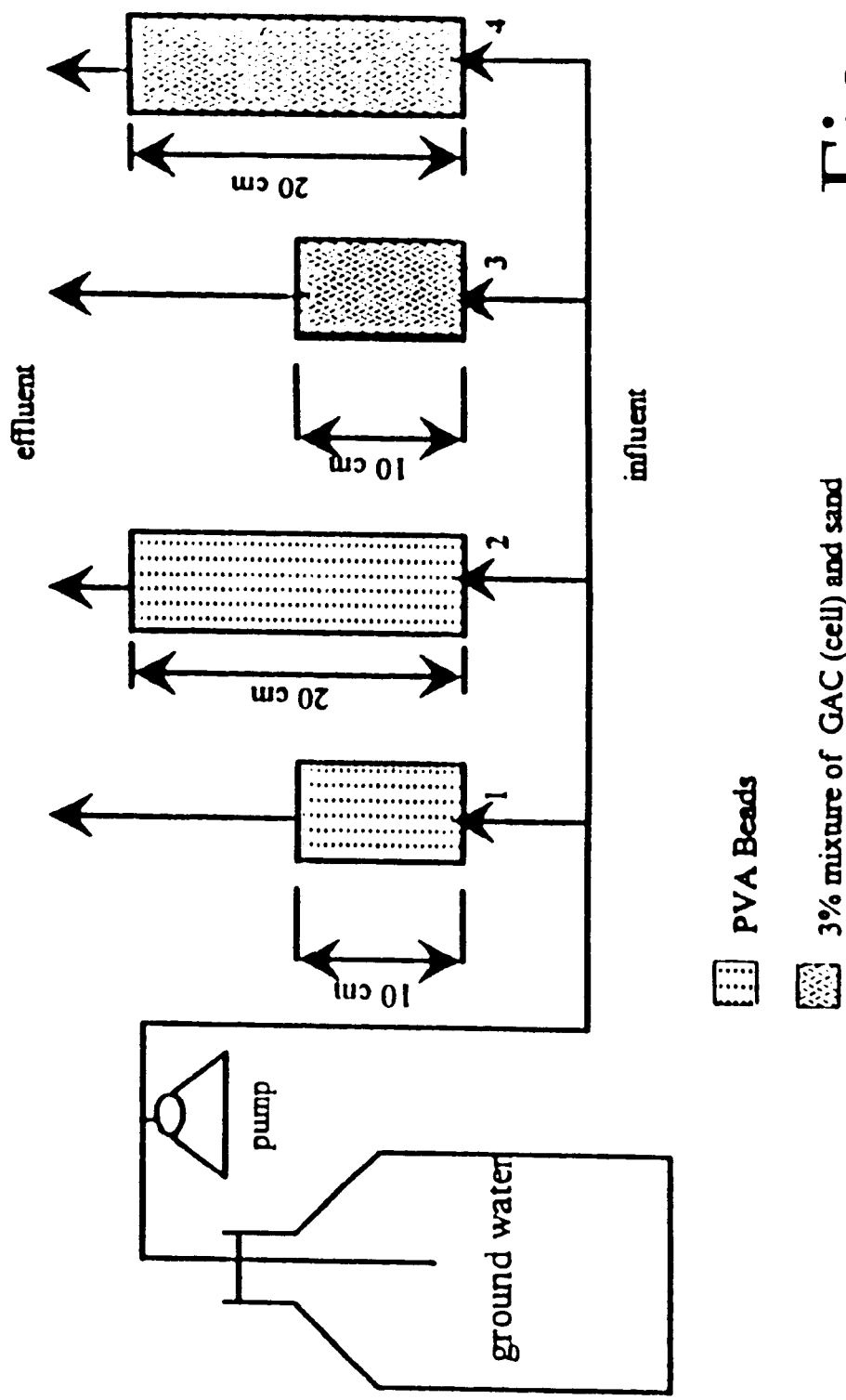
FIG. 2 is a schematic representation of a small biological permeable barrier (column) placed above ground for treatment of contaminated groundwater
Figure 3:
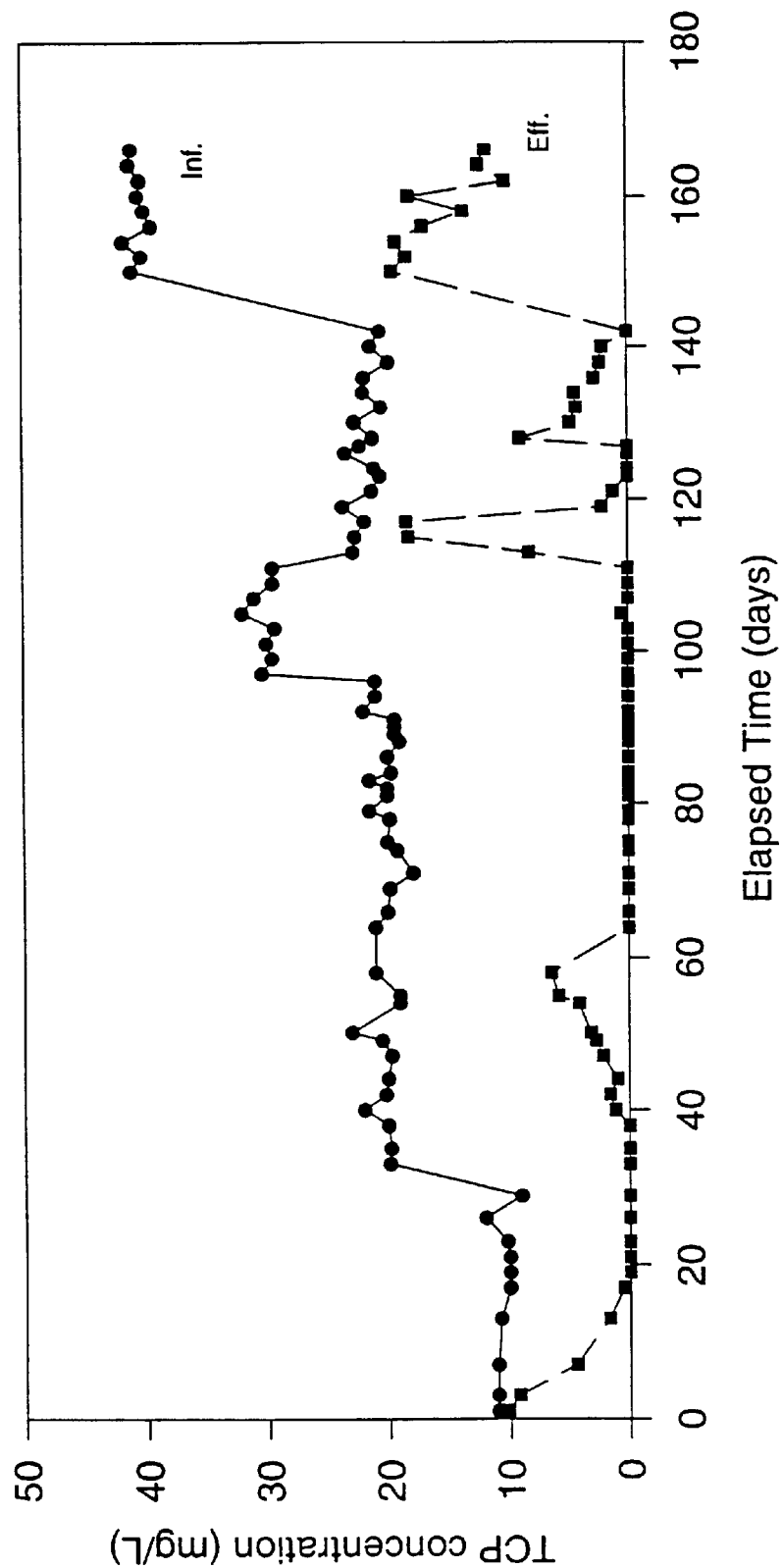
FIG. 3 is a graph showing TCP removal by PVA on Column 1.
Figure 4:
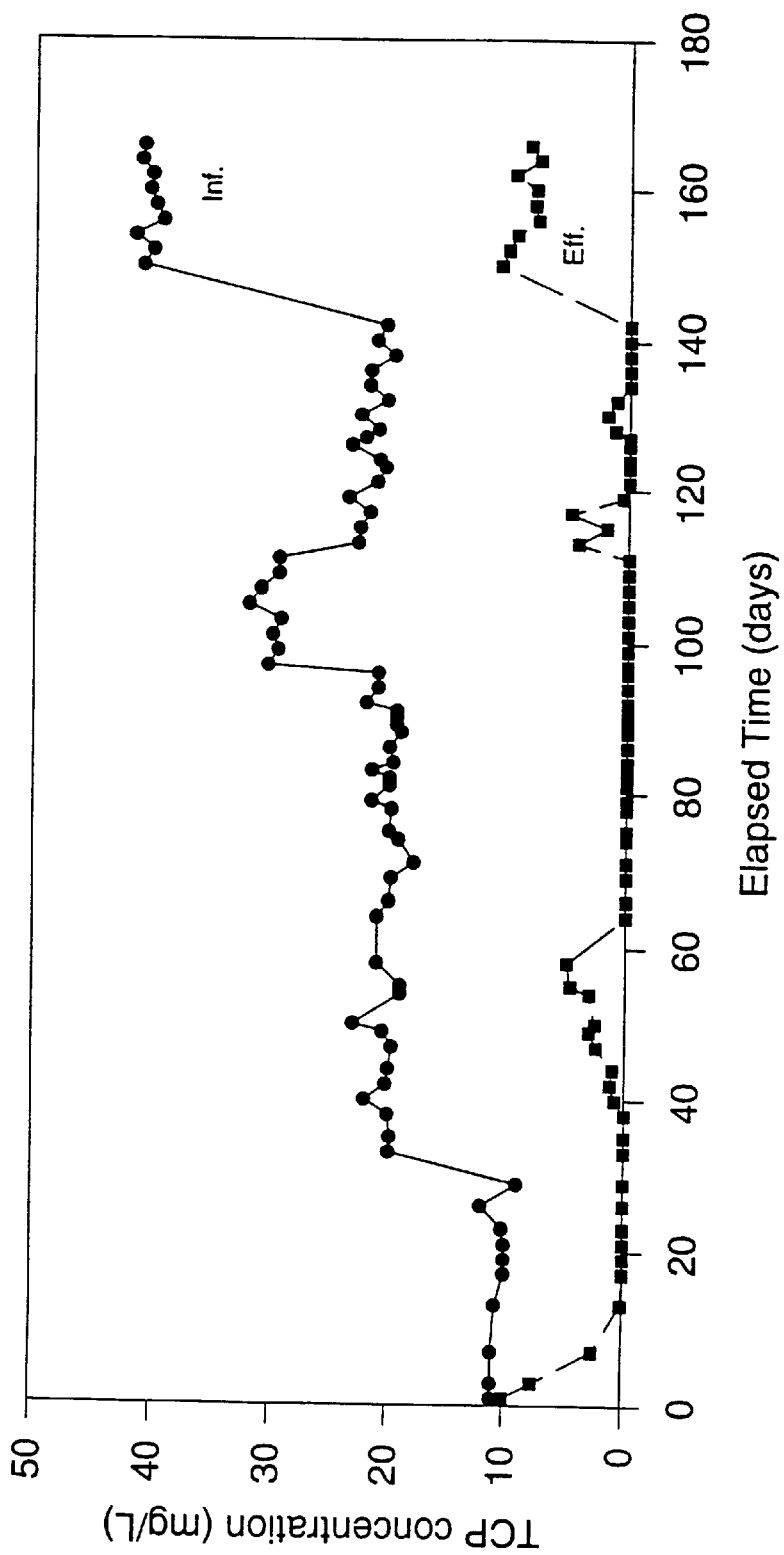
FIG. 4 is a graph showing TCP removal by PVA on Column 2.
Figure 5:
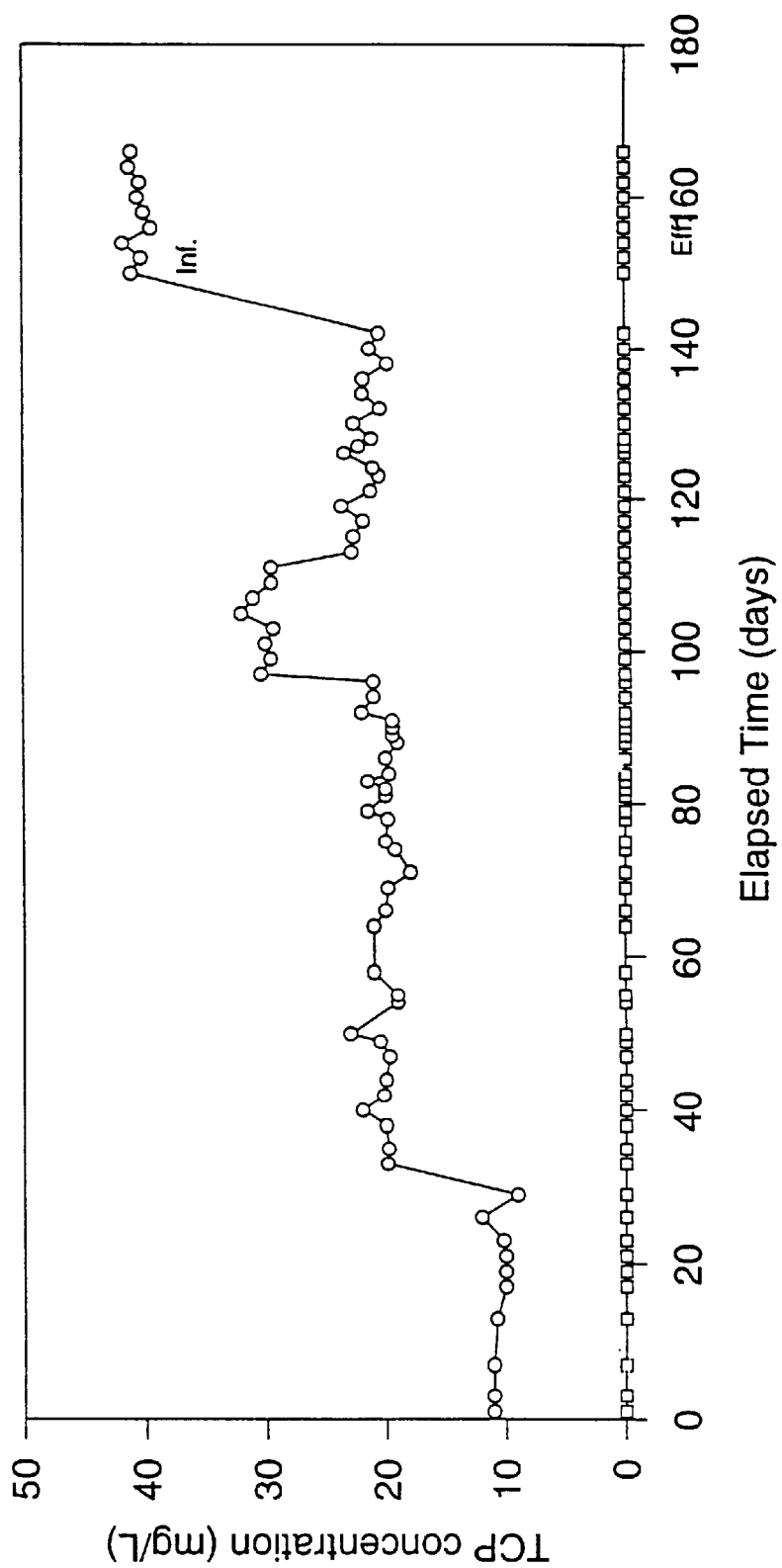
FIG. 5 is a graph showing TCP removal by GAC on Column 3.
Figure 6:
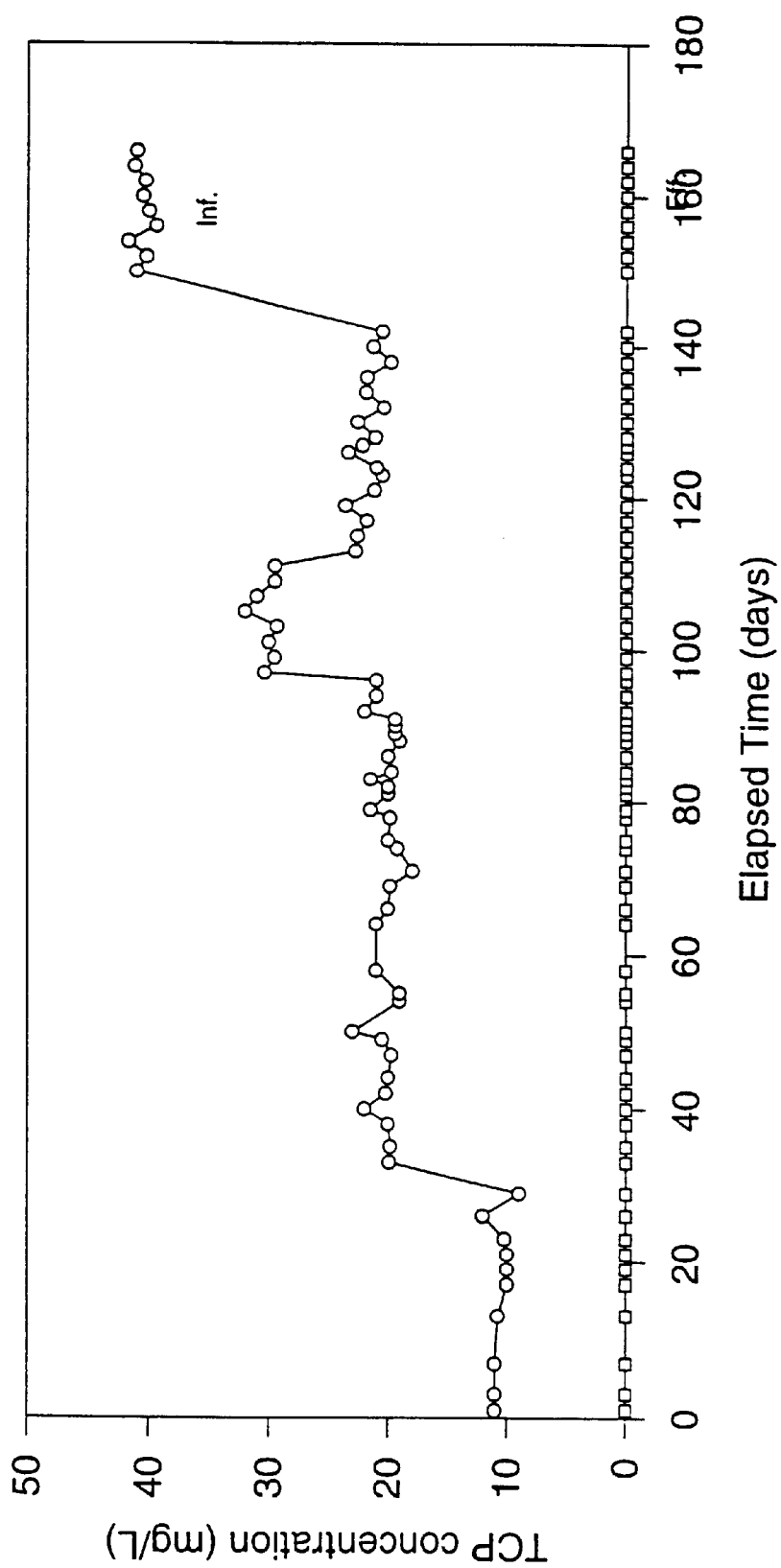
FIG. 6 is a graph showing TCP removal by GAC on Column 4.
Figure 7:
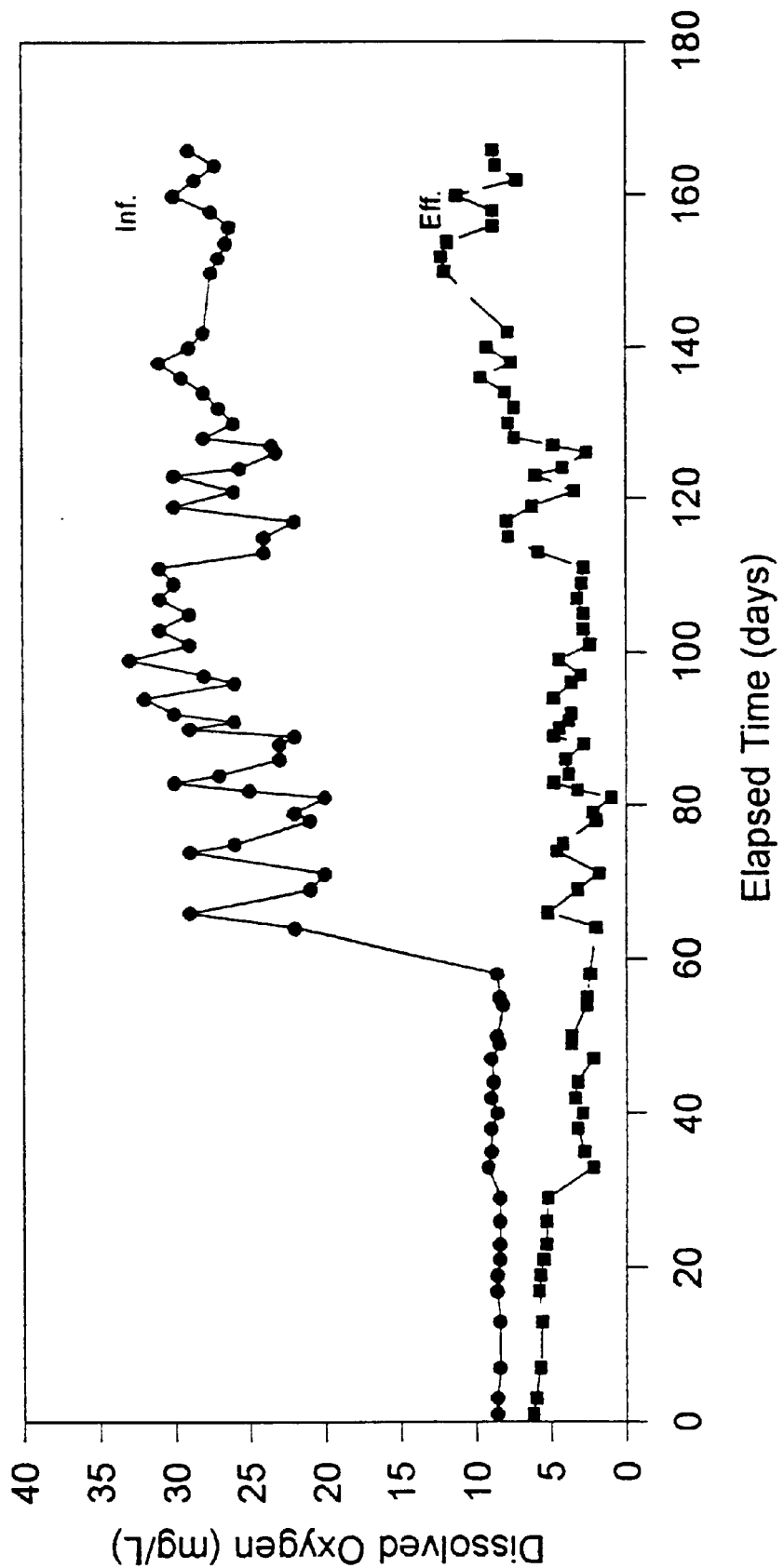
FIG. 7 is a graph showing dissolved oxygen uptake by PVA on Column 1.
Figure 8:
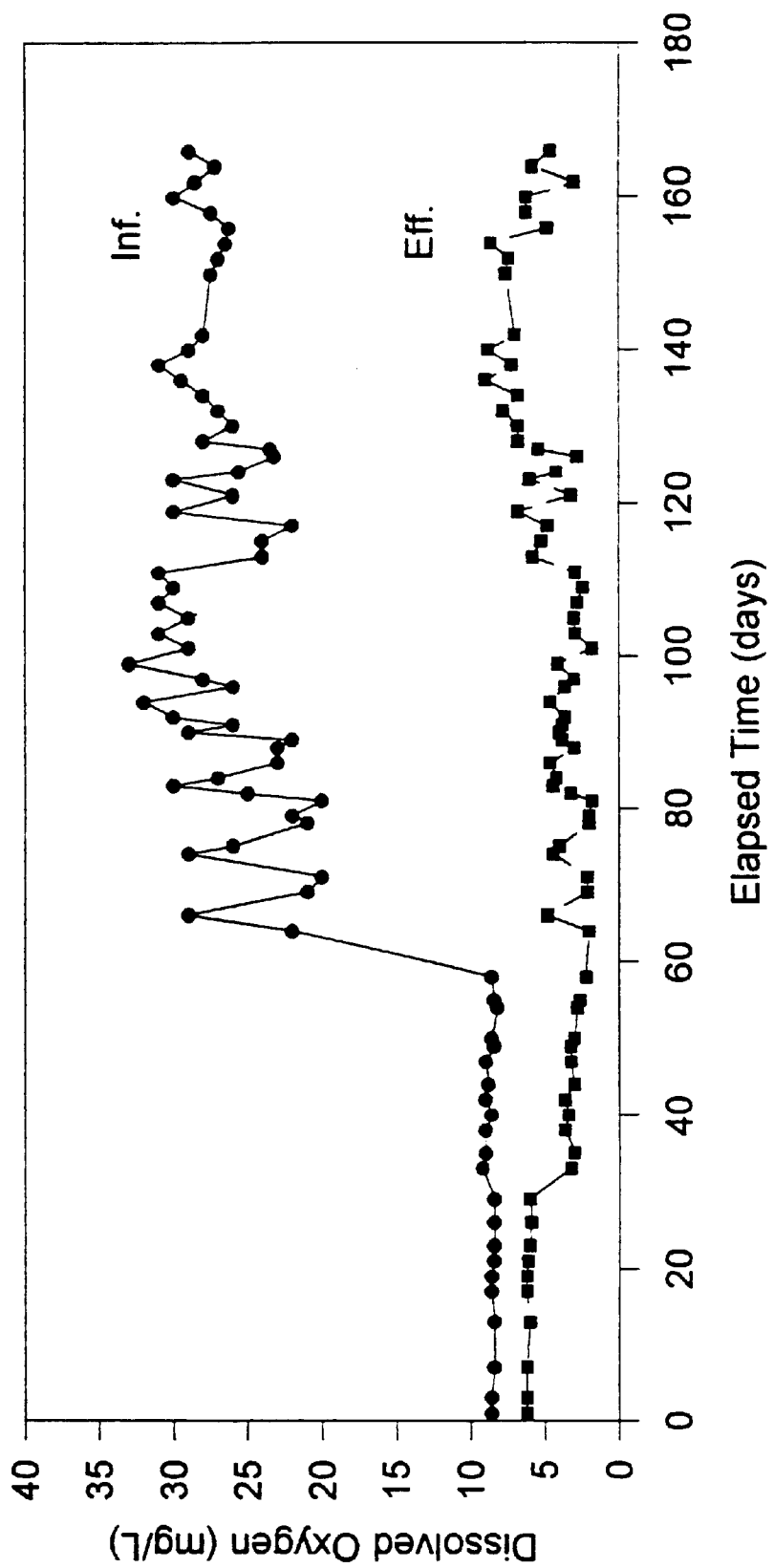
FIG. 8 is a graph showing dissolved oxygen uptake by PVA on Column 2.
Figure 9:
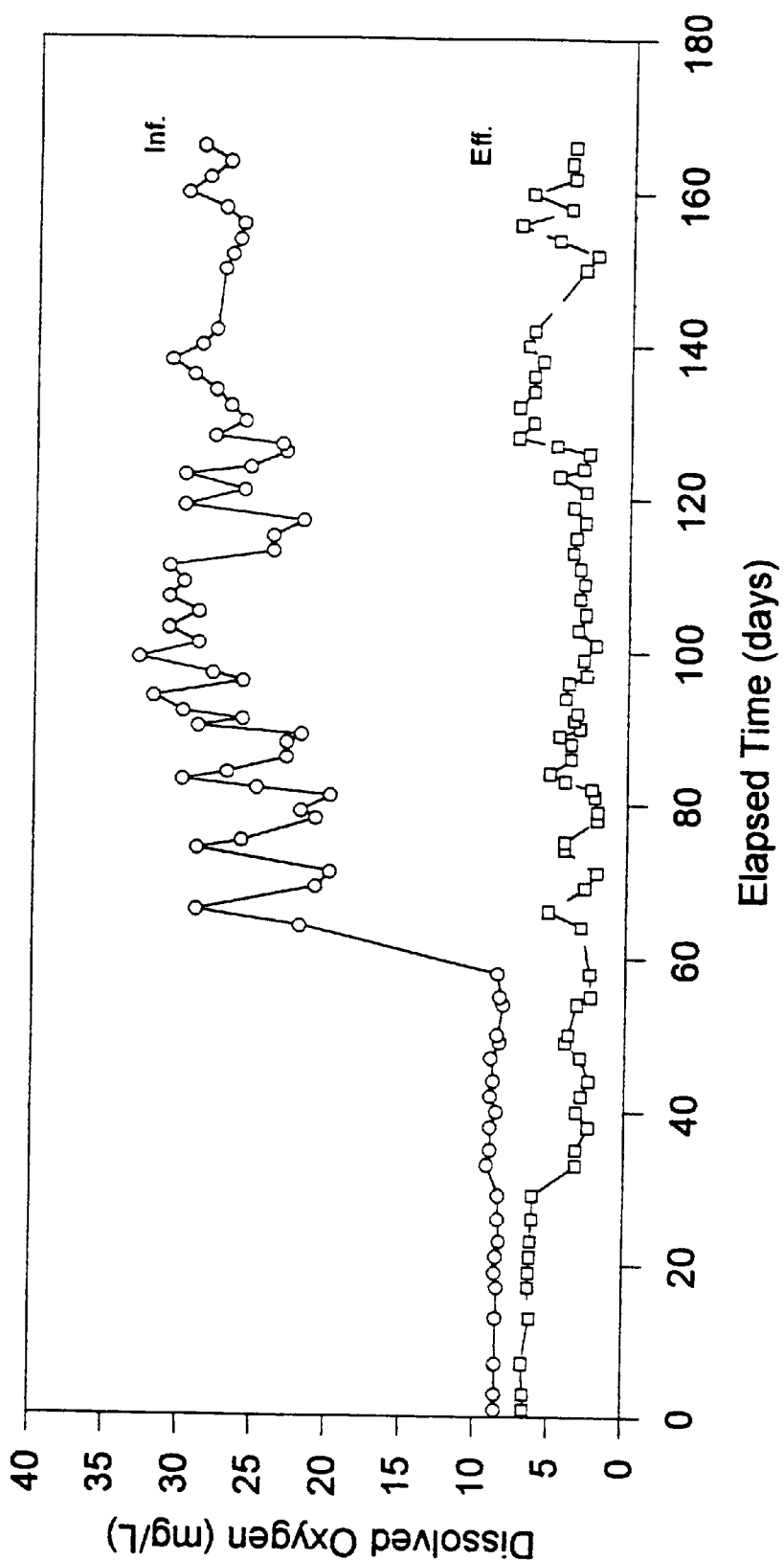
FIG. 9 is a graph showing dissolved oxygen uptake by GAC on Column 3.
Figure 10:
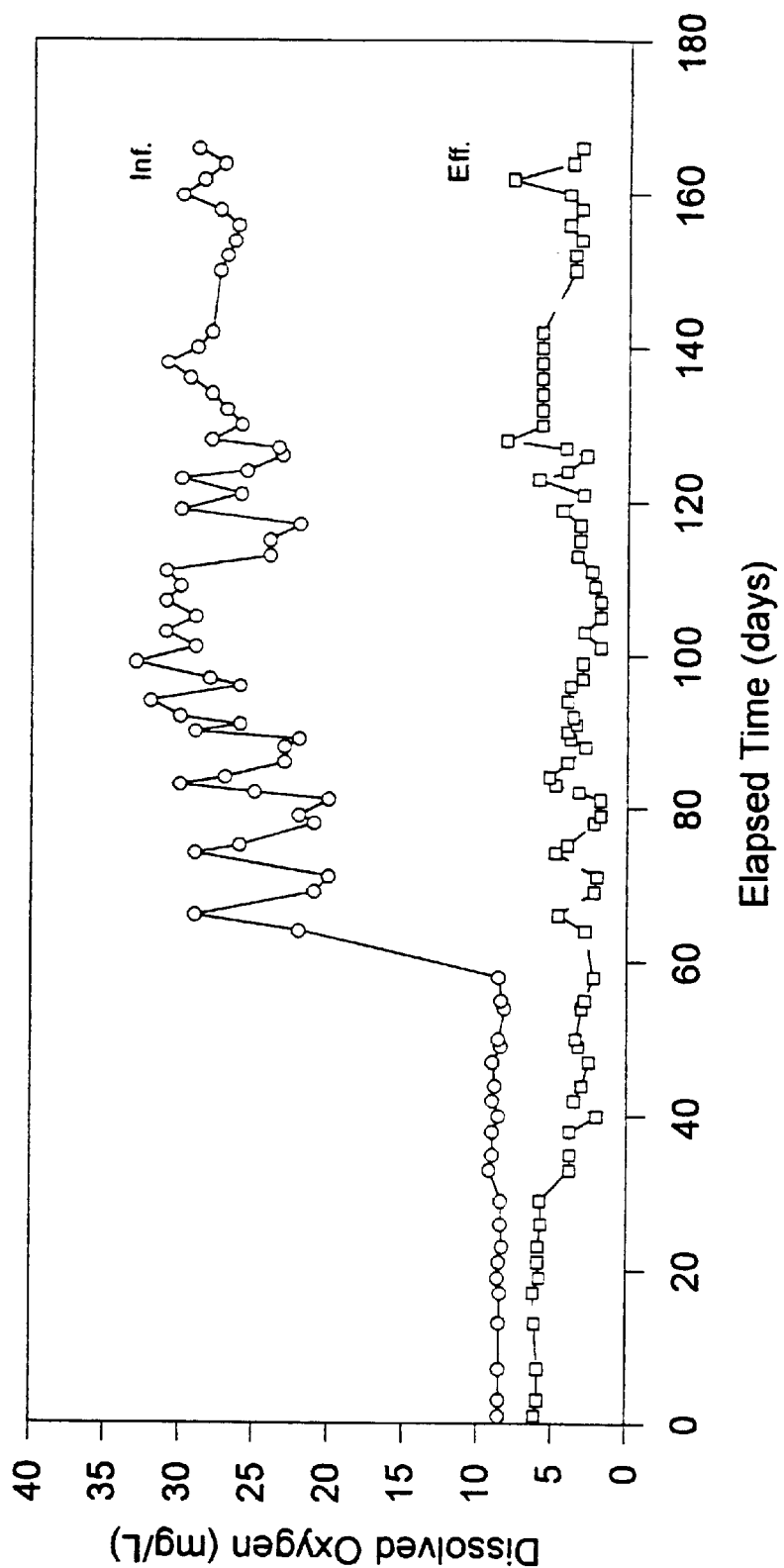
FIG. 10 is a graph showing dissolved oxygen uptake by GAC on Column 4.
Figure 11:
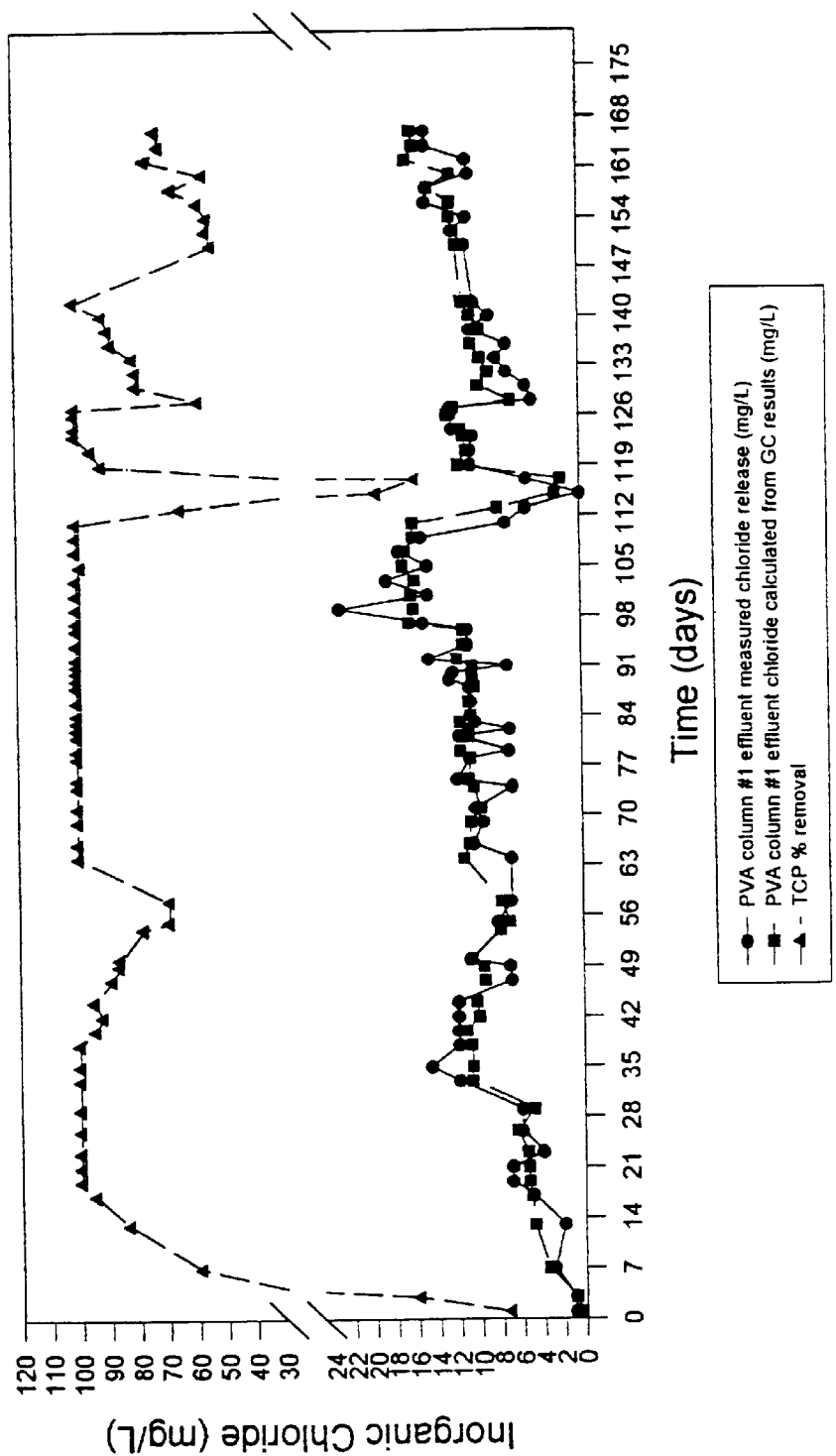
FIG. 11 is a graph showing a comparison of the percent removal of TCP by PVA Column 1, as measured and calculated from gas chromatograph.
Figure 12:
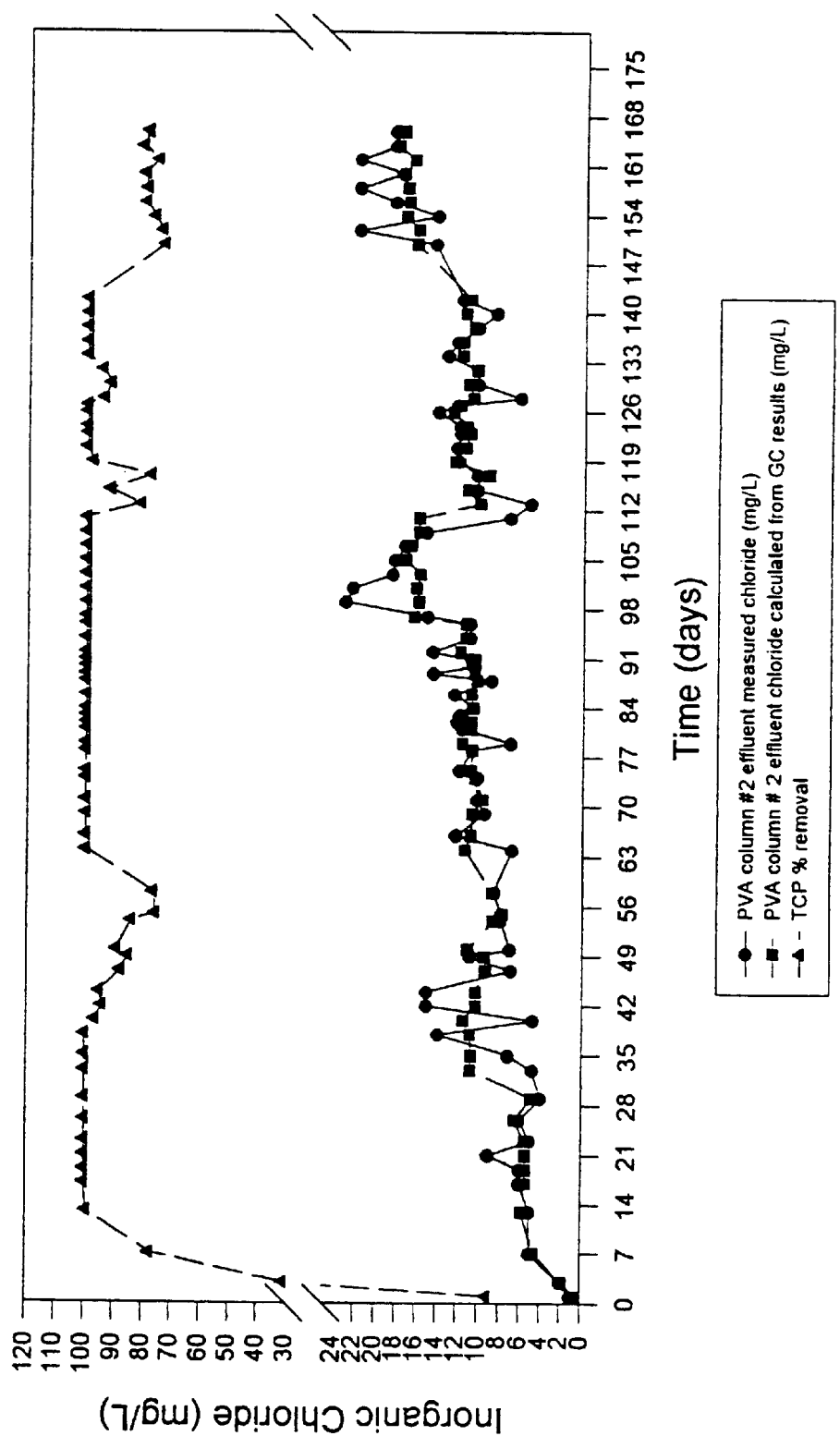
FIG. 12 is a graph showing percent TCP removal by PVA on Column 2, as measured and calculated from gas chromatograph results.
Figure 13:
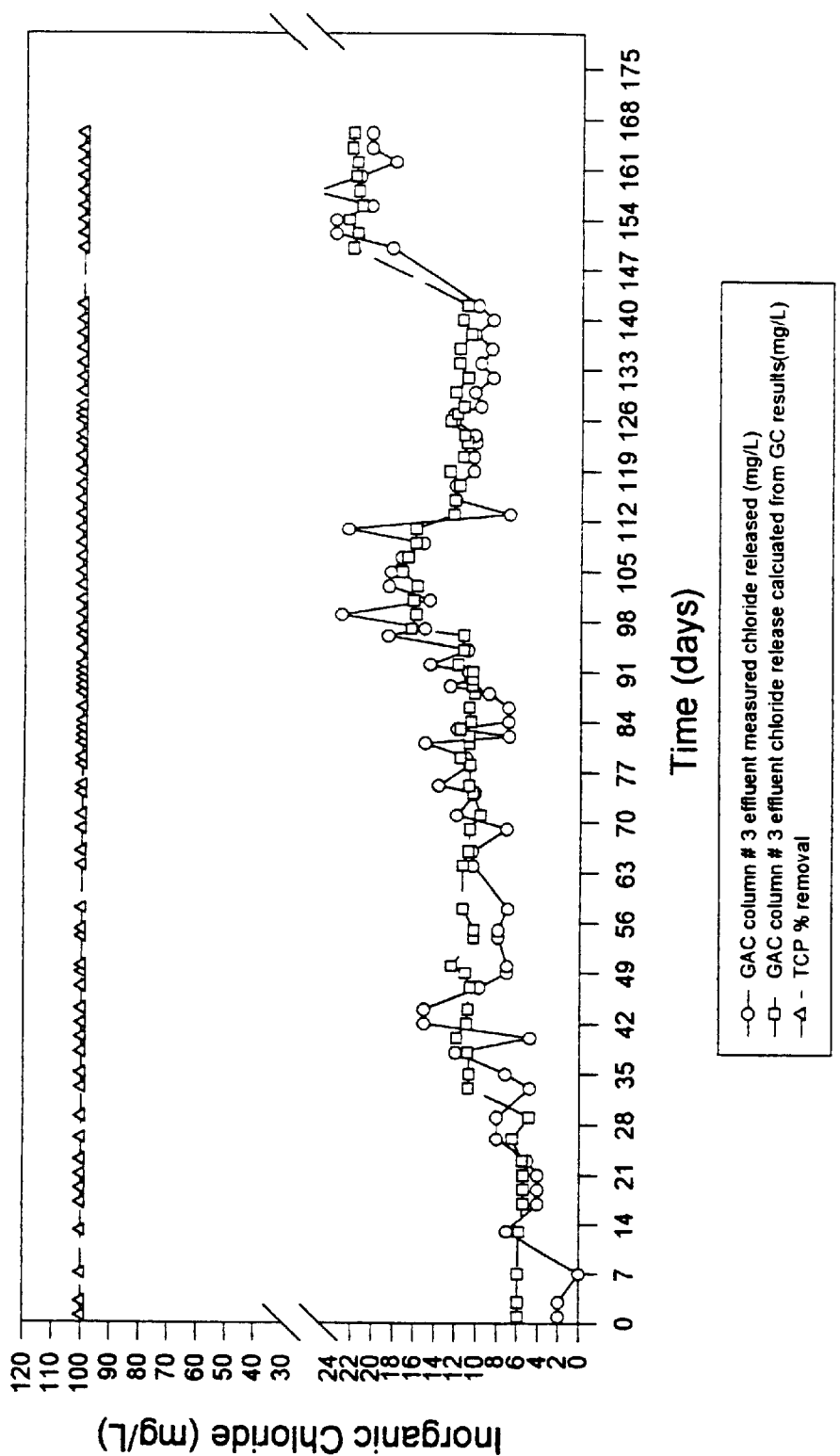
FIG. 13 is a graph showing a comparison of percent TCP removal by GAC Column 3, as measured and calculated from gas chromatograph results.
Figure 14:
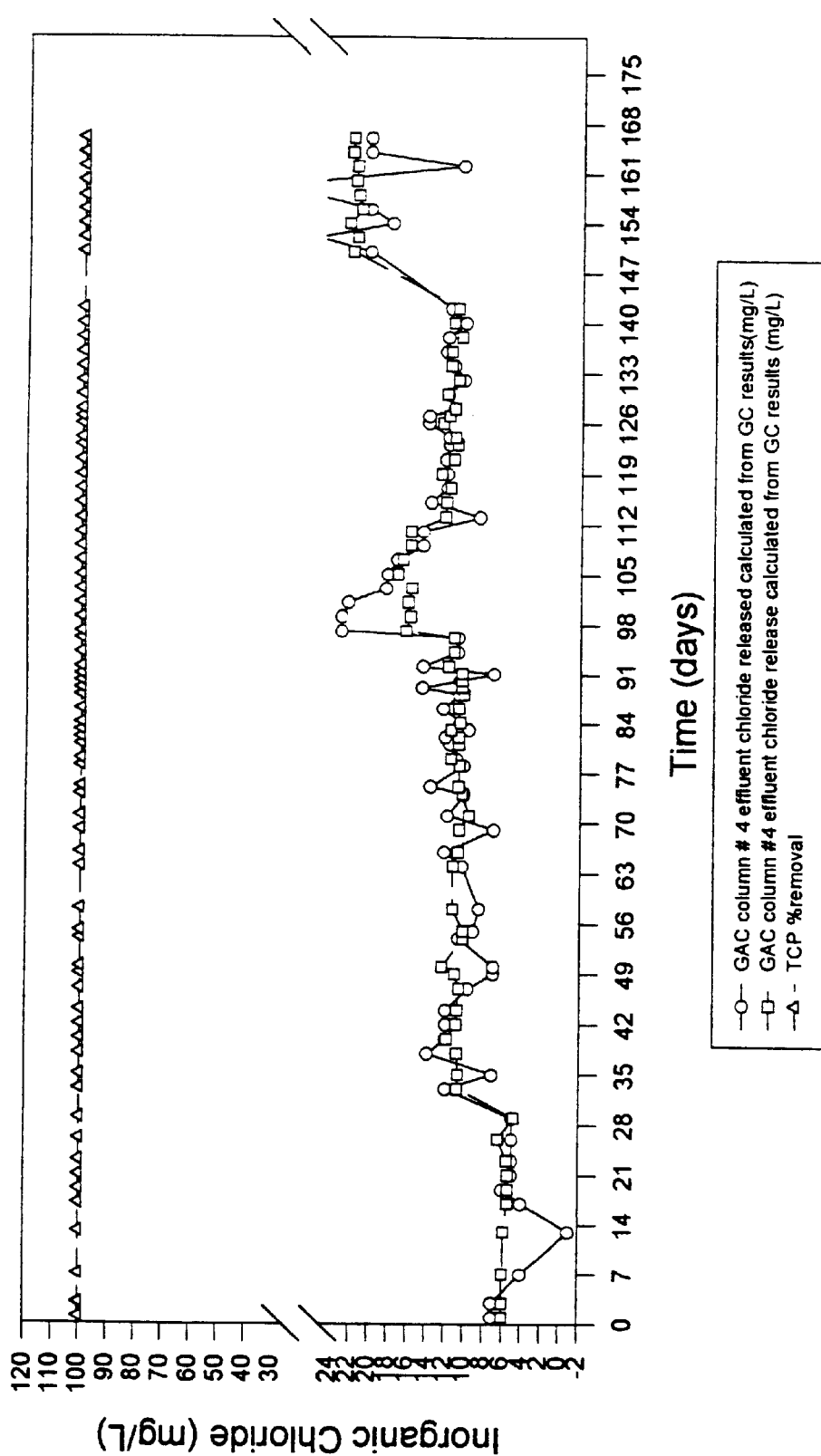
FIG. 14 is a graph showing percent TCP removal by GAC Column 4, as measured and calculated from gas chromatograph results.
Figure 15:
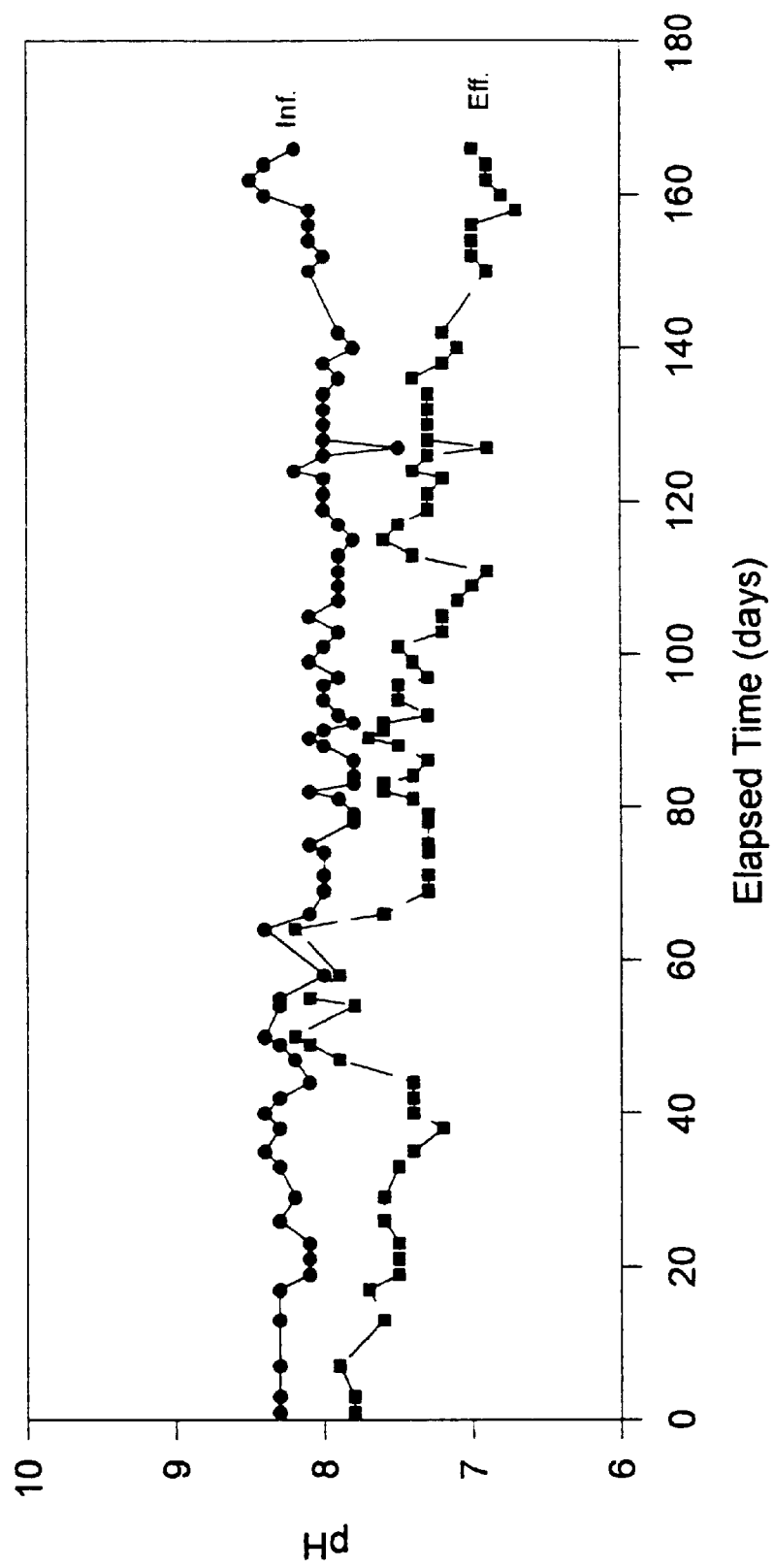
FIG. 15 is a graph showing pH drop by PVA on Column 1.
Figure 16:
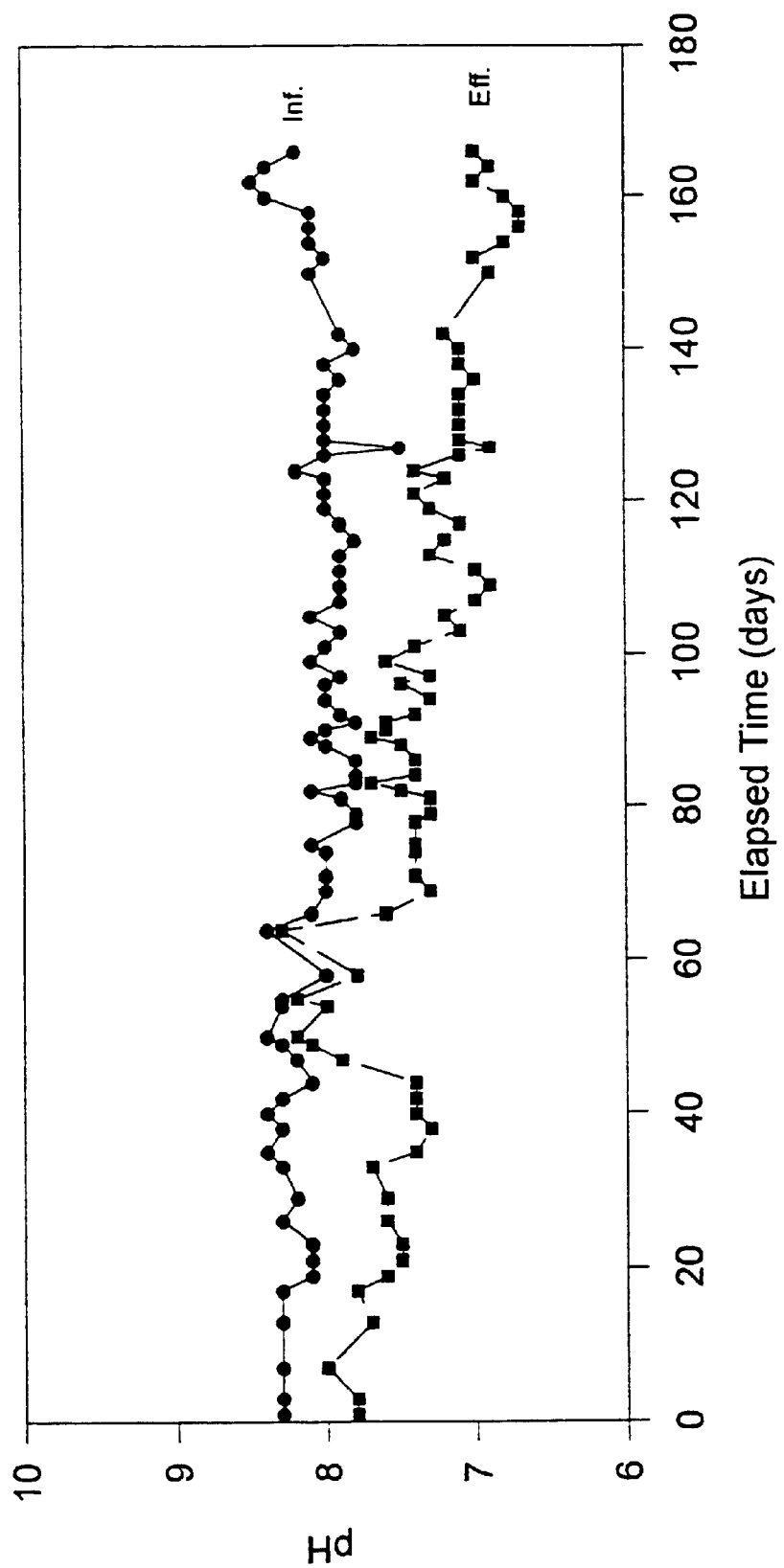
FIG. 16 is a graph showing pH drop by PVA on Column 2.
Figure 17:
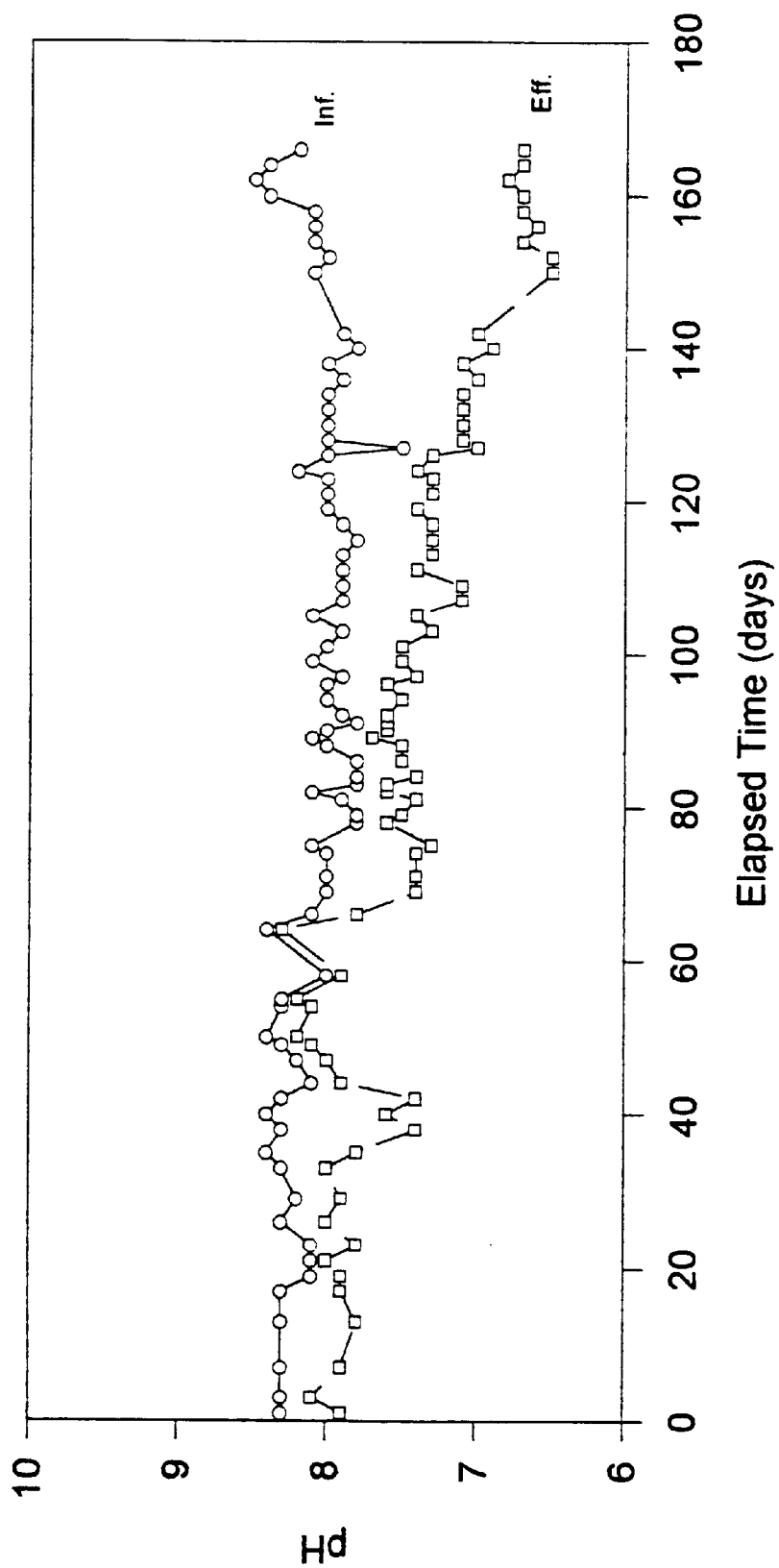
FIG. 17 is a graph showing pH drop by GAC on Column 3.
Figure 18:
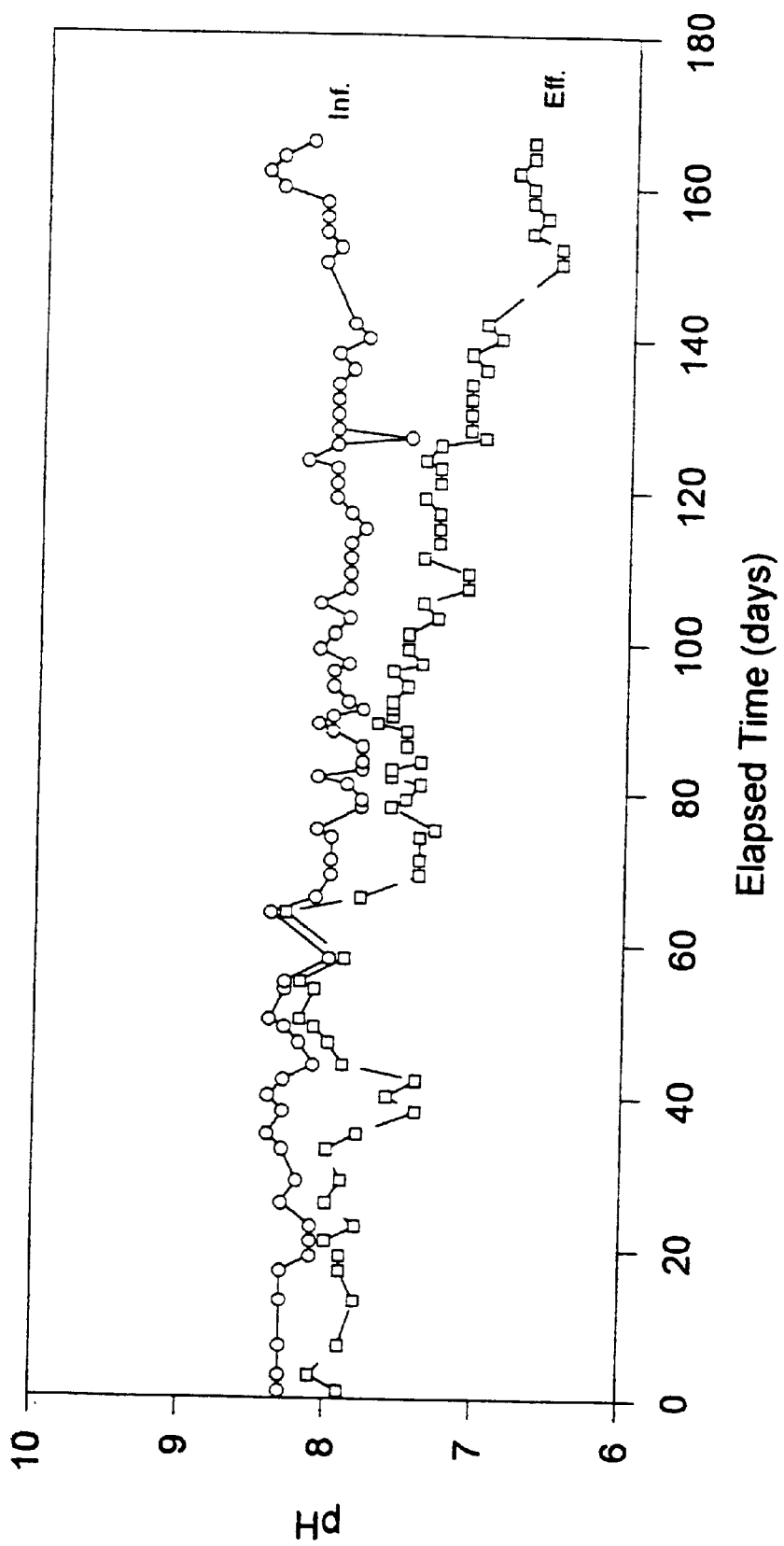
FIG. 18 is a graph showing pH drop by GAC on Column 4.

Nutrient solutions were added to the TCP-spiked groundwater: phosphate buffer solution; magnesium sulfate solution; calcium chloride solution; and ferric chloride solution. A peristaltic pump (Cole-Parmer 7553-30) with four heads (Model 7013) and tygon tubing was used to pump the groundwater into the base of the columns (upflow mode). A schematic diagram of the columns used in the study is shown in FIG. 2.

The effects of external disturbances such as a high shock load and low dissolved oxygen (DO) were evaluated on PVA and GAC immobilized cells systems. Columns #2 and #4 were subjected to a high influent TCP concentration (>550 mg/L), C:P:N ratio of 100:10:3, flow rate of 2.0 mL/min, and dissolved oxygen above 30.0 mg/L for 50.0 hours. The experimental condition of columns #1 and #3 were adjusted to a very low dissolved oxygen (DO) around <2 mg/L, TCP concentration of 40.0 mg/L, and flow rate of 2mL/min. for 50.0 hours. During these 50.0 hours influent and effluent samples were taken to determine TCP concentration, DO, pH, and Cl$^-$ concentrations. After 48.0 hours experimental condition were adjusted back to TCP=40.0 mg/L, DO=above 25.0 mg/L, flow rate=2 mL/min, and C:P:N ratio of 100:10:3.

The columns were monitored in terms of TCP concentration, DO, pH, and Cl concentration until all the columns reached steady state (where there is no change in effluents concentration). Once the columns reached steady state, the stress conditions (shock load and low DO) on specified column were repeated one more time for another 50.0 hours. After 50.0 hours of the shock load on columns (2,4) and low DO on columns (1,3), once again all the columns were subjected to TCP=40.0 mg/L, DO~30.0 mg/L, and flow rate of 2.0 mL/min. In this study, the effects of external disturbances such as high shock load and low DO were evaluated on PVA and GAC immobilized cells systems.

Simulation of Biological Permeable Barrier by Column Studies

Column studies were set up to evaluate and compare aerobic biodegradation of TCP by proposed biological permeable barriers, PVA-immobilized cells columns (#1, #2) and GAC-immobilized cells columns (#3, #4) under varying operational conditions. PVA columns #1 and #2 contained 10.0 cm and 20.0-cm beds of 3–5 mm PVA- immobilized cells beads, respectively. The GAC columns #3 and #4 contained 10.0 cm and 20.0 cm bed of (3%) GAC-immobilized cells/silica sand (97%) mixture, respectively A minimum two-week experiment period was considered adequate to collect the required data. During the experiments, between 100–300 mL of influent and effluent samples were collected every other day and tested for TCP concentration, DO, chloride release, and pH. The data were collected during the transition and steady state periods.

columns consumed oxygen to about the same extent (2.5 mg/L), except PVA #1, which had a slightly higher consumption (3.3 mg/L). The reduction in DO in the effluent is an indication of the biodegradation process that is going on in these columns. During the 5.0 hour required to collect the effluent sample (300 mLs), the samples were exposed to the air, which probably yield a residual oxygen concentration different than that expected based on stiochiometry.

The $Cl^-$ concentrations in the effluents of all four columns showed an increase of about 6.0 to 8.0 mg/L. The increase in chloride concentration supports aerobic dehalogenation of TCP. For the idea of aerobic dehalogenation of each mg of TCP, 0.54 mg of chloride is expected to be release based on stiochiometry.

TABLE 3

Experimental Conditions for Column Studies (1–8)

| Column Experiments | Experiment No. 1 | Experiment No. 2 | Experiment No. 3 | Experiment No. 4 | Experiment No. 5 | Experiment No. 6 | Experiment No. 7 | Experiment No. 8 |
|---|---|---|---|---|---|---|---|---|
| Influent Concentration (mg/L) | 10.0 | 20.0 | 20.0 | 20.0 | 30.0 | 20.0 | 20.0 | 40.0 |
| Influent Flow Rate (mL/min.) | 1.0 | 1.0 | 1.0 | 1.0 | 1.0 | 2.0 | 4.0 | 4.0 |
| Residence Time (min) | Columns #1 = 49 #2 = 98 #3 = 59 #4 = 118 | Columns #1 = 49 #2 = 98 #3 = 59 #4 = 118 | Columns #1 = 49 #2 = 98 #3 = 59 #4 = 118 | Columns #1 = 49 #2 = 98 #3 = 59 #4 = 118 | Columns #1 = 49 #2 = 98 #3 = 59 #4 = 118 | Columns #1 = 24.5 #2 = 49 #3 = 29.5 #4 = 58.9 | Columns #1 = 12.3 #2 = 24.5 #3 = 14.8 #4 = 29.5 | Columns #1 = 12.3 #2 = 24.5 #3 = 14.8 #4 = 29.5 |
| C:N:P Ratio | 100:18:188 | 100:18:188 | 100:18:188 | 100:10:3 | 100:10:3 | 100:10:3 | 100:10:3 | 100:10:3 |
| Dissolved Oxygen (mg/L) | 8.0–9.0 | 8.0–9.0 | above 20.0 | above 20.0 | above 27.0 | above 20.0 | above 20.0 | above 30.0 |
| Loading Rage g $L^{-1} \cdot d^{-1}$ | Columns #1, #3 = .074 #2, #4 = .037 | Columns #1, #3 = 0.15 #2, #4 = .074 | Columns #1, #3 = .15 #2, #4 = .074 | Columns #1, #3 = 0.15 #2, #4 = .074 | Columns #1, #3 = 0.22 #2, #4 = .11 | Columns #1, #3 = 0.3 #2, #4 = 0.148 | Columns #1, #3 = 0.6 #2, #4 = 0.3 | Columns #1, #3 = 1.2 #2, #4 = 0.6 |

Operating Condition No. 1

Biodegradation of TCP by PVA and GAC Immobilized Cells

The removal mechanism of TCP from groundwater by PVA-immobilized cells (columns #1, #2) and 3% GAC-immobilized cells/sand mixture (#3, #4) was examined. In this study the average influent TCP concentration was 10.50±0.83 mg/L. The C:N:P ratio was kept at 100:18:188 by adding nutrients to the influent feed solution. The influent solution was aerated with laboratory compressed air 24.0 hours a day to maintain the DO above 8.4 mg/L. The flow rate for all four columns was 1.0 mL/min. Applied loading in this experiment for columns #1, and #3 and for columns #2, and #4 were 0.074 and 0.037 g $L^{-1}$ $d^{-1}$, respectively.

PVA columns #1 and #2 reduced the influent TCP concentration to zero on day 17 and 13, respectively. PVA column #2 with a 20.0-cm bed height provides longer contact time between cells and TCP than PVA column #1 with a 10.0-cm bed height. Both PVA columns maintained 100% TCP removal for remaining time of this experiment. No TCP was ever detected in the effluents of GAC columns over entire course of this experiment. The explanation might be that during this period, TCP was removed initially by adsorption on GAC that is no leakage was seen, and later by biodegradation (supported by change in DO, Cl release, and pH data).

For aerobic mineralization of each mg of TCP, 0.89 mg of oxygen is expected to be consumed by bacteria. All four Aerobic dehalogenation of TCP produced HCl which would cause the drop in effluent pH. The influent feed solution had a pH range from 8.1–8.3. The approximate average pH in the effluents from columns #1, #2, #3, and #4 are 7.7, 7.7, 7.9, and 7.6, respectively. The estimated amounts of $Cl^-$concentration in the effluents of columns #1, #2, #3, and #4 needed to cause the observed drops in pH are 10.6, 10.6, 7.1, and 12.4 mg/L, respectively. The $Cl^-$ concentrations obtained from the pH curve are (15–35%) higher than $Cl^-$concentrations measured which ranged from 6.0–8.0 mg/L chloride. The possible explanation could be the formation of acids other than HCl. The drop in pH supports the dehalogenation of TCP and formation of HCl.

Operating Condition No. 2

Performance of Biological Permeable Barriers under Insufficient Dissolved Oxygen The performance of all four columns was evaluated by changing the average TCP influent concentration from 10.5±0.83 mg/L to 20.34±0.45 mg/L. The flow rates for all columns remained at 1.0 ml/min. The applied loading for columns (#1, #3) and (#2, #4) were 0.15 and 0.074 g $L^{-1}$ $d^{-1}$, respectively. The addition of nutrients to the influent feed solution kept the C:N:P ratio at 100:18:188. The influent solution was aerated with compressed laboratory air 24.0 hours a day to maintain DO levels above 8.4 mg/L. The amount of DO provided for this experiment was less than the DO needed for complete degradation of 20.0 mg/L of TCP. This experiment lasted 25 days.

Both PVA columns were able to remove TCP from the influent for up to a week. On day 40 TCP was detected in the effluent of both PVA columns. The effluent TCP concentration in column #1 was 1.2 mg/L on day 40. The TCP effluent concentration in column #1 continued to rise and reached 6.5 mg/L on day 58. The TCP effluent concentration in column #2 also started to rise on day 40 and reached its maximum concentration of 4.9 mg/L on day 58. The removal efficiencies of column #1 and #2 reduced from 100% to 68.0% and 76.0%, respectively. The explanation for this occurrence during this period is that the dissolved oxygen (DO) was insufficient for complete biodegradation of 20.0 mg/L of TCP.

No TCP was ever detected in the effluents of GAC columns #3 and #4 over the entire period of this experiment. An explanation for this might be that TCP removal was occurring by both adsorption and biodegradation.

The effluents of PVA columns #1 and #2 have an average effluent DO of 2.9±0.5 mg/L and 3.1±0.4 mg/L, respectively. This was a clear indication of biological activity occurring in both PVA columns. The cells in PVA columns #1 and #2 were able to consume about 66% and 64% of the average 8.6 mg/L DO in the influent, respectively. The average DO provided for this experiment is about 50% less than the DO needed for aerobic mineralization of 20.0 mg/L TCP.

The effluents of GAC columns #3 and #4 had an average DO of 3.0 mg/L and 3.1 mg/L, respectively. The cells in GAC columns #3 and #4 were also able to consume about 66% and 64%, respectively, of the average 8.6 mg/L DO in the influent.

The ICl concentrations of influent and effluents were measured and all four columns showed an increase in the chloride concentrations in their effluent. This supports the idea that dechlorination of TCP is occurring. Average chloride releases were 10.8 mg/L, 9.2 mg/L, 8.8 mg/L, and 10.1 mg/L for PVA (#1), PVA (#2), GAC (#3), GAC (#4), respectively. For complete dehalogenation of 20.35±1.2 mg/L of TCP, an average of 10.99-mg/L inorganic chloride release was expected. During the first 11 days of this experiment, the average chloride releases for columns #1, #2, #3, and #4 were 12.4, 10.1, 9.7, and 11.5 mg/L, respectively. From day 44 to day 58, the average chloride releases were reduced to 7.9, 8.1, 7.8, and 8.7 mg/L for columns #1, #2, #3, and #4, respectively. The reduction in chloride releases in all four columns tends to support the reduction in biodegradation of TCP because of insufficient DO for complete mineralization of TCP.

The drop in pH for the first 11 days was greater than for the last 14 days for all four columns. The approximate average effluent pH for the first 11 days of the experiment for columns #1, #2, #3, and #4 were 7.6, 7.4, 7.7, and 7.6, respectively. For the last 14 days of the effluent pHs for all four columns were 8.1. The drop in pH tends to support the concept of dehalogenation of TCP and formation of HCl in the effluents. The smaller drop in pHs of all four columns from day 11 to day 58 correlates well with the smaller chloride release measured possibly due to insufficient DO for complete mineralization of 20.0 mg/L TCP.

Operating Condition No. 3

Responses of Biological Permeable Barriers to sufficient Dissolved Oxygen

Improvement of column performance was examined by providing additional oxygen. For aerobic biodegradation of 20.0 mg/L of TCP, at least 17.8 mg/L of DO are needed. In order to provide sufficient DO for the immobilized cells, the influent feed solution was oxygenate with pure oxygen for at least 10.0 minutes every day (beginning day 63) during the course of this experiment. The influent bottle was almost completely capped to reduce loss of oxygen. The C:P:N ratio was maintained at 100:18:188 by addition of appropriate nutrients to the influentfeed solution. The influent flow rates for all four columns were 1.0 mL/min. The PVA and GAC immobilized cells columns reduced the average influent TCP concentration of 20.0 mg/L to zero during the entire period of the experiment. The removal efficiencies of all four columns were 100% which can be due to the sufficient DO provided for the immobilized cells.

An average influent DO of 23.5±3.5 mg/L was reduced to an average effluent value of 2.9±1.4, 3.2±1.7, 3.0±1.1, and 2.9±1.2 mg/L by columns #1, #2, #3, and was a clear indication of microbial activity present in both the PVA (#1, #2) and GAC (#3, #4) columns.

Average chloride releases in the PVA columns #1, #2 and GAC columns #3, #4 were 9.19±2.11, 10.25±1.97 and 10.73±2.5, 11.1±1.8 mg/L, respectively. The measured chloride concentration in both PVA and GAC columns effluents were very close in value to the theoretical chloride release expected for dehalogenation of 20.0 mg/L of TCP.

The pH values were measured in the influent and effluent of all four the influent feed solution had an average pH of 8.0. Columns #1, #2, #3, and #4 had approximate average effluent pH values of 7.5, 7.5, and 7.6. and 7.5, respectively. The drop in pH from an influent of 8.0 to 7.5 in the effluents shows that a 2.8-mL volume of 0.1 N HCl would be required. This is a 10.3 mg/L chloride concentration (2.9 mL/L×3.55 mg/mL) which is similar in value to the chloride concentration of 10.8 mg/L expected based on the stoichiometric dehalogenation of 20.0 mg/L TCP. This tended to support the dehalogenation of TCP.

Operating Condition No. 4

Responses of Biological Permeable Barriers to the Change of Nutrients Availability The C:N:P nutrient ratio used in the first three column studies was 100:18:188. The standard ratio for C:N:P for microorganisms to grow is 100:10:3. In order to avoid unnecessary addition of nutrients, the C:N:P ratio was adjusted from 100:18:188 to 100:10:3. The effect of varying the C:N:P ratio on biodegradation of 20.0 mg/L TCP was evaluated. The flow rates for all columns remained at 1 mL/min. The applied loading for all the columns remained the same as column conditions No. 2. and 3. The influent feed solution was aerated with pure oxygen for 10.0 minutes every day to maintain a DO above 20.0 mg/L.

No TCP was detected during the entire period of this experiment. The change in C:N:P ratio did not negatively effect the removal of 20.0 mg/L TCP by both PVA and GAC columns.

The dissolved oxygen for the influent and effluents of PVA columns (#1, #2) and GAC columns (#3, #4) were measured. All four columns (#1, #2, #3, #4) continued to reduced the DO of 22.8±3.3 mg/L in feed solution to effluent value of 4.0±0.7, 4.0±0.51, 4.0±0.6, and 3.9±0.7 mg/L, respectively. The consumption of DO was a clear indication of biological activity in the columns. The immobilized cells in all four columns were able to use DO efficiently and remove 20.0 mg/L of TCP during the entire course of this experiment.

The average chloride increase in the effluents for columns #1, #2, #3, and #4 are 11.1±1.9, 11.6±1.8, 11.3±3.5, and 11.2±2.2 mg/L, respectively. Aerobic dehalogenation of 20.0 mg/L TCP should theoretically release 10.8 mg/L inorganic chloride, which is very close to measured inorganic chloride of both PVA and GAC columns.

The influent feed solution had an approximate average pH of 7.9. The approximate average of the effluent pH for both PVA columns #1 and #2 was 7.5. The approximate average of the effluent pH for both GAC columns #3 and #4 was 7.6. According to the pH curve, the drop in pH from 7.9 to 7.5 shows that a 2.9 mL volume of 0.1 N HCl would be required. This is a 10.3 mg/L chloride concentration (2.9 mL/L×3.55 mg/mL) which is similar in value to the theoretical chloride concentration of 10.8 mg/L expected from the complete dehalogenation of 20.0 mg/L TCP. This supports the theory of complete dehalogenation of TCP.

Condition No. 5

Responses of Biological Permeable Barriers to the Increase of TCP Concentration

The removal efficiency of all four columns was evaluated as TCP concentration increased to 30.0 mg/L. The flow rate for all columns remained at 1 mL/min. The applied loading for the columns (#1, #3) and (#2, #4) were 0.22 g $L^{-1}$ $d^{-1}$ and 0.11 g $L^{-1}$ $d^{-1}$, respectively. The influent feed solution was aerated with pure oxygen for 10.0–15.0 minutes every day to maintain DO of above 27.0 mg/L. The influent bottle was almost completely capped to reduce loss of oxygen.

The TCP removal efficiency for PVA columns #1 and #2 was 98–100%. The removal efficiency of both GAC columns was 100% during the entire period of the experiment. It is clear that the increase in TCP concentration did not effect the removal efficiencies of both the PVA and GAC immobilized cells columns.

All four columns (#1, #2, #3, #4) continued to reduce the influent DO of 30.3±1.6 mg/L in feed solution to 3.0±0.6, 2.9±0.7, 2.9±0.5, and 2.4±0.5 mg/L, respectively, was an indication of biological activity in the columns. The immobilized cells in all four columns were able to use DO efficiently and removed 30.0 mg/L of TCP during the entire course of this experiment.

Average chloride concentrations in the effluent for columns #1, #2, #3, and #4 were 15.7±4.5, 17.1±4.9, 18.1±3.3, and 18.9±3.2 mg/L, respectively. Aerobic dehalogenation of 30.0 of TCP should release 16.2 mg/L chloride. The measured values for all four columns are close to theoretical chloride release for 30.0 mg/L TCP.

The influent feed solution had approximate average pH of 8.0. The approximate average effluent pH for both PVA column #1, #2 was 7.2. An approximate average effluent pH for both GAC columns #3 and #4 was 7.3. According to the pH curve, the drop in pH from 8.0 to 7.2, and 7.3 show that 5.0 mL and 4.0 mL volume of 0.1 N HCl would be required. This is a 17.8 mg/L chloride concentration (5.0 mL/L×3.55 mg/mL) for the PVA columns which is close to the chloride concentration of 16.2 mg/L expected from the dehalogenation of 30.0 mg/L TCP. According to the pH curve, both GAC columns #3 and #4 were expected to release 14.2 mg/L chloride (4.0 mL/L×3.55 mg/mL). The drop in pH supports inorganic chloride release which resulted from dehalogenation of TCP and formation of HCl.

Condition No. 6

Responses of Biological Permeable Barriers to the Reduction of Residence Time

The effect of increased flow rate on biodegradation of TCP in both PVA and GAC columns was examined. The average influent feed concentration was 22.0 mg/L. The flow rate was increased to 2 mL/min. The applied loading for the columns (#1, #3) and columns (#2, #4) were 0.3 and 0.148 g $L^{-1}$ $d^{-1}$, respectively. The flow rate increase to 2 mL/min which reduced the HRTs for columns #1–#4 to 24.5, 49.0, 29.5, and 58.9 minutes, respectively. The effect of contact time for the immobilized cells with TCP for all four columns were evaluated. Both PVA columns (#1, #2) reacted to the change in HRT. It took at least 8–10 days for PVA column #1, with an HRT of 24.5 minutes to reach steady state and reduce the TCP concentration to zero. PVA column #2, with an HRT of 49.0 minutes, took 6.0 days to reduce the TCP concentration to zero. There was no TCP detected in both PVA columns throughout out the end of the experiment (after day 123). In the effluent of the GAC columns, no TCP was ever detected during the entire period of this experiment. It is clear that the change in flow rate affected both PVA columns. The increase in TCP concentration in the effluent of PVA column #1 shows the impact of short residence time on this column.

The high DO readings during the transition state (days 113–119) for PVA column #1 is due to incomplete TCP removal, which is the result of a possible upset caused by the flow increase. All four columns (#1, #2, #3, #4) continued to reduced the DO of 25.6±2.9 mg/L in feed solution to 4.7±1.8, 4.9±1.4, 4.1±1.4, and 4.3±1.7 mg/L, respectively.

During the transition period (days 113–119), the average effluent chloride concentration for PVA column #1 was 5.2 mg/L only. This is also consistent with the incomplete TCP removal and high DO reading in the PVA column #1. During steady state conditions (days 119–127), the average effluent inorganic chloride concentration for columns #1, #2, #3, and #4 were 10.3±4.2, 10.6±2.8, 10.6±1.6, and 12.3±1.6, respectively. Aerobic dehalogenation of 20.0 mg/L should release 10.8 mg/L of inorganic chloride which is close to measured inorganic chloride in the effluent of all four columns.

The influent feed solution had an average pH of 7.9. The approximate average effluent pH for PVA column #1 during the transition period (days 113–119) was 7.5. According to pH curve, a drop in pH from 7.9 to 7.5 shows that 2.0 mL volume of 0.1 N HCl would be required. This is a 7.1 mg/L chloride concentration (2.0 mL/L×3.55 mg/mL). This was expected due to partial TCP removal and high DO reading during the transition period. An approximate average pH value for columns #2, #3, and #4 was 7.3. This equals 10.7 mg/L of chloride (3.0 mL/L×3.55 mg/mL) which is similar to the theoretical chloride concentration of 10.8 mg/L expected from the dehalogenation of 20.0 mg/L TCP. The drop in pHs supports the concept of dehalogenation of TCP and release of chloride (HCl).

Condition No. 7

Responses of Biological Permeable Barriers to another Reduction in Residence Time Another influent flow rate was instituted to examine changes the biodegradation of TCP (20.0 mg/L) in both the PVA and GAC columns. The average influent feed concentration was 21.0±0.9 mg/L. The applied loading for columns (#1, #3) and columns (#2, #4) are 0.6 and 0.3 g $L^{-1}$ $d^{-1}$, respectively. The influent bottle was aerated with pure oxygen for 10.0 minutes every day to maintain DO of around 27.0 mg/L. The influent bottle was completely capped to prevent the loss of oxygen. In this experiment the flow rate increased to 4 mL/min which reduced HRTs for column #1–#4 to 12.3, 24.5, 14.7, and 29.5 minutes, respectively.

Both PVA columns (#1, #2) reacted to the change in HRT starting on the first day of the experiment. It took almost 8 days for PVA column #1 with HRT of 12.3 minutes to reduce the TCP concentration to 2.3 mg/L. Average removal efficiency during the transition period (days 128–134) for this column was about 78%. The removal efficiency of PVA column #1 increased to 91% once the column reached steady state (day 8 of the experiment). The PVA column #2 with an HRT of 24.5 minutes had a TCP removal efficiency of 93% during the first four days of this experiment. The TCP removal efficiency of PVA column #2 increased to 100% once the column reached steady state (day 6 of the experiment). In the effluent of GAC columns, no TCP was ever detected during the entire period of this experiment. It is clear that the change in flow rate affected both PVA columns removal efficiency. The change in flow rate had greater impact (in terms of removal efficiency) on PVA column #1 than PVA column #2.

All four columns (#1, #2, #3, #4) continued to reduced DO of 27.9±1.5 in the feed solution to 8.1±0.8, 7.5±0.9, 6.8±0.6, and 6.4±1.1 mg/L, respectively. The results indicate that the effluent DO of all four columns were higher than compared to previous experiments. The DO provided in this experiment was around 27.9 mg/L, which is higher than the theoretical DO (around 18.9 mg/L) needed for complete biodegradation of 20.0 mg/L of TCP in influent. The consumption of DO is a clear indication of biological activity in the columns.

The average inorganic chloride release for columns #1, #2, #3, and #4 were 8.3±4.2, 10.6±2.8, 10.6±1.6, and 12.3±1.6, respectively. Aerobic dehalogenation of 20.0 mg/L releases 10.8 mg/L inorganic chloride which is close to the measured inorganic chloride in the effluent of all four columns.

The influent feed solution had an approximate average pH of 7.9. An effluent pH for the PVA columns #1 and #2 was 7.2 and 7.1. The approximate average of effluent pH for GAC columns #3 and #4 was 7.1 and 6.9. The effluent pH drop from 7.9 to 7.2, 7.1, and 6.9 showed that 4.0, 5.0, and 8.0 mL volume of 0.1 N HCl would be required, respectively to account for this pH change. These equal 14.2, 17.8, 17.8, and 28.4 mg/L chloride concentration in columns #1–#4 effluent respectively. The effluent chloride concentration measured in all four columns was higher than expected especially in PVA column #2 and GAC column #3 and #4. This increase over theoretical was 40%, 40%, and 65%, for PVA column #1, GAC column #3, and GAC column #4, respectively. The change in flow rate might wash out some inorganic chloride that had retained in the columns. It is also possible that the columns had some anoxic zones which might dehalogenate TCP and release chloride.

Condition No. 8

Responses of Biological Permeable Barriers to another Increase of TCP Concentration The removal efficiency of all four columns where the TCP concentration was increased to 40.0 mg/L was examined. The flow rate for all columns remained at 4 mL/min. The applied loading for columns (#1, #3) and columns (#2, #4) was 1.2 and 0.6 g $L^{-1}$ $d^{-1}$, respectively. feed bottle was aerated with pure oxygen for 10.0 –15.0 minutes every day to maintain DO of around 27.0 mg/L. The influent bottle was completely capped to prevent the loss of oxygen.

The average influent feed TCP concentration was 40.6±0.71 mg/L. An average effluent TCP concentration for PVA columns #1 and #2 was 15.5±3.6 and 8.9±1.2 mg/L, respectively. As seen the change of influent TCP concentration had an impact on both PVA columns in terms of TCP removal efficiency. For the first time during the column studies, the overall removal efficiency of PVA columns #1 and #2 was decreased to 61% and 80%, respectively. TCP removal by PVA column #1 improved over the course of this experiment. TCP removal efficiency for PVA column #1 over the first week was 54% and increased to 67% during the last 10 days of the experiment. PVA column #2 had a removal efficiency of 76% in the first week which was increased to 81% during the last 10 days of the experiment. The removal efficiency of both GAC columns was 100% during the entire period of this experiment. All four columns (#1, #2, #3, #4) continued to reduced the DO of the feed solution 27.8±1.2 mg/L to 9.9±1.2, 6.0±1.7, 4.6±1.1, and 4.1±1.4 mg/L, respectively. The consumption of DO by microorganisms is a clear indication of biological activity in the columns. The effluent DO in both PVA columns was higher than in both GAC columns. All four columns consumed DO available to them, but the PVA column consumption of DO was lower than GAC column consumption. It should be noted that for aerobic dehalogenation of 40.0 mg/L of TCP, the cells needed at least 35.6 mg/L of DO. Dissolved oxygen provided was around 27.8 mg/L, which are about 22% less than DO needed. This may have had an impact on the PVA columns removal efficiency of 40.0 mg/L TCP.

The average inorganic chloride release for columns #1, #2, #3, and #4 was 12.5±1.9, 18.6±2.9, 21.3±2.6, and 20.7±4.8 mg/L, respectively. Aerobic dehalogenation of 40.0 mg/L of TCP should theoretically releases 21.6 mg/L inorganic chloride. The average measured values for inorganic chloride release in the GAC columns effluent are close to theoretical chloride release. The average measured values for inorganic chloride release in the PVA columns #1 and #2 effluent are 42% and 14% less than the theoretical chloride release. The PVA column #1 also had lowest DO usage. This supports the observed TCP removal efficiencies of these columns.

The influent feed solution had an approximate average pH 8.2. An approximate average pH for PVA columns #1 and #2 was 7.0 and 6.9, respectively. An approximate average pH for the GAC columns #3 and #4 was 6.7 and 6.9, respectively. The drop in pH from 8.2 to 7.0, 6.9, 6.7 shows that an 8.0, 8.0, and 11.0 mL volume of 0.1 N HCl would be required, respectively to account for such a pH change. The expected chloride concentration in columns #1, #2, #3, and #4 should have been 28.4, 28.4, 28.4, and 42.6 mg/L, respectively, which is about 24–50% higher than the theoretical chloride release. The anaerobic activity might be present as localized pockets (since DO in the effluent was between 4 and 9 mg/L) in the columns which would also cause the release of acids. The release of acids should show up in effluent pH value.

The drop in pH support inorganic chloride release resulting from dehalogenation of TCP and the formation of HCl.

Overall Performance of Biological Permeable Barriers during 166 Days of Continuous Operation Effluent and influent TCP concentrations were monitored during 166 days of continuous operation. The TCP concentration in the effluent of PVA column #1 was higher than PVA column #2 which had a longer HRT compared to PVA column #1. The increase in influent flow rate on days 113 and 128 had the greater impact on PVA column #1 effluent quality than any other column. Both PVA columns were affected by changes in the influent flow rate. The effect of TCP loading rate on effluent quality of the PVA columns (#1, #2) and GAC columns (#3, #4), as examined on days 97, 113, 128, 150, shows that the loading was related to the TCP appearance in the effluent. The TCP loading increase on day 97 had no effect on any of the columns. On day 113, a partial breakthrough of TCP was observed in PVA column #1 after increasing the flow rate from 1 to 2 ml/min, with a corresponding increase of TCP loading rate from 0.22 to 0.3 g $L^{-1}$ $d^{-1}$. PVA column #2 showed an increase in TCP concentration in the effluent on day 113, after increasing the TCP loading rate from 0.11 to 0.15 g $L^{-1}$ $d^{-1}$. The increase in the flow rate on day 113 had greater impact on PVA column #1 than PVA column #2. Both PVA columns (#1, #2) showed an increase in TCP concentration in their effluents after increasing the flow rate from 2 to 4 mL/min, with the corresponding increase in TCP loading rate from 0.3 to 0.6 g $L^{-1}$ $d^{-1}$ and from 0.15 to 0.3 g $L^{-1}$ $d^{-1}$, respectively. On day 150, both PVA columns #1 and #2 experienced the highest loading rate, 1.2 g $L^{-1}d^{-1}$ and 0.6 g $L^{-1}d^{-1}$, respectively during the entire 166 days of operation. The removal efficiency of the PVA columns #1 and #2 reduced to 67% and 81%, respectively, during days 150–166. The GAC columns #3 and #4 remained unaffected by any increase in loading rate during entire 166 days of continuous operation. The results are presented in FIGS. 3, 4, 5, and 6. During period 2 (column study 2), all of the columns experienced the shortage of dissolved oxygen. The PVA columns #1 and #2 reacted to insufficient DO, which resulted to higher TCP concentration in their effluents. The elimination for PVA columns #1 and #2 reduced from 100% to 68% and 76%, respectively.

The dissolved oxygen consumption of the PVA columns decreased on day 113 due to flow rate increase and partial TCP removal. The oxygen consumption of both PVA columns and GAC columns decreased by increasing applied loading during periods 6–8 (column study 6–8). The impact of high loading on the PVA column #1 was greater than the PVA column #2. The decrease in oxygen consumption of both GAC columns (#3 and #4) during periods 6–8 (column study 6–8) had no impact on their elimination capacities. The consumption of dissolved oxygen by the columns is clear indication of biological activity under aerobic conditions. The results are presented in FIGS. 7, 8, 9, and 10.

Dehalogenation of TCP was monitored in terms of chloride release in the columns effluent. During period 1(0–29 days), the chloride released by the GAC columns was less than the PVA columns, which indicate TCP removal by adsorption rather than biodegradation. During periods 2–6 (33–113 days), the chloride release increased in proportion to increasing TCP concentration. This gave further evidence of TCP biodegradation in both PVA and GAC columns. During periods 6–8 (113–166 days), the chloride release by both PVA columns decreased with increasing TCP loading, which support the partial removal of TCP by the PVA columns. The chloride released by the GAC columns increased as the applied loading increased during periods 6 and 7 (113–150 days), regardless of HRT, and applied loading. The chloride release increase with the corresponding increase in TCP concentration during period 8 (days 150–166), despite insufficient DO in the influent indicates the possibility of anaerobic dehalogenation of TCP by both GAC columns. The results are presented in FIGS. 11, 12, 13 and 14.

Evolution of $H^+$ by HCl production in the effluents of all four columns gave further evidence of TCP dehalogenation. The influent(s) and effluents pHs were monitored during the 166 days of the operation. The influent(s) pHs dropped for all four columns. During days 150–166, GAC columns continued to decrease the effluent pH, regardless of loading. Unlike the GAC columns, the PVA columns were affected by high loading and partial TCP removal resulted in a smaller pH drop in the effluents. The results are presented in FIGS. 15, 16, 17 and 18.

Responses of Biological Permeable Barriers to a Toxic Shock Loads of TCP

To study the effects of a external disturbance such as a TCP shock load on the PVA and GAC columns removal performance and recovery, the PVA (long) column #2 and GAC (long) column #4 were subjected twice (at two different times) to a high concentration (>550 mg/L) of TCP for 50.0 hr. During this 50.0 hr period, the PVA (short) column #1 and GAC (short) column #3 were subjected to low DO (~2.0 mg/L) conditions. This external disturbance study lasted 74 days.

During the steady state process monitoring periods (days 168–179), (days 182–223), and (days 228–240), the TCP influent feed concentration was around 40.0 mg/L. With a flow rate of 2 mL/min, this resulted in the TCP loading of 0.3 g L−1d−1 for both PVA and GAC immobilized columns. The feed bottle was oxygenated by bottled pure oxygen everyday (during 74 days) for at least 15 minutes. The influent bottle was capped to prevent oxygen loss.

Figure 19:
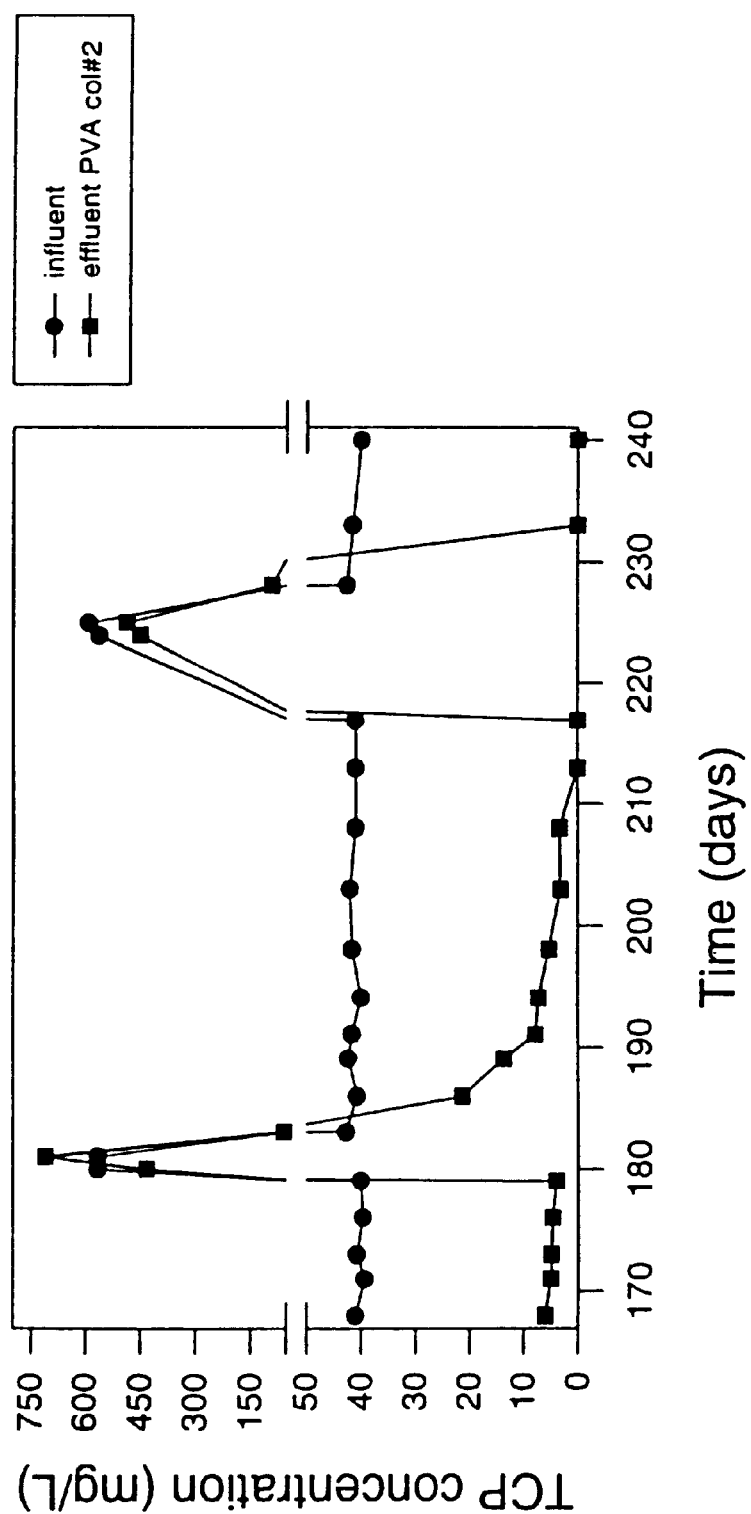
FIG. 19 is a graph showing TCP concentrations on PVA Column 2 in response to the high shock loads of TCP.

Both columns responded to high concentration of TCP in the influent. During the 50.0 hr shock loading, the degradation of TCP by the immobilized cells in the PVA column #2 was susceptible to the high shock load as seen in FIG. 19. The removal efficiency of the PVA column #2 reduced from 90% before shock load to 0% during shock load. The applied loading during the first 50 hours high shock load was 4.12 g $L^{-1}d^{-1}$ The PVA column #2 recovered within 16 days as seen by the decreasing TCP concentration in the effluent. When the next shock load (50 hr) was applied on day 224, TCP concentration in the effluent of PVA column #2 increased and decreased in the same pattern as in the first shock load. This time, the recovery time was much shorter. The recovery time of the PVA column #2 from the second shock load was about 5 days.

These results demonstrated that the cells entrapped inside PVA column #2 tolerated high shock load and were protected to a certain extent by immobilization. The minimum concentration of TCP, which completely inhibited the growth of free cells (0.0 TCP removal) was found earlier to be 20.0 mg/L. Based on the TCP mass balance (influent-effluent) the cells entrapped inside PVA column #2, were not able to consume any TCP during the first shock load. While there was a rise in the effluent DO during the first shock load along with no change of the effluent chloride concentration or pH.

Figure 20:
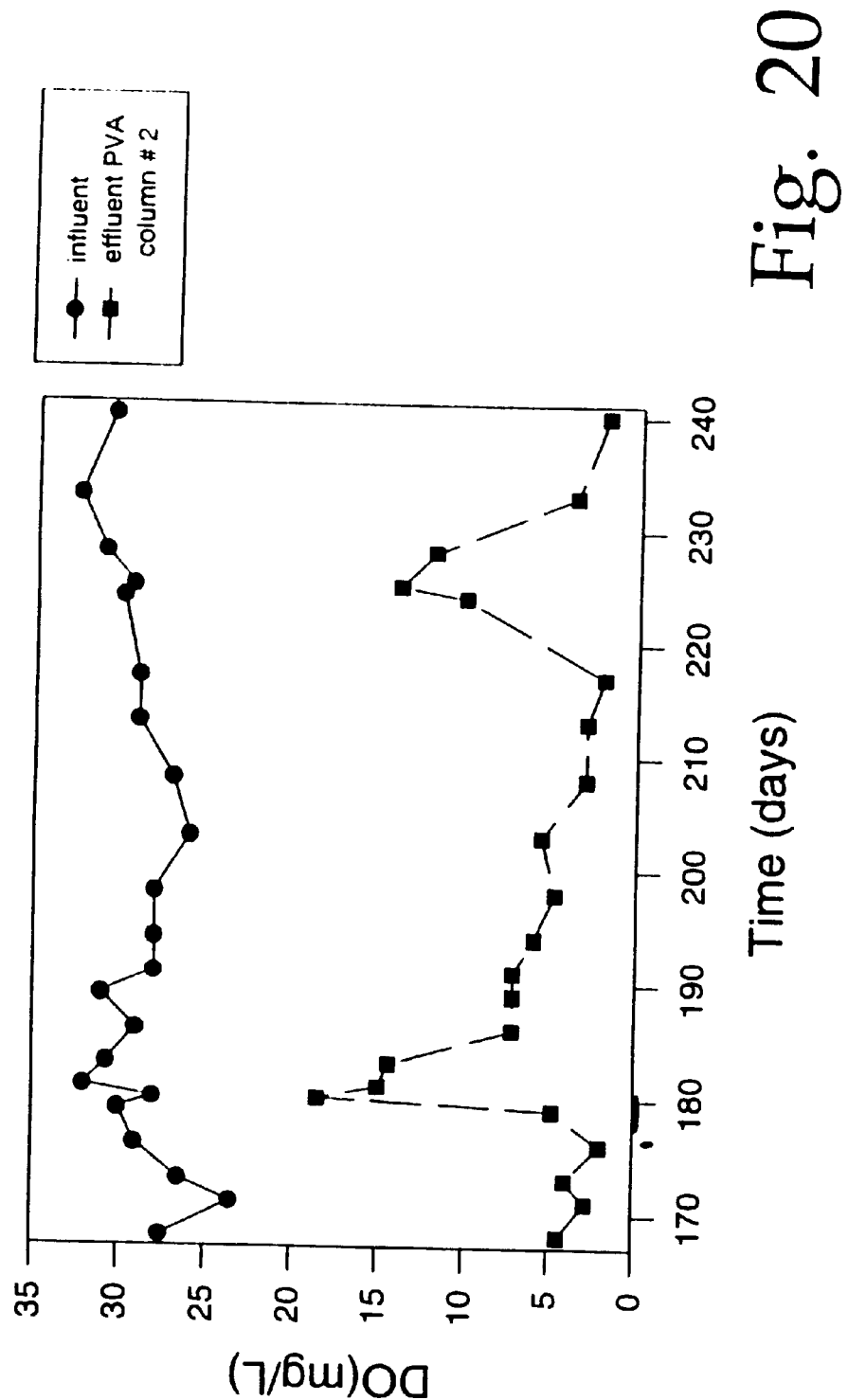
FIG. 20 is a graph showing dissolved oxygen changes during high shock loads on PVA Column #2.
Figure 21:
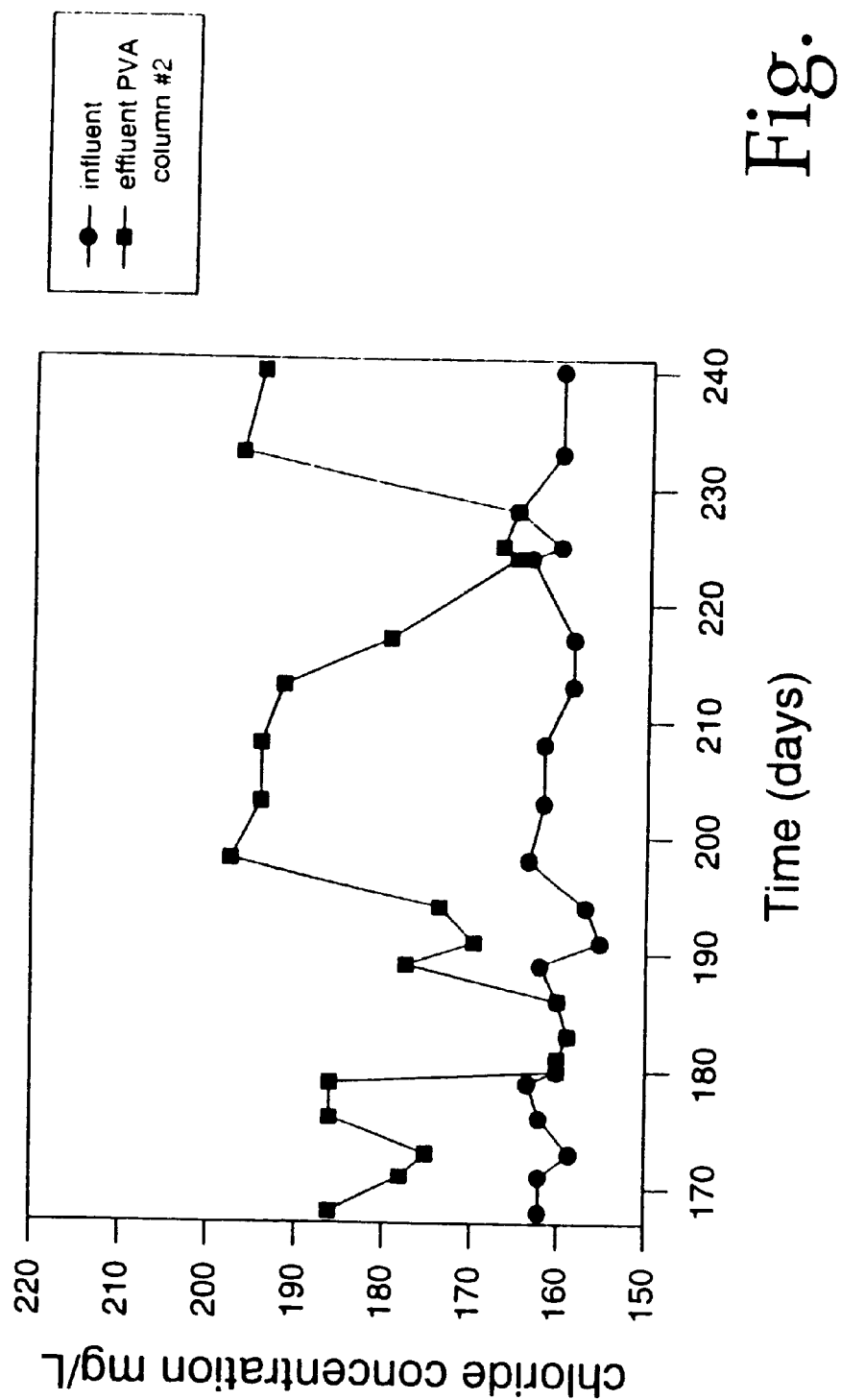
FIG. 21 is a graph showing chloride release changes during high shock loads on PVA Column 2.
Figure 22:
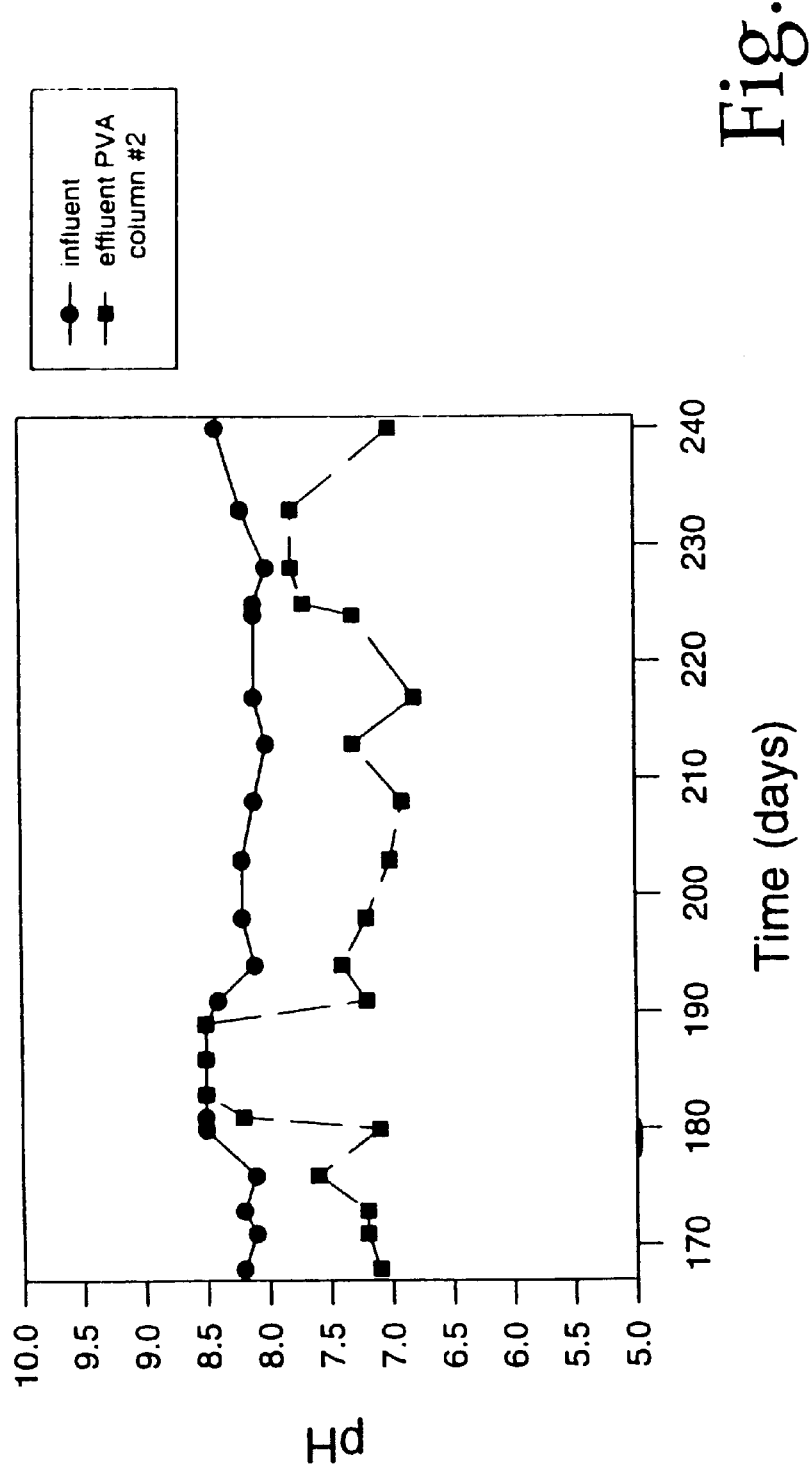
FIG. 22 is a graph showing pH changes during high shock loads on PVA Column 2.

The mass balance on TCP (influent-effluent) during the second shock load indicate that the cells were active and biodegrade 169 mg of TCP which is about 15% of total 1154 mg of influent TCP. The cells in the PVA column remained active indicated by DO uptake, chloride release, and pH drop in the effluent during the second shock load. The results also indicate that the process recovered within 5 days as seen by 100% removal of TCP in the effluent. Simultaneous oxygen uptake, chloride releases, and pH drop of the effluent shown in FIGS. 20, 21 and 22. gave further support to the occurrence of TCP biodegradation by PVA column #2.

Based on the TCP mass balance (influent-effluent), the GAC column was able to take 33% (368.4 mg) and 96%

Figure 23:
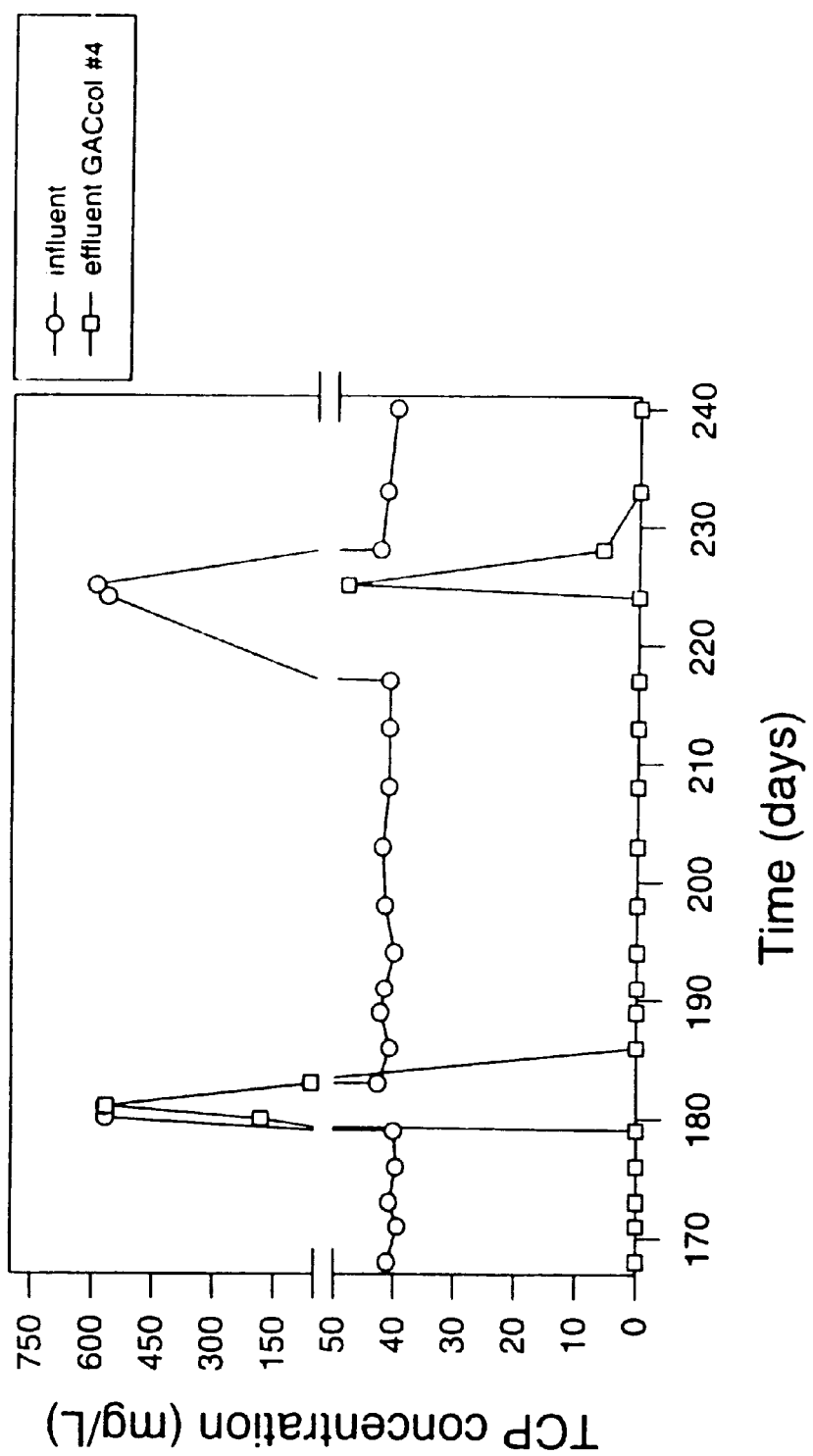
FIG. 23 is a graph showing TCP concentrations in response to high shock loads on GAC Column #4.
Figure 24:
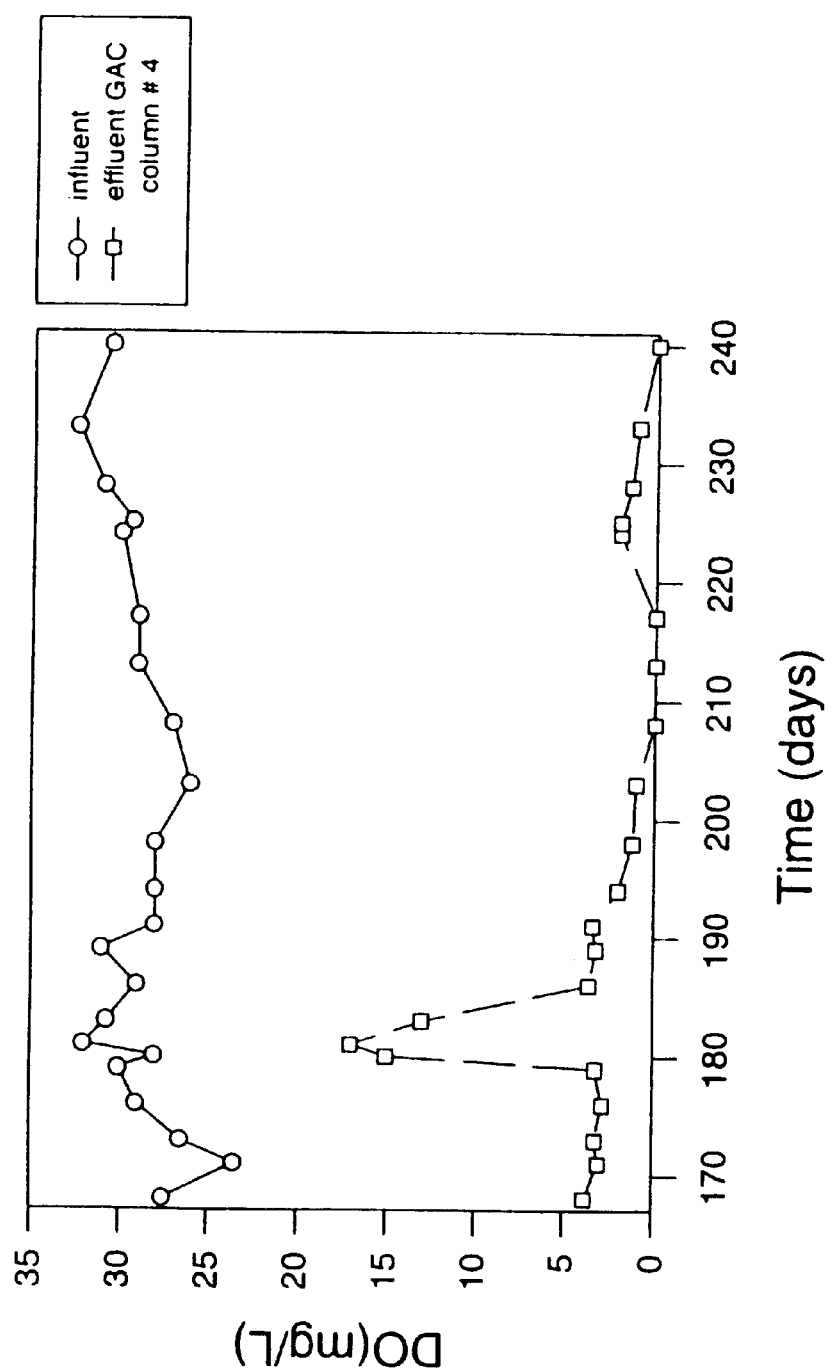
FIG. 24 is a graph showing dissolved oxygen changes on GAC Column #4 during high shock loads.
Figure 25:
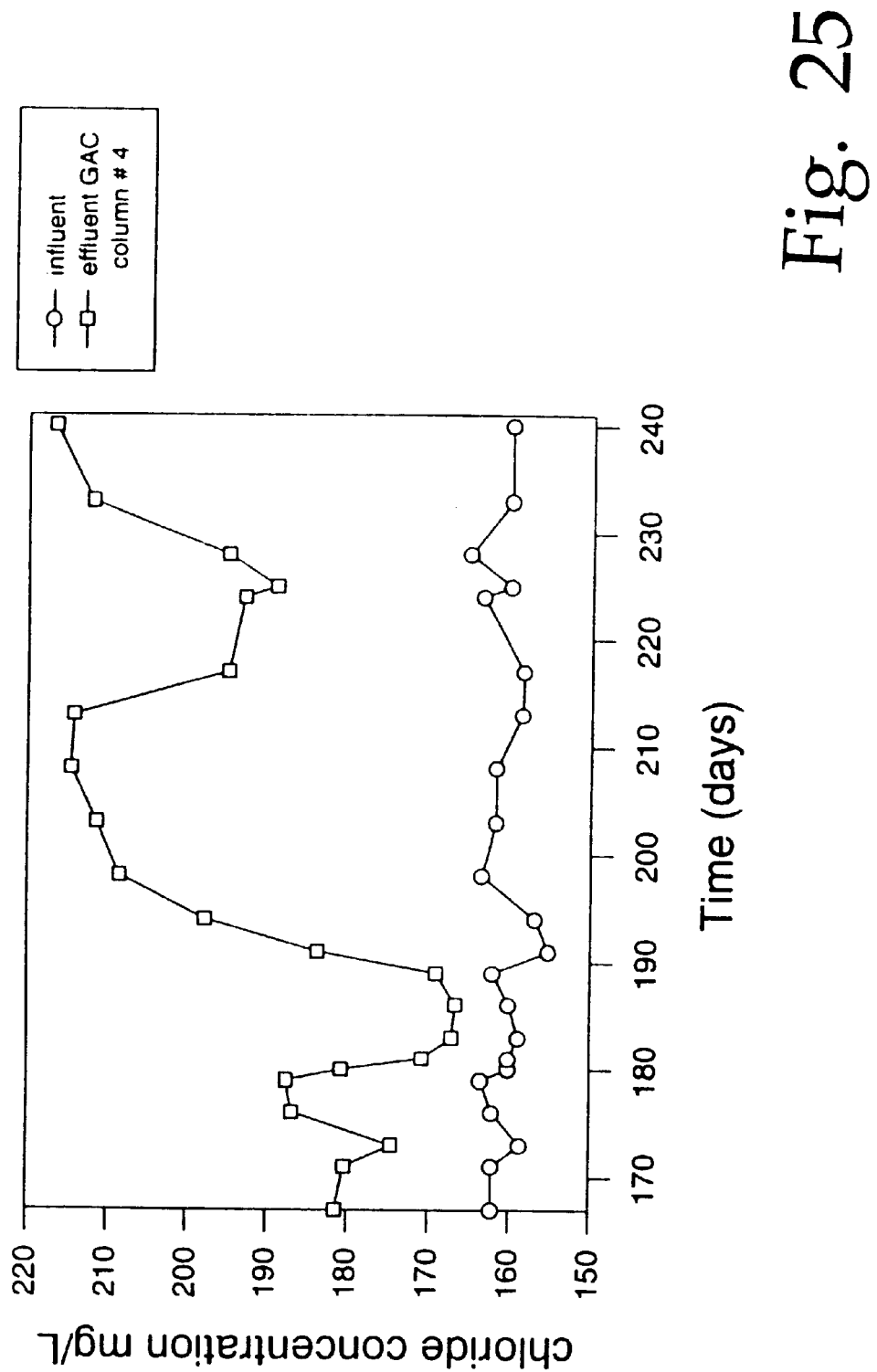
FIG. 25 is a graph showing chloride release changes during high shock loads on GAC Column #4.
Figure 26:
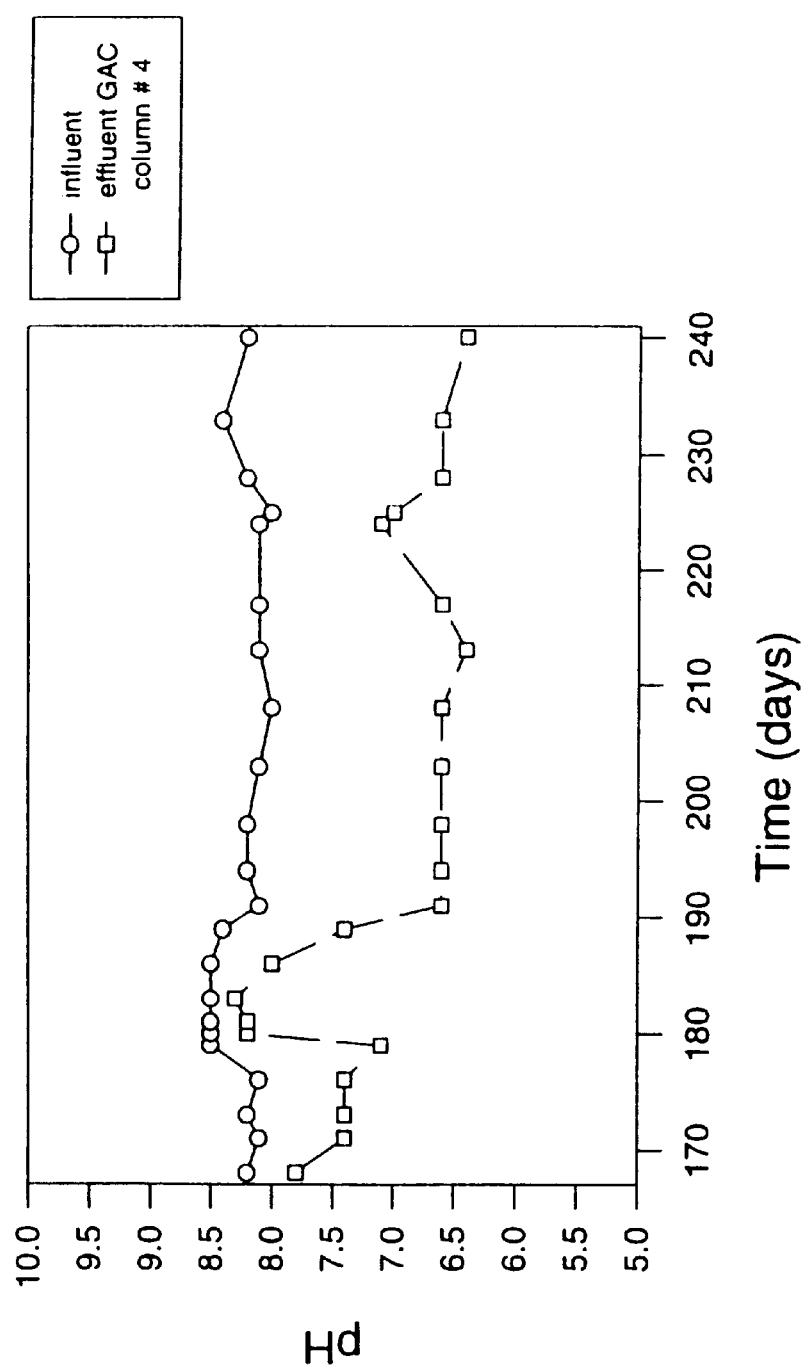
FIG. 26 is a graph showing pH changes during the high shock loads on GAC Columns.

(1143 mg) of influent TCP (1132 mg, 1154.3 mg) during the first and second shock load, respectively. As seen in FIG. 23, during the first shock load, limited removal of TCP took place. This indicates that the GAC adsorption capacity was virtually exhausted (influent TCP=effluent TCP), and the biological activity was low as shown by the rise of effluent DO, low chloride release, and small drop of pH in the effluent. On day 183, the effluent from the GAC column contained a higher TCP concentration than incoming influent. This indicates that desorption was taking place in the GAC column. As seen in FIGS. 24, 25 and 26, the increased oxygen uptake, chloride release, and pH drop in the GAC column effluent between day 194 and day 213 seemed to be caused mostly by biodegradation of desorbed TCP. Dehalogenation of 40.0 mg/L TCP should release about 21.6 mg/L of chloride. During this period the average chloride release was about 57 mg/L in the effluent. The 60% extra chloride release is believed to be mostly as the result of biodegradation of desorbed TCP (bioregeneration). Between day 226 and day 240, the average daily influent TCP loading rate was 116 mg TCP/d (40.0 mg/L TCP at 2 mL/min), whereas the effluent TCP was zero. The average daily chloride release rate expected to be 62.6 mg $Cl^-$/d for complete dehalogenation of 116 mg TCP/d. The average daily chloride production rate was 160 mg $Cl^-$/d. Therefore, approximately 97.4 mg $Cl^-$/d extra chloride release was obtained that was not accounted for by the influent TCP. This extra chloride release must come from dehalogenation of TCP already adsorbed by carbon. Approximately 3427.0 mg TCP was removed from GAC (bioregenerated) between two shock loads (days 194–213). The average GAC column effluent pH between day 26 and day 45 was 6.6. The effluent average pH drop from 8.1 to 6.6 would have required a 23 mL volume of 0.1 N HCl to have the same pH drop. This is 60.4 mg/L $Cl^-$ concentration which was close to the chloride measured (57 mg/L) during this period. The pH drop in the effluent along with chloride release (measured) supports complete dehalogenation of TCP. Aerobic mineralization of 40.0 mg/L TCP requires at least 35.6 mg/L of DO to release 21.6 mg/L chloride subsequently. It is clear that the DO provided was insufficient to biodegrade TCP already adsorbed by the carbon and released an average 35.5 mg/L extra chloride during days 194–213. Therefore, the dehalogenation of TCP already adsorbed was believed to be mostly the result of anaerobic biodegradation.

The immobilized cells in GAC column #4 continued to biodegrade already adsorbed TCP until day 213. The samples taken on day 217 indicated that there was no extra chloride release in the effluent which was consistent with rise of the effluent pH. Therefore, the cells remained active and survived the shock load and continued bioregenerate the carbon completely during 19 days under DO deficiency (anaerobic condition).

During the second shock load (day 224 and 225), the GAC column #4 adsorbed a total of 3120 mg TCP out of 3237 mg TCP applied in the influent. The immobilized cells remained very active during the second shock load and continued to dehalogenate TCP. The cells were able to biodegrade (aerobic condition) approximately 32.0 mg/L of TCP with the corresponding DO usage, chloride release, and effluent pH drop. Within the first week after the second shock load, the immobilized cells started to biodegrade TCP already adsorbed on GAC column during the second shock load. The extra chloride released by GAC column and the effluent pH drop during 233–240 followed the same pattern as seen during days 194–213. The immobilized cells in GAC column #4, remained active during the second shock load and continued to biodegrade TCP under both aerobic and anaerobic conditions.

Figure 27:
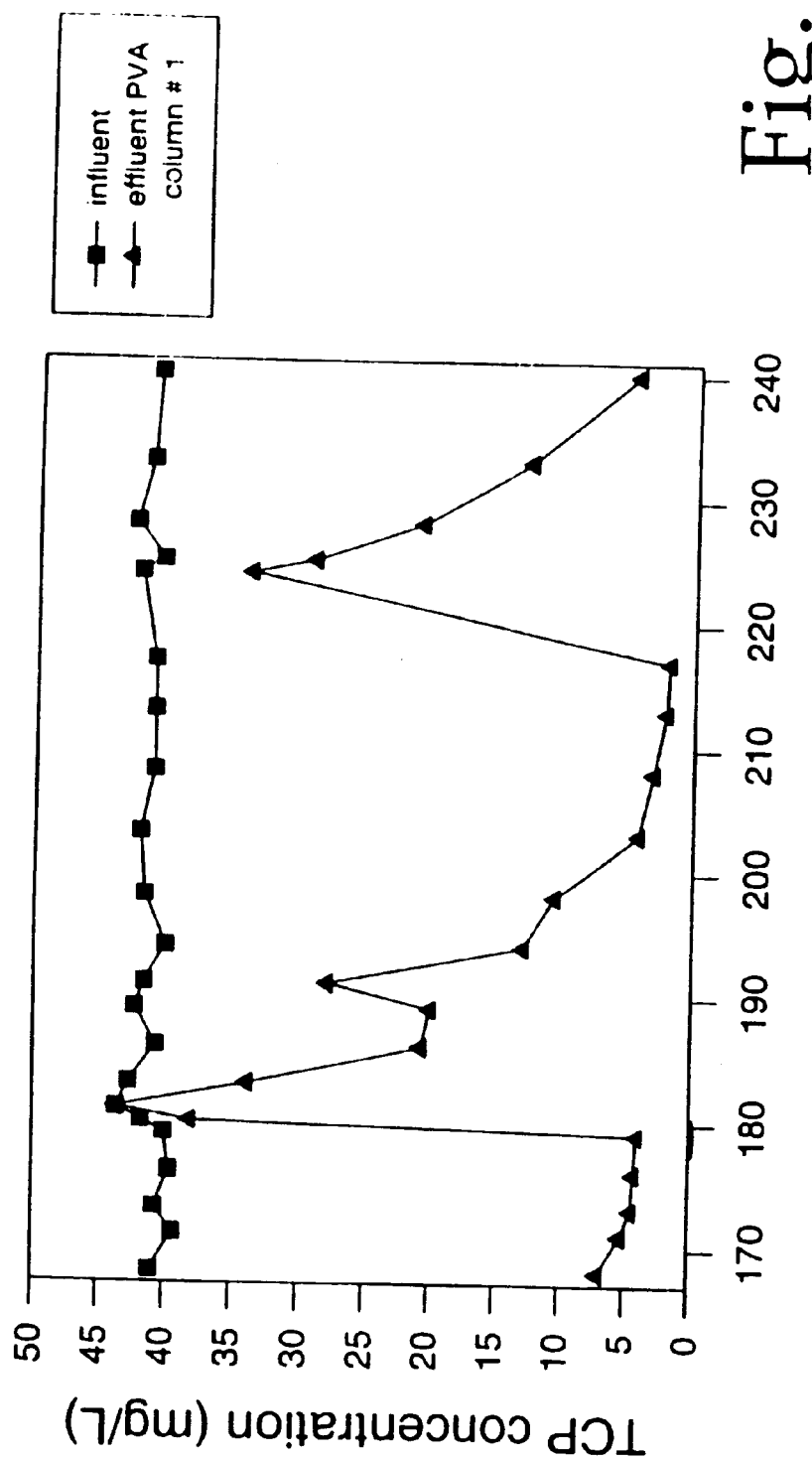
FIG. 27 is a graph showing effluent TCP concentrations as a response to low dissolved oxygen.

Responses of Biological Permeable Barriers to a very low Supply of Dissolve Oxygen To study the effects of low DO on TCP degradation performances and recovery, the oxygen supply to the PVA column #1 and GAC column #3 was discontinued twice during 74 days for 50 hours each time. During the steady state operation, TCP concentration in the influent was 40.0 mg/L and the flow rate was 2 ml/min. The DO during the steady state operation (days 167–179, 182–224, and 228–240) was maintained above 27.0 mg/L. PVA column #1 reacted quickly to the low DO during both interruptions of DO. In both cases, increases and recoveries of effluent TCP concentrations followed the same pattern. The recovery time was shorter after the second interruption of DO. After the first interruption of DO, PVA column #1 took about 21 days to reduce the influent TCP concentration down to 4.0 mg/L. This is 90% removal of the 40.0 mg/L influent TCP. As seen in FIG. 27, the percent removal increased from 90% to 95% between day 203–217. During the first interruption, effluent shown zero TCP removal supported with corresponding results of pH drop, DO change or chloride release.

Figure 28:
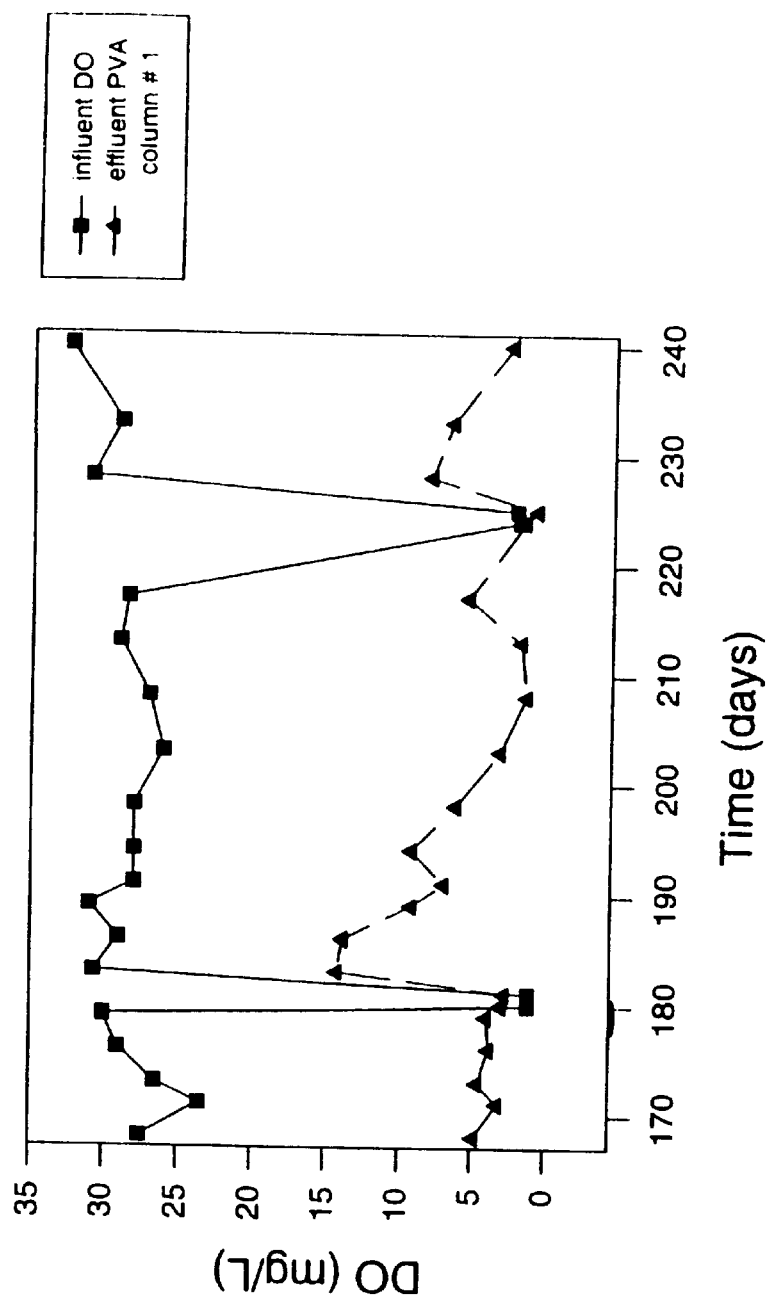
FIG. 28 is a graph showing dissolved oxygen uptake responses to influent dissolved oxygen interruptions.
Figure 29:
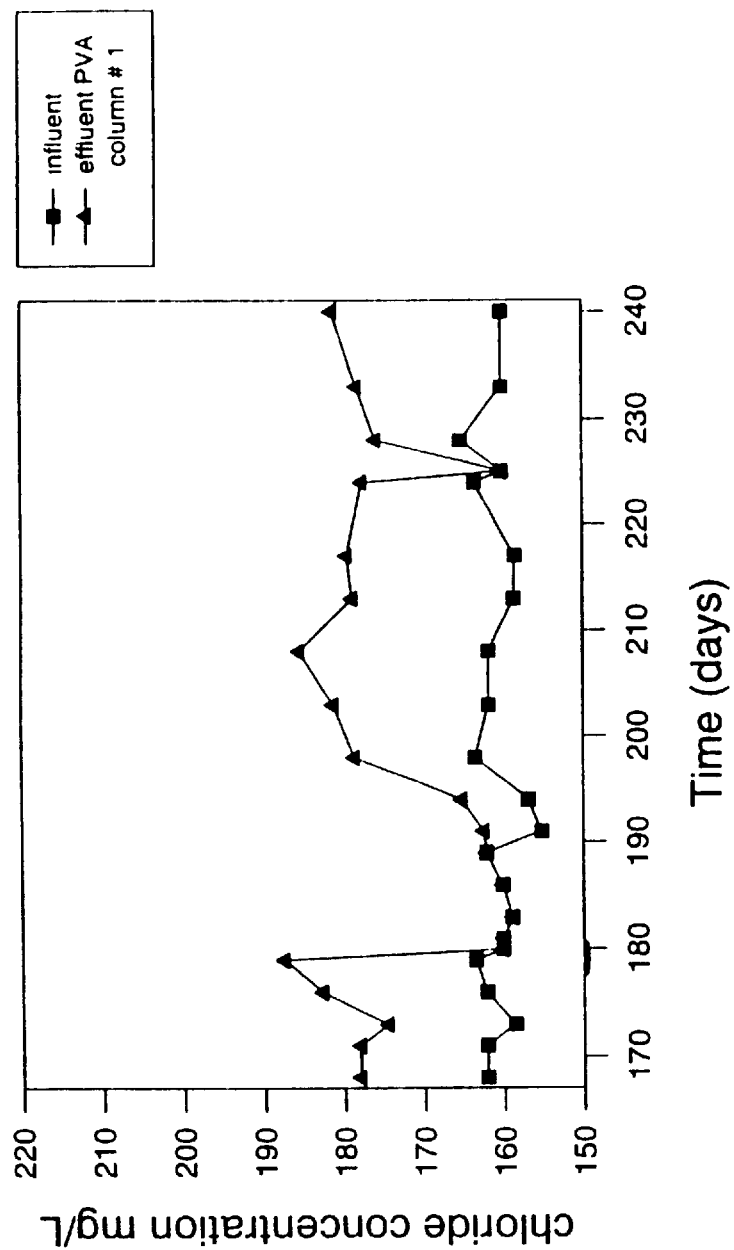
FIG. 29 is a graph showing chloride releases during and after influent dissolved oxygen upsets on PVA Column #1.
Figure 30:
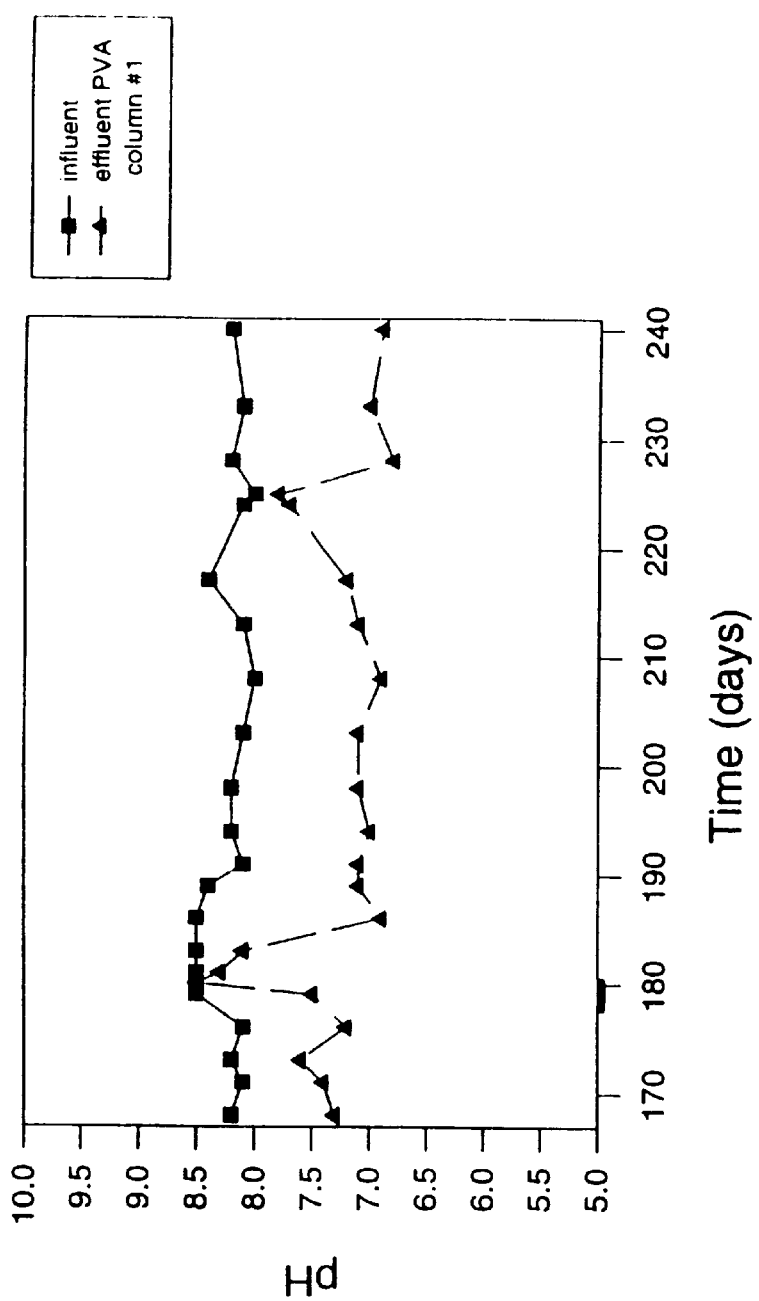
FIG. 30 is a graph showing effluent pH changes during and after influent dissolved oxygen upsets on PVA Column #1.

After the second interruption, immobilized cells in PVA column #1 recovered within 11 days and reduced TCP concentration by 90% with corresponding DO consumption, chloride release and pH drop in the effluent as shown in FIGS. 28, 29 and 30. These results demonstrated the sensitivity of immobilized cells in PVA column and, at same time, the tolerance of the immobilized cells toward the low DO influent.

Figure 31:
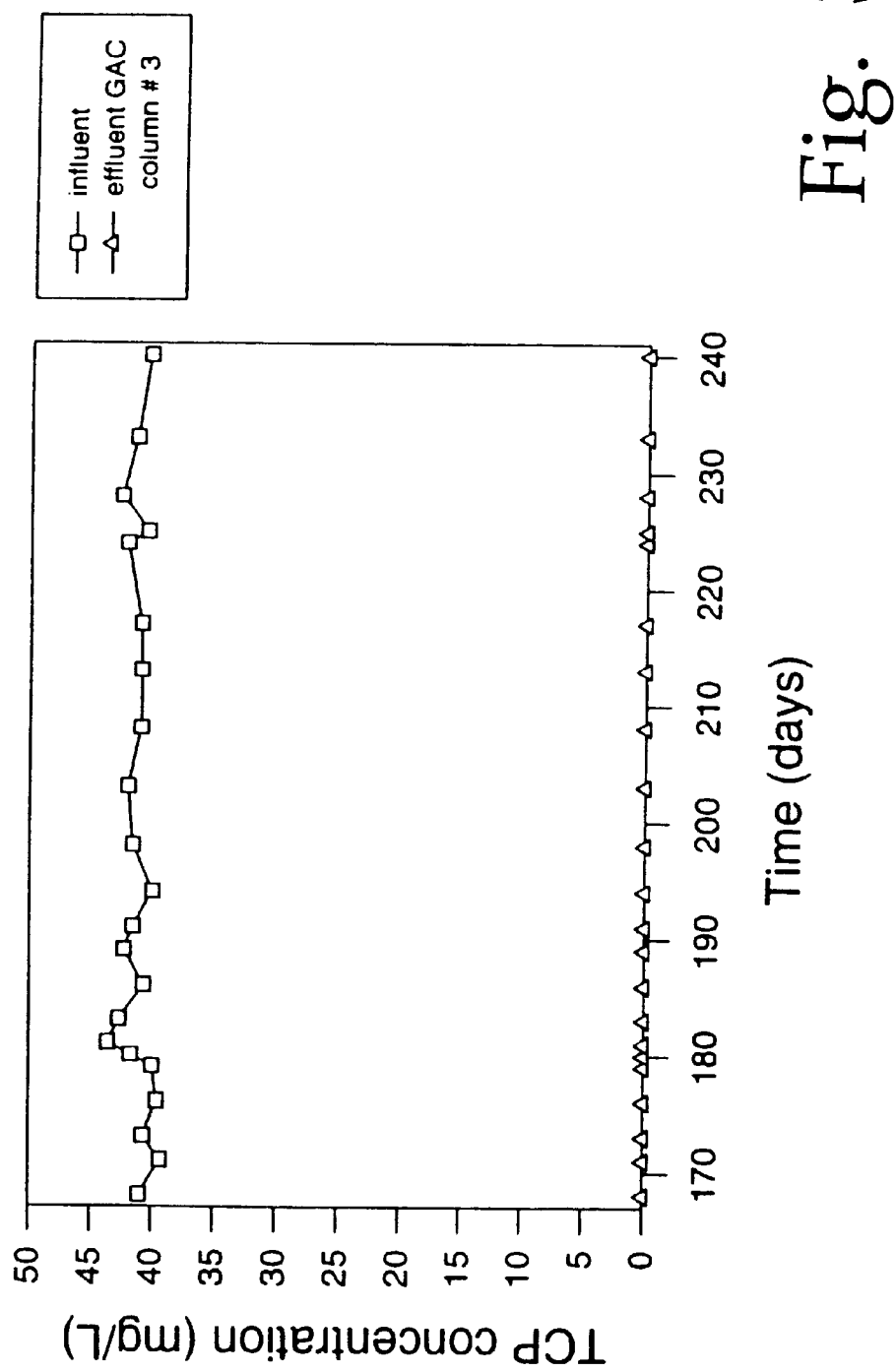
FIG. 31 is a graph showing TCP concentrations in response to low dissolved oxygen on GAC Column #3.
Figure 32:
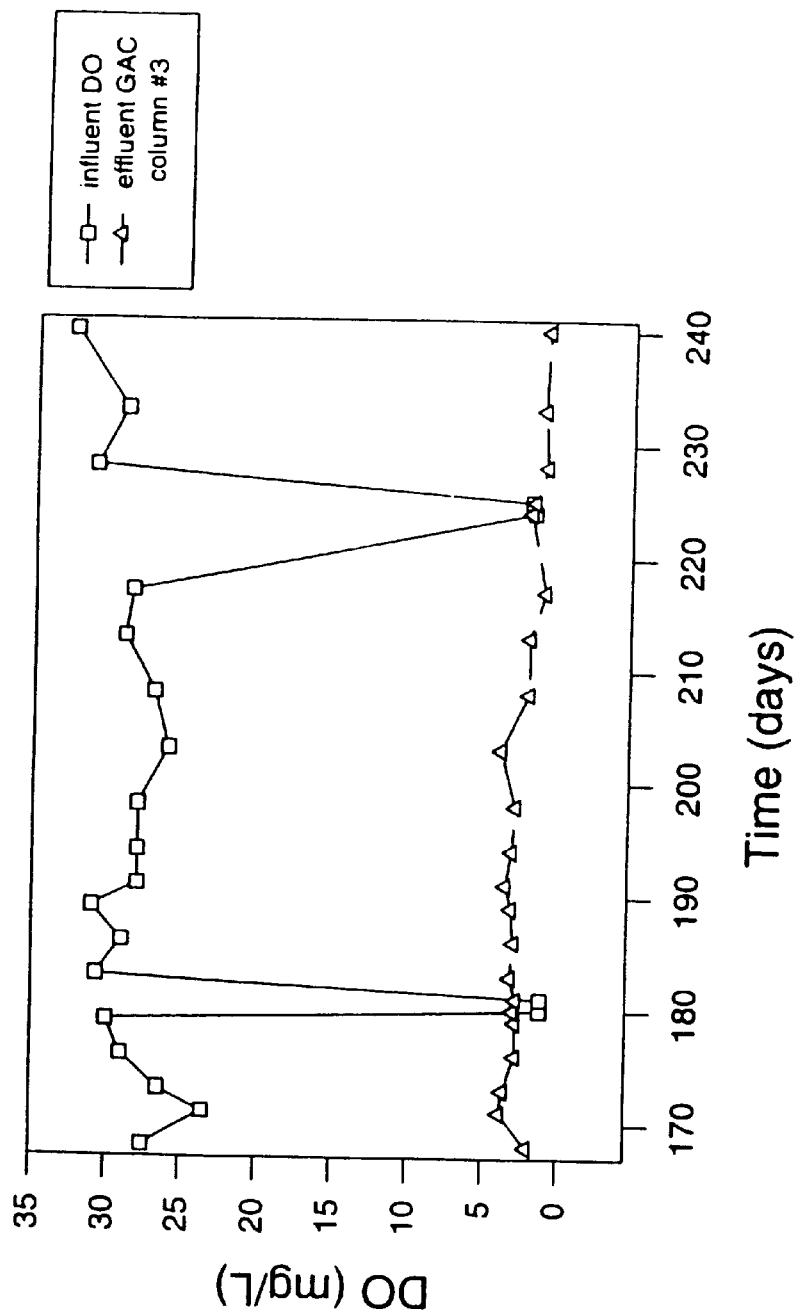
FIG. 32 is a graph showing dissolved oxygen uptake responses to influent dissolved oxygen interruptions on GAC Column #3.
Figure 33:
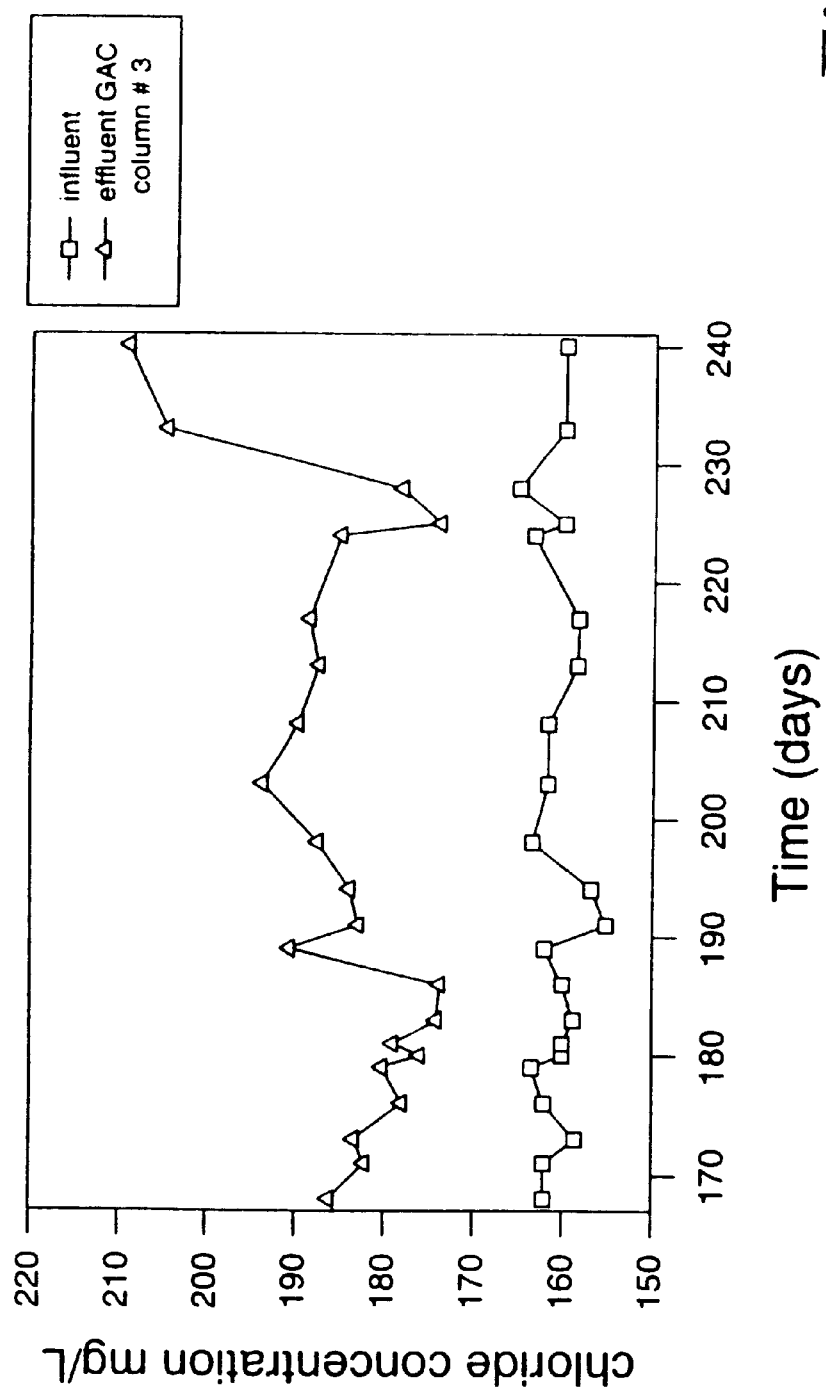
FIG. 33 is a graph showing chloride releases during and after influent dissolved oxygen upsets on GAC Column #3.
Figure 34:
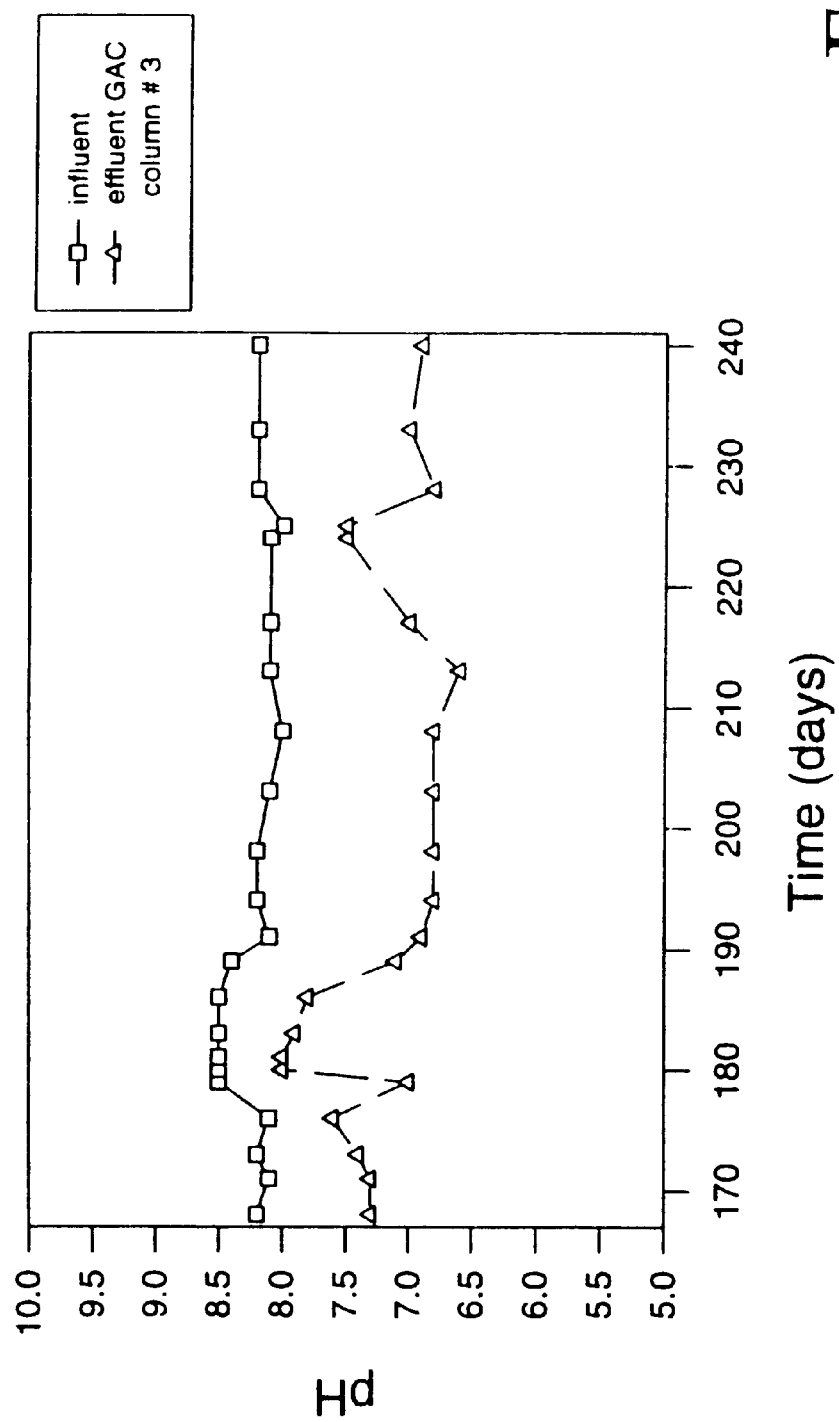
FIG. 34 is a graph showing effluent pH changes during and after influent dissolved oxygen upsets on GAC Column #3.

The GAC column also reacted to the interruption of DO. The influent TCP continued to be biodegraded despite the deficiency of dissolved oxygen as indicated by chloride release, effluent pH drop, and 100% TCP removed as shown in FIG. 31. Both anaerobic activity and adsorption were responsible for the removal of influent TCP during the deficiency of DO as indicated by chloride release and pH drop of the effluent. The results support the partial removal of TCP by anaerobic bacteria. The amount of chloride release and pH drop in the effluent correspond with only 40% of influent TCP dehalogenated by anaerobic bacteria (insufficient DO). Once the oxygen was restarted after each interruption of DO, the aerobic bacteria began to recover and start to consume influent TCP. The activity of aerobic bacteria was evident from oxygen uptake by the GAC immobilized cells.

Theoretically, dehalogenation of 40.0 mg/LTCP releases about 21.6 mg/L $Cl^-$. During day 189–217, the average chloride release was 33.0 mg/L chloride. A possible explanation for extra 45% chloride release is the result of biodegradation of TCP already adsorbed on GAC by anaerobic bacteria. The average GAC column effluent pH was 6.8. The effluent pH drop from 8.1 to 6.8 show that 10.5 mL volume of 0.1 N HCl would be required for this drop. This is 37.3 mg/L $Cl^-$ concentration which was close to the chloride release (measured). The pH drop in the effluent along with chloride release support dehalogenation of TCP. It is clear that the DO provided was insufficient for aerobic bacteria to biodegrade TCP already adsorbed by carbon and release an extra 45% chloride. Therefore, the dehalogenation of TCP already adsorbed is believed to be the result of anaerobic biodegradation. During the second interruption of DO (day 224, 225), the aerobic immobilized cells in the GAC column #3 unlike anaerobic bacteria were inactive. Adsorption and anaerobic dehalogenation were responsible for 100% removal of TCP on days 224 and 225. It is theorized that anaerobic dehalogenation of some TCP resulted in the effluent chloride release and pH drop during the second DO interruption.

These results demonstrated the sensitivity of aerobic immobilized cells and, at the same time, the tolerances of these cells toward low DO. The PVA-immobilized cells were unable to degrade TCP during oxygen upset. In both cases of DO interruption, increases and recoveries of effluent TCP concentrations followed the same pattern. The second time recovery times were shorter.

The GAC column #3 offered both adsorption and anaerobic biodegradation during the interruptions of DO. The adsorption capacity of GAC offered 100% removal of TCP. The TCP adsorbed onto carbon subsequently was released and consumed by bacteria (bioregeneration). Insufficient DO promoted the activity of anaerobic bacteria which resulted to biodegradation of TCP, release of chloride, and drop of pH. Since anaerobic bacteria are slower growers they could not grow to a significant enough number in 50 hrs to do any good for TCP removal so then either they are present in the column all the time or some of the degraders may be facultative. Once the oxygen supply restarted, the GAC immobilized cells resumed their activity and continued to biodegrade TCP. GAC-immobilized cells responses to insufficient DO are shown in FIGS. 31, 32, 33 and 34.

The capabilities of PVA-immobilized cells and 3% GAC-immobilized cells/sand as two novel biological permeable barrier media to biodegrade a target contaminant (TCP) in groundwater under a variety of operating conditions has been demonstrated. The effects of loading rate, HRT, shock load, and low DO on the removal efficiency of PVA-immobilized cells and 3% GAC-immobilized cells have been shown.

The use of immobilized cells on PVA and GAC as biological permeable barrier media has never been investigated. In order to investigate GAC-immobilized cells and PVA-immobilized cells as biological permeable barrier media, it was necessary to design and test these barriers under different operating conditions found in groundwater such as different loading rates, HRT's, deficiency of DO, and high shock loading for extended period of time. PVA-immobilized cells and 3% GAC-immobilized cells/sand were characterized and tested during 166 days of continuous operation under different loading rates, HRT's, and nutrient (C:N:P) ratios. Both PVA and GAC immobilized cells were subsequently tested under high shock load and low DO conditions. The discussion of the various experimental results conducted during the study is presented as follows.

The results from the 166 days of continuous column experiments on PVA-immobilized cells (Table 9) proved that an elimination capacity of 100% TCP is feasible for loads up to 0.3 g $L^{-1}$ $d^{-1}$ (HRT=24.5 minutes). At the loading rate of 0.6 g $L^{-1}$ $d^{-1}$ (HRT=12.3 minute), the TCP removal efficiency of PVA-immobilized cells was reduced to 91%. At the highest loading rate of 1.2 g $L^{-1}$ $d^{-1}$ (HRT=12.3 minutes), the total TCP removal was 67%. Valo et al. (1990) used a semi batch biofilter using Rhodococcus bacteria to remove TCP, TeCP, and PCP from synthetic groundwater in pilot scale plant. Partial (30–60%) degradation of chlorophenols was achieved at the average loading rate of 0.01–0.07 g $L^{-1}$ $d^{-1}$ (HRT=80 h). Makinen et al. (1993) achieved 99.7% chlorophenols (TCP, TeCP PCP) removal in an aerobic fluidized-bed reactor at a maximum loading rate of 0.45 g $L^{-1}$ $d^{-1}$ and a hydraulic retention time of 5 h. As compared to earlier studies, PVA-immobilized cells in this project operated at higher TCP loading rates and lower HRTs and produced a better quality effluent. The PVA-immobilized cells survived high shock loads of 4.12 and 4.7 g $L^{-1}$ $d^{-1}$ of TCP and recovered within 16 and 5 days, respectively. The immobilization of cells into PVA in this research was shown to protect the microorganisms against the toxicity of high concentration of TCP. An adequate oxygen supply was crucial, as shown in column experiments No.2 and No.9. PVA-immobilized cells removal efficiency of TCP was affected by low DO in the influent. PVA-immobilized cells recovered within 21 and 11 days from first and second interruption of DO, respectively, and continued to biodegrade TCP. Increases and recoveries of effluent TCP concentrations followed the same pattern. A significantly lower elimination capacity of PVA-immobilized cells columns could generally be to traced to an insufficient oxygen supply, and high loading rates with a corresponding decrease in HRT.

The elimination capacity of GAC-immobilized cells of 100% TCP is feasible regardless of the organic load (up to 1.2 g $L^{-1}$ $d^{-1}$). The results confirm that GAC, even with a substantial development of bacterial activity shown by biodegradation of TCP during 166 days of operation, maintains a substantial adsorption capacity. In this study immobilized cells on GAC were surveyed high shock loads (50.0 hr each) and DO interruptions (twice 50.0 hr each). GAC protected immobilized cells from shock loading through rapid initial adsorption into pores and slow subsequent release by desorption. This desorption accompanied by biodegradation of the desorbed TCP (bioregeneration) was shown during column study No. 9 after the first and second shock load. During the interruption of DO, the microorganisms were unable to biodegrade TCP influent TCP was removed by adsorption on GAC (as shown with no chloride released, or pH dropped in the effluent). During steady state operations extra chloride was released in the effluent as the result of dehalogenation of TCP already adsorbed on GAC by attached microorganisms (bioregeneration).

Biological degradation of chlorophenols under aerobic conditions is known to release chloride, decrease DO and pH in the effluent. The results obtained from running PVA-immobilized cells and GAC-immobilized cells systems for approximately 240 days, indicated that the contribution of chloride release, DO consumption, and pH drop in the effluent were all important in the evaluation of removal efficiency of TCP in this study. During this study, the measured chloride release from dehalogenation of TCP under aerobic conditions agreed well with those calculated from GC results as shown in FIGS. 11, 12, 13 and 14.

Jarvinen et al. (1994) concluded that aerobic chlorophenol biodegradation does not result in partially dechlorinated metabolites. They claim mineralization of chlorophenols (CP) since all CP removals were confirmed by chloride release and no chlorinated intermediates were found. Makinin et al. (1993) concluded that the chloride release and $H^+$ generation (pH decrease) is an indication of chlorophenol mineralization. The results of this research can be directly compared to the above studies. The results of GC/MS confirm that no chlorinated intermediates or phenol was found in the PVA and GAC columns effluent. Amounts of $CO_2$ and methane gas greater than found in ambient air were detected in the GAC columns as the results of anaerobic biodegradation of TCP already adsorbed on GAC. This provides a possible explanation for the extra chloride release with the corresponding pH drop in the GAC columns effluent. The presence of aerobic and anaerobic activities in both GAC and PVA columns were confirmed by GC/MS after at the end of this research.

Comparison of GAC-Immobilized Cells with PVA-lmmobilized Cells

It is useful to examine a comparison of the performance of GAC-immobilized cells to PVA-immobilized cells as two biological permeable barrier matrices on the basis of elimination capacity, ease of operation, stability over extended period of time, tolerance under toxic shock loads and low DO, and capital cost.

The results of the previously discussed example applications of these two barrier matrices demonstrates that 3% GAC -immobilized cells/sand has added advantage to PVA-immobilized cells for its adsorption capabilities. The 3% GAC-immobilized cells/sand recovered from the high shock loads faster than PVA-immobilized cells, and the GAC-immobilized cells were able biodegrade TCP already adsorbed on GAC which can extend the life of GAC (bioregeneration). Both PVA-immobilized cells and 3% GAC-immobilized cells as biological permeable barriers compare favorably to conventional surface treatment process. The PVA-immobilized cells and 3% GAC-immobilized cells offer low cost and efficient processes to remove contaminates from groundwater, both in-situ and when the groundwater is first extracted from the ground.

TABLE 4

Comparison of PVA-immobilized cells and 3% GAC-immobilized cells/sand

| Basis of Comparison | PVA-immobilized cells | 3% GAC immobilized cells |
|---|---|---|
| Removal efficiency | 100% for load up to 300 mg $L^{-1}.d^{-1}$ | 100% |
| Ease of operation | easy to handle | easy to handle |
| Stability | most of the beads remained firm and elastic. a few of the beads severely damaged during 240 days of continuous operation. | no physical damage was observed. |
| Tolerance | survived high shock load and deficiency of DO, recovered from high shock load and low DO within 11–21 days. | survived high shock load and low DO, low DO and high shock affected biodegradation of TCP. maintained 100% efficient by adsorption and biodegradation during high shock load and low DO. |
| Capital Cost | chemicals needed (boric acid, PVA) = $55.0/ft³. | $ 8.0/ft³ (3% GAC/Silica sand) |

Biological permeable barriers using PVA-immobilized cells and 3% GAC-immobilized cells are able to biodegrade contaminates, of which TCP is merely one, from groundwater under various operational conditions. The immobilized cells are protected against toxic shock loads of contaminates by the PVA and GAC. PVA-immobilized cells system is a successful media for use in a trench-based permeable barrier to remove contaminates. PVA-immobilized cells can tolerate low DO and recovered (100% efficiency) within 11–21 days.

Those skilled in the art will recognize from the foregoing description of two embodiments that bioregeneration occurred in GAC-immobilized cells system. The adsorption capacity and biodegradation activity of GAC provided an added advantage to the PVA-immobilized cells system. This bioregeneration of GAC by immobilized cells extent the life of GAC and eliminate the need to excavate and replace the media.

It also will be appreciated by those skilled in the art that the foregoing examples of two embodiments of biological permeable barriers demonstrate the following advantages of PVA-immobilized cells and 3% GAC-immobilized cells as biological permeable barriers. PVA-immobilized cells and 3% GAC-immobilized cells are two successful media for use in a trench-based permeable barrier to remove TCP and/or other contaminates from groundwater either in-situ or ex-situ. PVA-immobilized cells provided up to 100% removal efficiency for TCP loading up to 300 mg/liter per day and GAC-immobilized cells provided 100% removal efficiency for TCP loading up to 1200 mg/liter per day.

Microorganisms were protected against high shock loads by immobilization on PVA beads and recovered to steady state conversion within 11–21 days. PVA-immobilized cells tolerated deficiency of dissolved oxygen and regained their activity once they received adequate DO.

GAC maintained substantial adsorption capacity even with development of bacterial growth. The survival of the immobilized cells in spite of the addition of a shock load was the result of rapid adsorption of the contaminate by GAC. Bioregeneration occurred as the adsorbed contaminate was desorbed and metabolized by immobilized cells. Bioregeneration was shown by the extra chloride release, with corresponding pH drop in the effluent, after adsorption capacity of GAC was exhausted by a high shock load of contaminate. PVA-immobilized cells were unable to offer any of the adsorption advantages provided by GAC-immobilized cells.

Stability, control, detoxification of contaminants, and high performance shown by both PVA-immobilized and GAC-immobilized cells systems under variety of operating conditions represent biological permeable barrier systems that eliminate the need to excavate and replace the media from trench reclamation sites which represents a substantial improvement over the prior art barriers.

Figure 35:
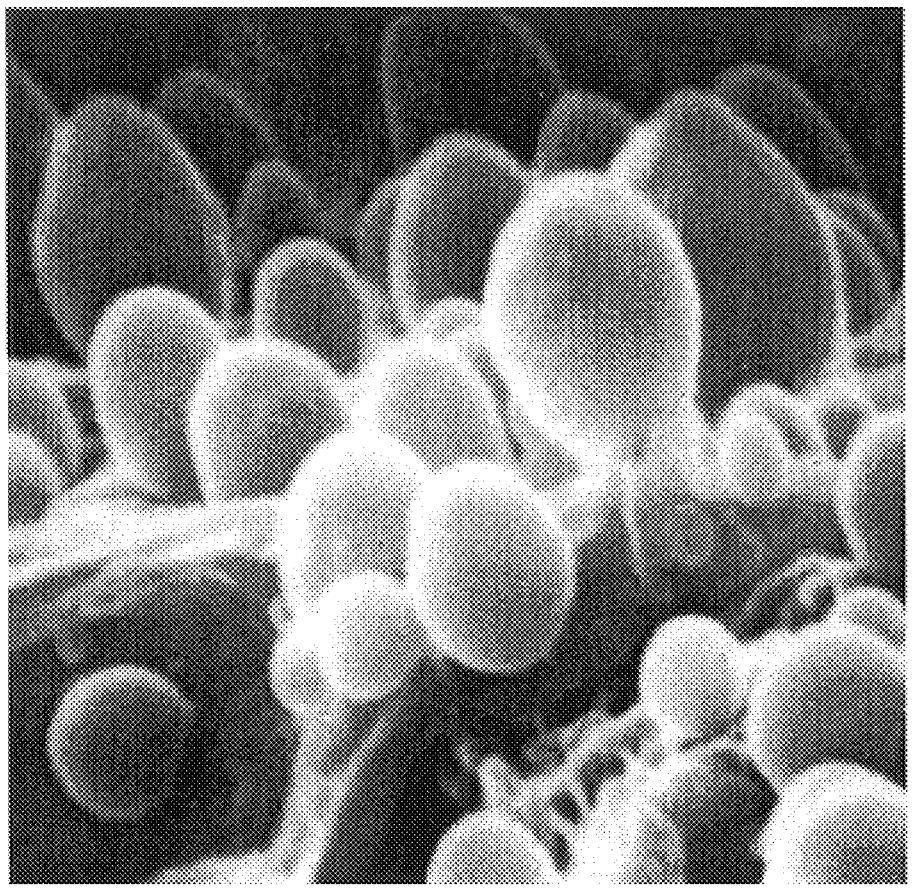
FIG. 35 is a scanning electron micrograph showing biofilm formation inside of a PVA bead at nine months.
Figure 36:
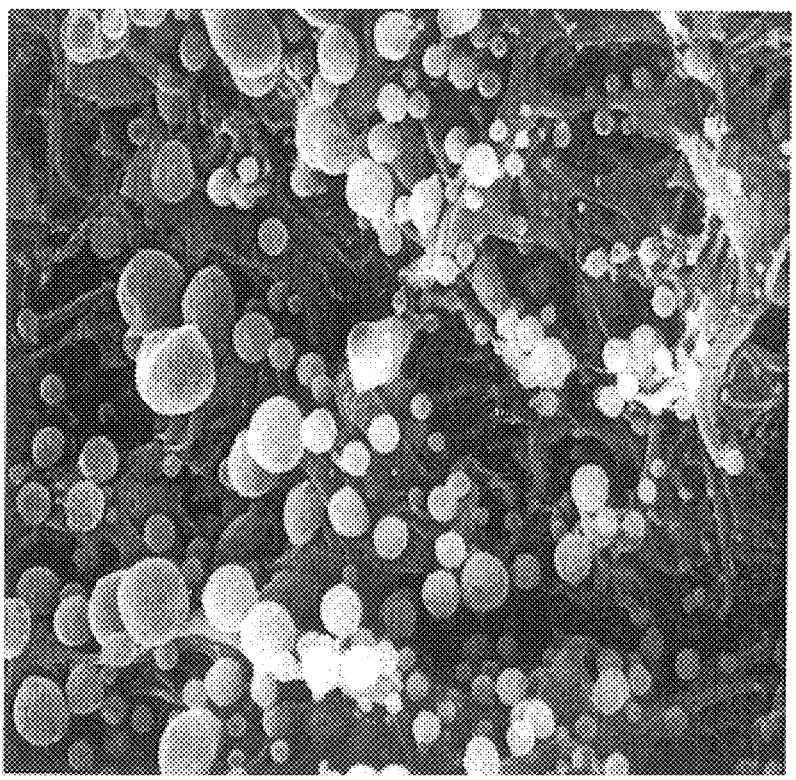
FIG. 36 is a scanning electron micrograph showing microcolonies inside PVA beads at nine months.
Figure 37:
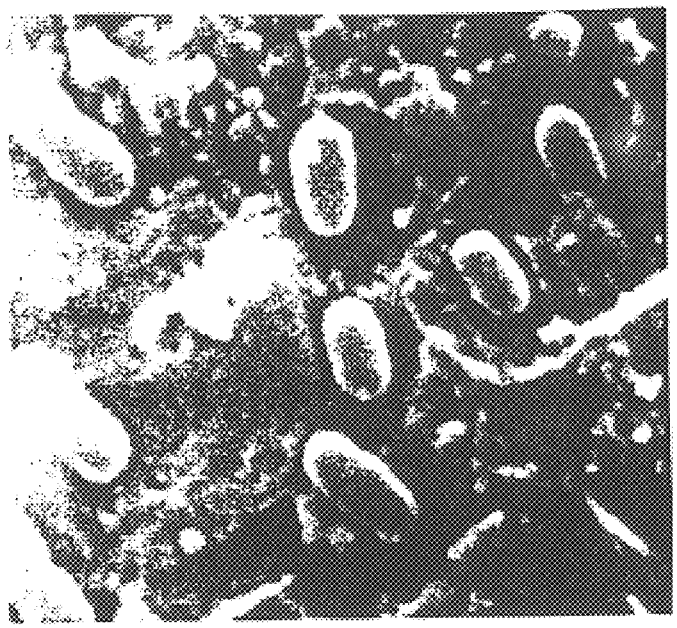
FIG. 37 is a scanning electron micrograph showing immobilized cells on GAC at 14 days.
Figure 38:
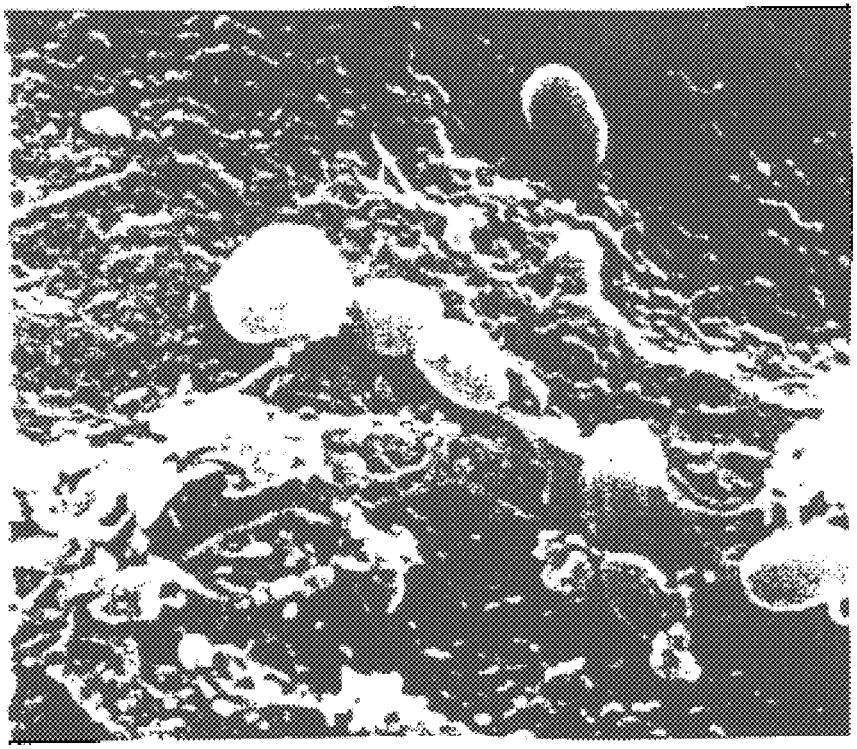
FIG. 38 is a scanning electron micrograph showing bacteria colonization on GAC.
Figure 39:
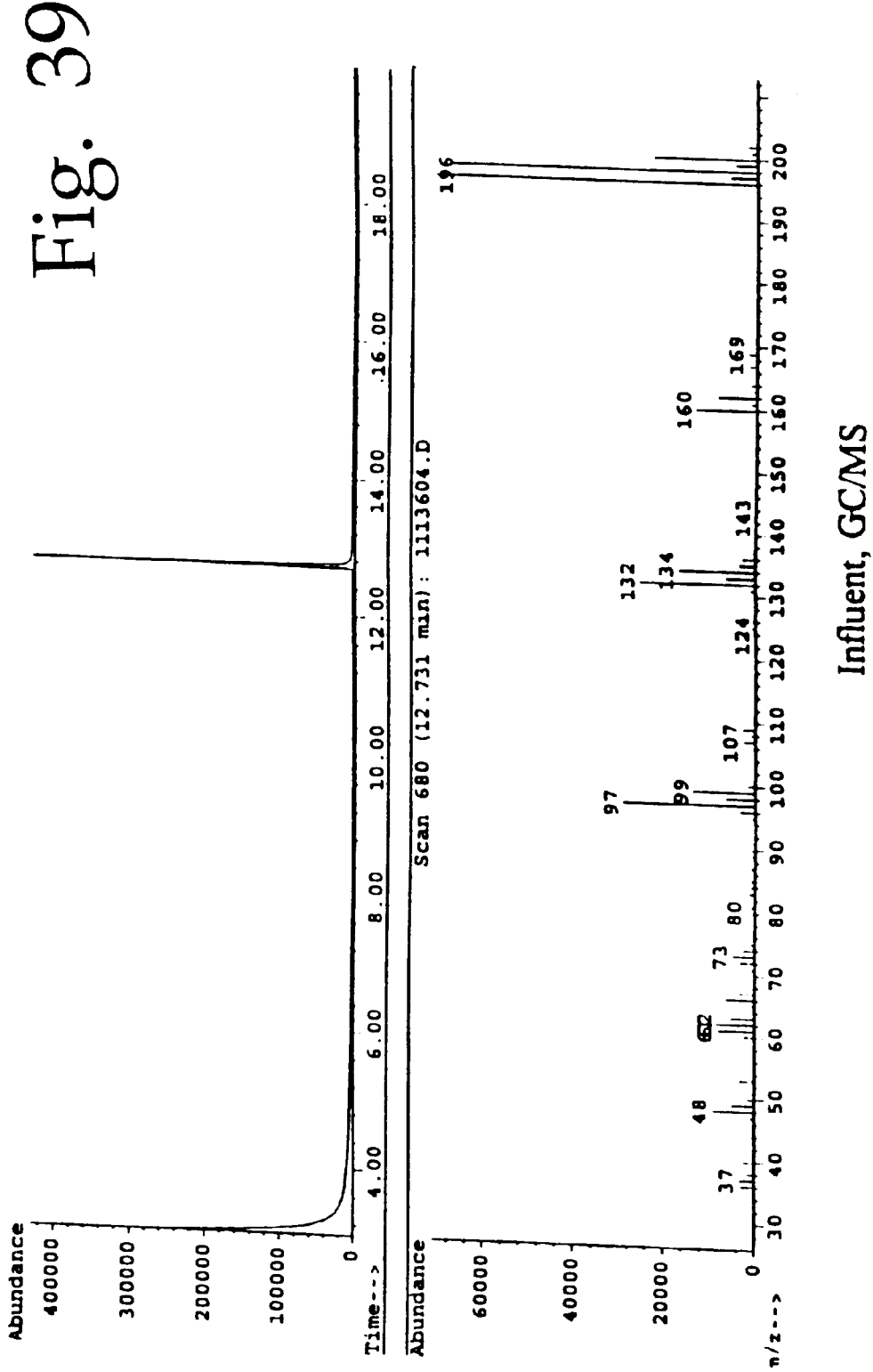
FIG. 39 is a gas chromatograph with attached mass spectrometer analysis of the column influent.
Figure 40:
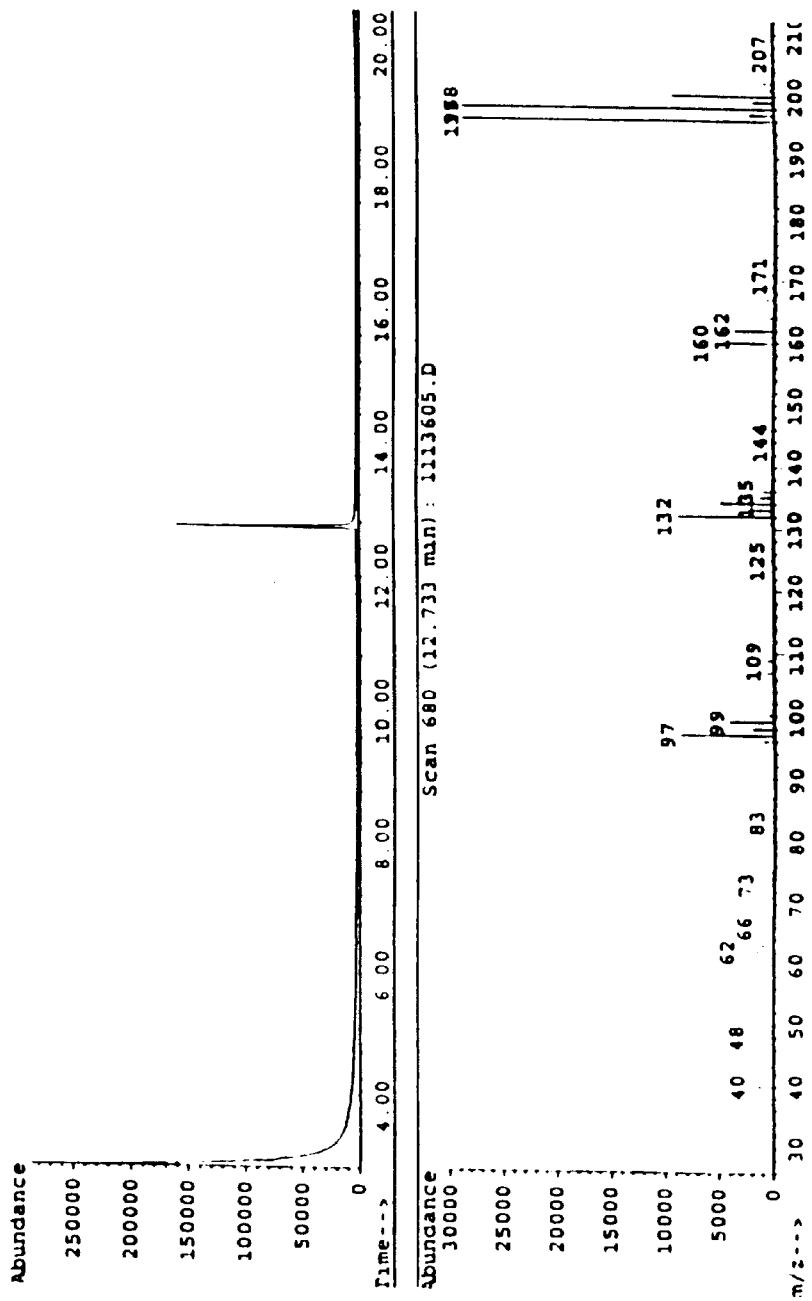
FIG. 40 is a gas chromatograph with mass spectrometer attached analysis of the effluent of PVA Column #1.
Figure 41:
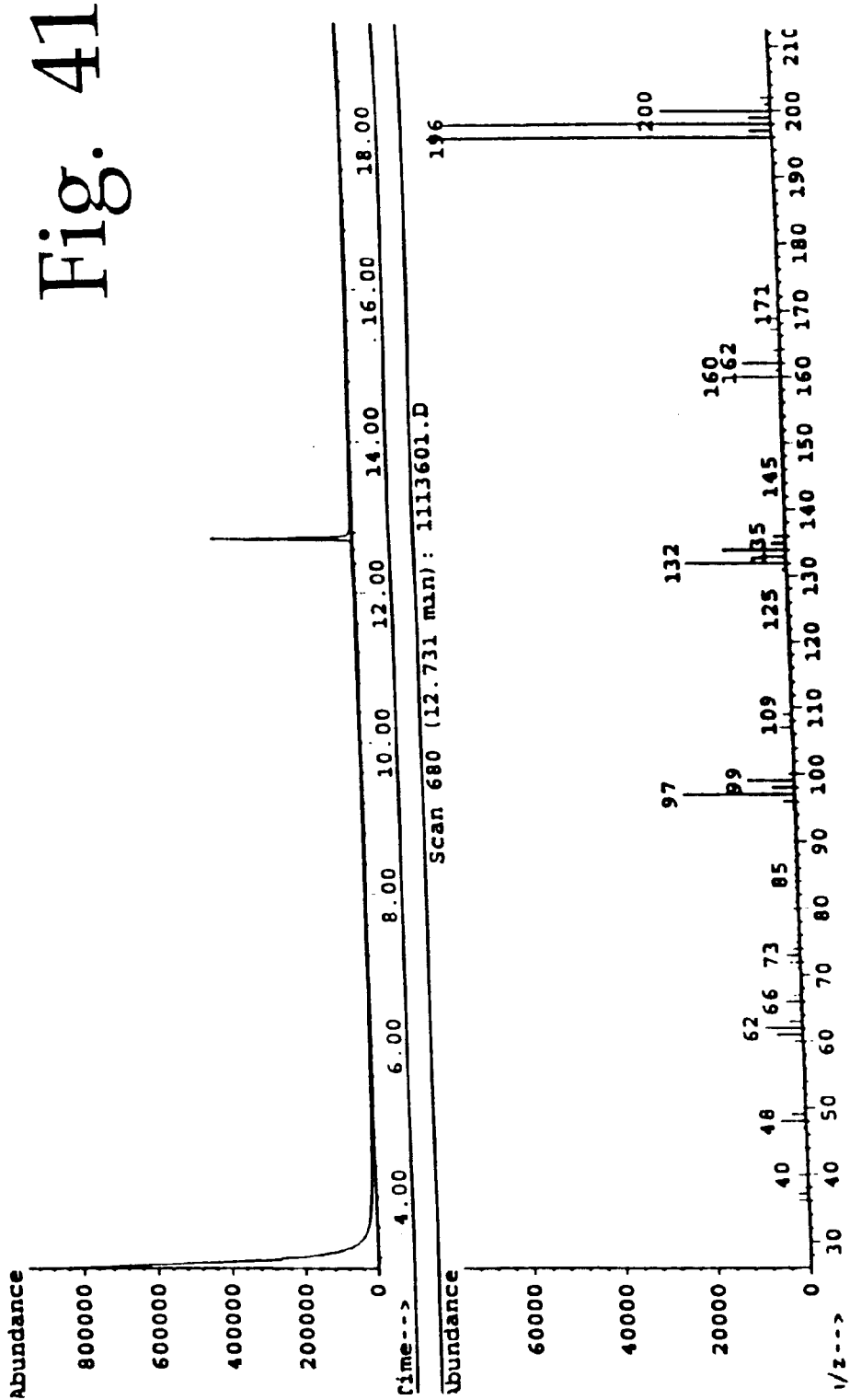
FIG. 41 is a gas chromatograph with mass spectrometer attached analysis of the effluent of Column #2.
Figure 42:
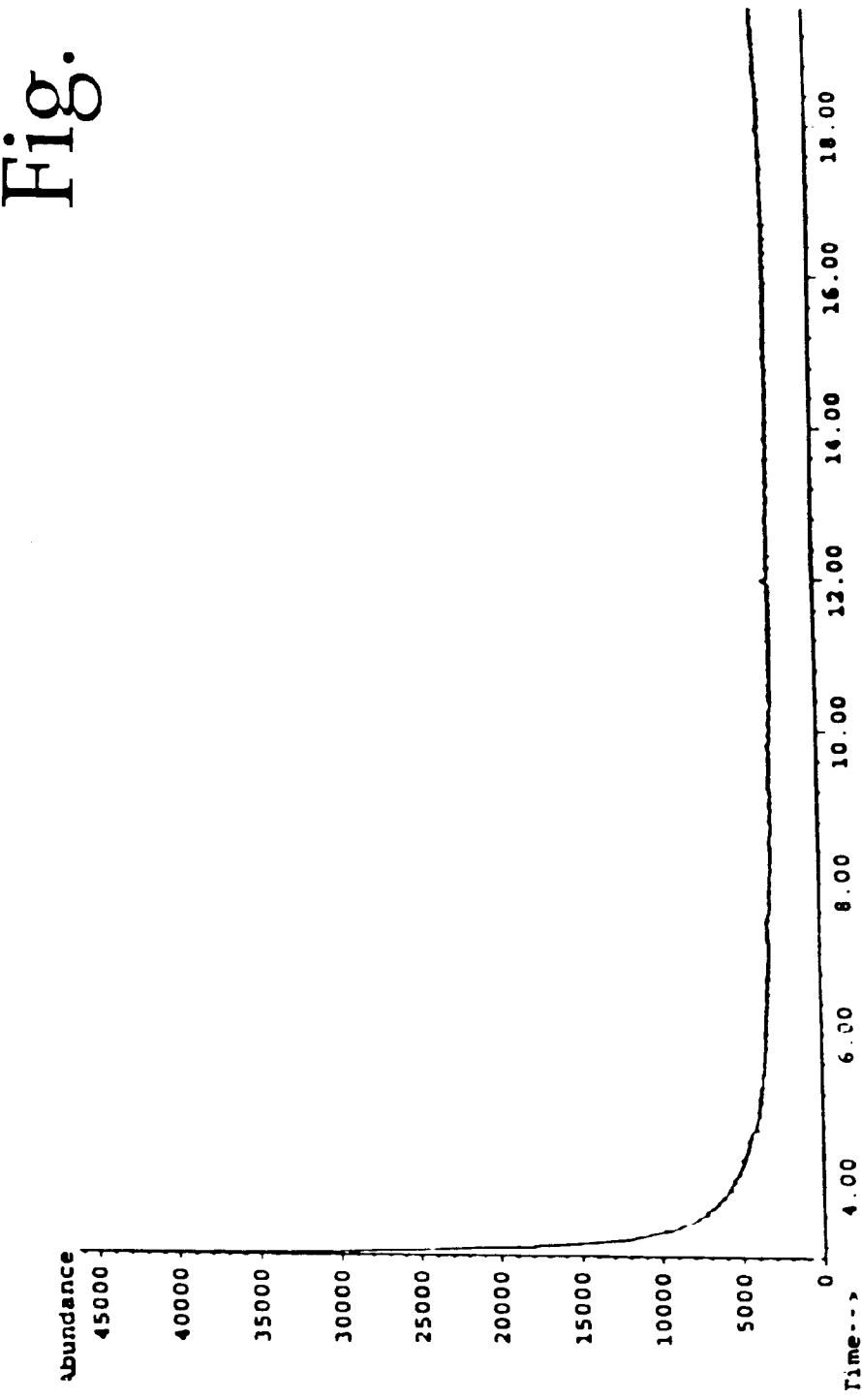
FIG. 42 is a gas chromatograph with mass spectrometer attached analysis of the effluent of GAC Column #3.
Figure 43:
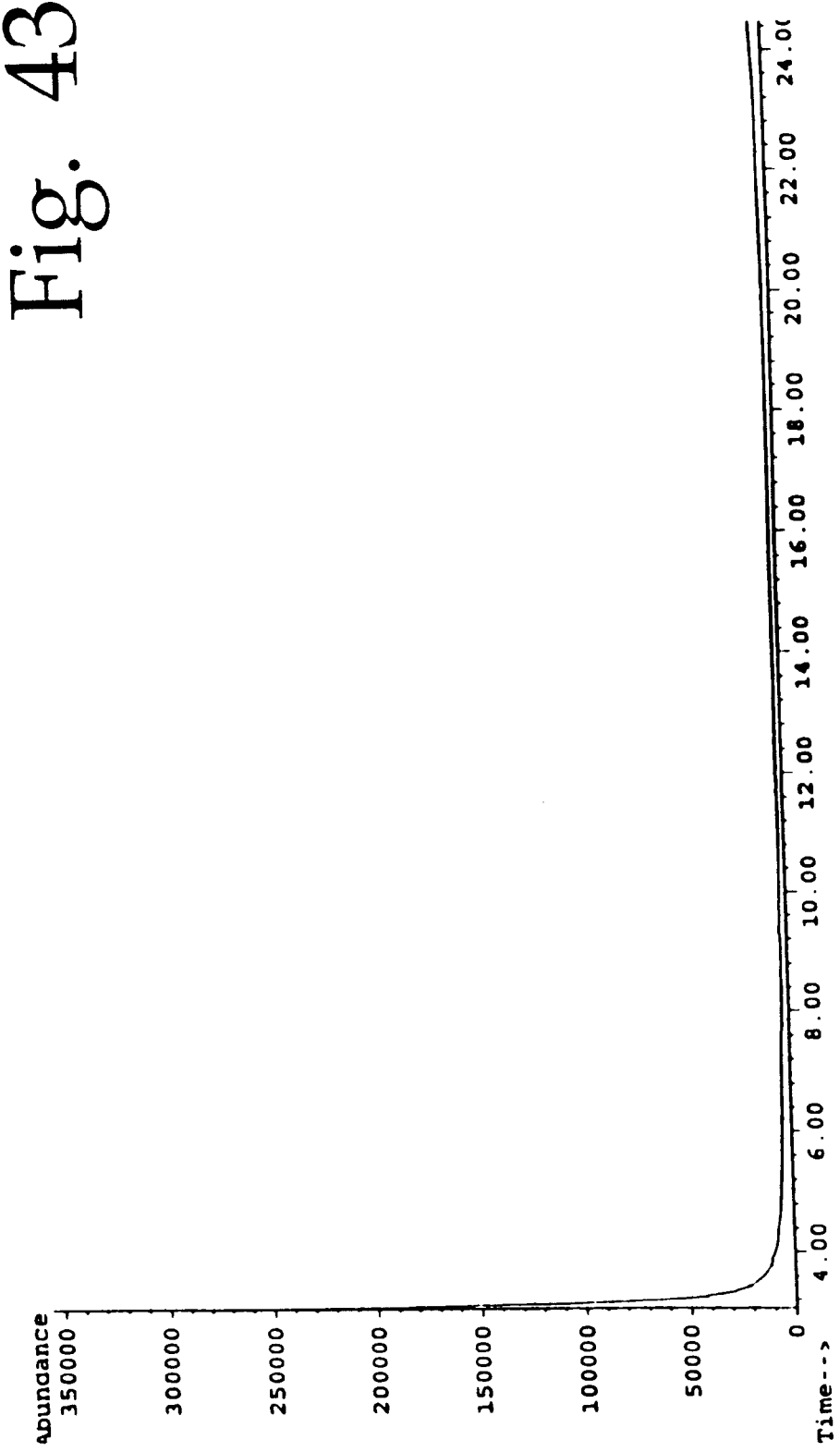
FIG. 43 is a gas chromatograph and mass spectrometer analysis of the effluent of GAC Column #4.

After 240 days of continuous operation, over 99% of PVA-immobilized cells appeared to be resilient, firm, and structurally sound. Micrographs of the beads showed them to be more porous than initial beads. The channels and pockets within the beads appeared larger than initial beads. FIGS. 35 and 36 are scanning electron micrographs of the beads after 240 days showing mirocolonies formed inside the PVA beads. FIGS. 37 and 38 are scanning electron micrographs of GAC-immobilized cells showing microcolonies of the cells on inner surfaces of GAC.

PVA-immobilized cells remained permeable and structurally sound over time (240 days). PVA-immobilized cells tolerated high shock load, low DO and resumed its biological activity to a steady state in a matter of a few days. PVA-immobilized cells remained 100–91% efficient at applied loadings of 300 mg $L^{-1}$ $.d^{-1}$ and 600 $mgL^{-1}d^{-1}$, respectively. On the selected contaminate (TCP) for the above-described embodiments , PVA-immobilized cells completely dehalogenated TCP without formation of chlorinated intermediates or phenol. The lack of chloride intermediates or phenols is demonstrated in FIGS. 39, 40, 41, 42 and 43 which are gas chromatograph/mass spectra readouts of PVA column effluents.

GAC-immobilized cells offered 100% removal of TCP by a combination of biological degradation and physical adsorption. The cells functioned as biological processors and the GAC functioned as a support and adsorbent barrier.

GAC-immobilization protected cells from high shock loads by rapid TCP adsorption. Biodegradation of TCP by GAC-immobilized cells dehalogenated TCP without formation of chlorinated intermediates or phenol.

Therefore, the use of PVA-immobilized cells and 3% GAC-immobilized cells/sand as two biological permeable barrier media to remove contaminates from groundwater is an important improvement over the prior art methods and provides important operational benefits such as no precipitation of solid contaminates, no need to replace the barrier, no need to remove the barrier once it has been in operation due to collection of contaminates, no by-product contaminates are produced, complete detoxification of the contaminate can be obtained, low operation cost and maintenance cost of the barrier is presented, no sludge is produced which must be removed from the site and destroyed and no hazardous waste is produced.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive permeable barrier is constructed and used, the characteristics of the construction, and advantageous, new and useful results obtained; the new and useful structures, devices, elements, arrangements, parts and combinations, are set forth in the appended claims. It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. A method for providing a biological permeable barrier to biodegrade a contaminate in contaminated groundwater comprising:
    selecting a microorganism capable of biodegrading the contaminant,
    immobilizing said selected microorganism on a carrier medium to provide an immobilized microorganism,
    placing said immobilized microorganism across the flow of the contaminated groundwater to present said biological permeable barrier to said groundwater, and
    allowing the contaminated groundwater to pass through said barrier to contact said immobilized microorganism to biodegrade the contaminant in the contaminated groundwater.

2. The method of claim 1 wherein the contaminant in the groundwater is biodegraded in situ by forming said biological permeable barrier by excavating a trench to intersect the in-ground flow of the groundwater and filling said trench with said immobilized microorganism.

3. The method of claim 1 wherein the contaminant in the groundwater is biodegraded by removing the groundwater from the ground and passing the contaminated groundwater through said biological barrier to biodegrade.

4. The method of claim 1 further comprising the step of conditioning said selected microorganism to increase the tolerance of said microorganism to said contaminant prior to said immobilizing step.

5. The method of claim 1 further comprising the step of conditioning said selected microorganism to increase the tolerance of said microorganism to said contaminated groundwater.

6. The method as claimed in claim 1 wherein said microorganism is immobilized on a carrier medium comprising polyvinyl alcohol.

7. The method as claimed in claim 6 wherein said polyvinyl alcohol used as said carrier medium has a molecular weight greater than 20,000.

8. The method as claimed in claim 6 wherein said polyvinyl alcohol used as said carrier medium has a molecular weight of greater than about 50,000 and less than about 110,000.

9. The method as claimed in claim 6 wherein said polyvinyl alcohol used as said carrier medium has a molecular weight of greater than about 75,000 and less than about 100,000.

10. The method as claimed in claim 1 wherein said microorganism is immobilized on a carrier medium comprising polyvinyl alcohol treated with an aqueous acid.

11. The method as claimed in claim 1 wherein said microorganism is immobilized on a carrier medium comprising granular activated carbon.

12. The method of claim 1 further comprising the step of providing nutritional supplements to said immobilized microorganism.

13. The method of claim 1 further comprising the steps of:
    selecting a second microorganism capable of biodegrading a second contaminant contained in the contaminated groundwater, and
    immobilizing said selected second microorganism on a carrier medium to provide a second immobilized microorganism.

14. A method of providing a biological permeable barrier to biodegrade a contaminant in contaminated groundwater comprising:
    selecting a microorganism capable of biodegrading the contaminant,
    conditioning said microorganism to feeding on the contaminant,
    immobilizing said conditioned microorganism on a carrier medium to present carrier medium immobilized microorganism,
    excavating a trench to intersect the underground flow of the contaminated underground water,
    filling said trench with said carrier medium immobilized microorganism to expose a biological permeable barrier containing said carrier medium immobilized microorganism to said groundwater, and
    allowing the contaminated groundwater to flow through said biological barrier and to contact said immobilized microorganism to biodegrade the contaminant contained in underground water.

15. The method as claimed in claim 14 wherein said microorganism is immobilized on a carrier medium comprising of polyvinyl alcohol.

16. The method as claimed in claim 15 wherein said polyvinyl alcohol used as said carrier medium has a molecular weight of greater than about 50,000 and less than about 110,000.

17. The method as claimed in claim 15 wherein said polyvinyl alcohol used as said carrier medium has a molecular weight of greater than about 75,000 and less than about 100,000.

18. The method as claimed in claim 14 wherein said microorganism is immobilized on a carrier medium of granular activated carbon.

19. The method of claim 14 further comprising the step of providing nutritional supplements to said immobilized microorganisms.

20. The method of claim 14 further comprising the steps of:
 selecting a second microorganism capable of biodegrading a second contaminant contained in the contaminated groundwater, and
 immobilizing said selected second microorganism on a carrier medium to provide a second immobilized microorganism.

* * * * *